United States Patent
Doka et al.

(10) Patent No.: US 11,823,158 B2
(45) Date of Patent: *Nov. 21, 2023

(54) ADD-ON APPLICATION FOR POINT OF SALE DEVICE

(71) Applicant: Five Stars Loyalty, Inc., San Francisco, CA (US)

(72) Inventors: Matthew David Doka, Daly City, CA (US); Victor Shaun Ho, Daly City, CA (US); Patrick Lucas, Berkeley, CA (US); Michael Hsu, San Francisco, CA (US); Sarah Calvillo, San Francisco, CA (US); Joshua Christopher Wilson, San Mateo, CA (US); Andre Prudhomme, San Francisco, CA (US)

(73) Assignee: SUMUP, INC., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,475

(22) Filed: Sep. 12, 2022

(65) Prior Publication Data
US 2023/0004949 A1    Jan. 5, 2023

Related U.S. Application Data

(63) Continuation of application No. 16/449,275, filed on Jun. 21, 2019, now Pat. No. 11,488,133.

(51) Int. Cl.
G06Q 20/20 (2012.01)
G06Q 20/10 (2012.01)

(52) U.S. Cl.
CPC ........... *G06Q 20/209* (2013.01); *G06Q 20/10* (2013.01); *G06Q 20/202* (2013.01)

(58) Field of Classification Search
CPC ............ G06Q 20/00–10; G06Q 30/06; G06Q 40/00–02; G06Q 20/20; G06F 21/31;
(Continued)

(56) References Cited

U.S. PATENT DOCUMENTS 3,405,970 A * 10/1968 Doka ..................... B60J 7/1265
296/117
7,600,673 B2   10/2009 Stoutenburg et al.
(Continued)

FOREIGN PATENT DOCUMENTS

WO    2014/075144 A2    5/2014

OTHER PUBLICATIONS

"Automating Receipt Processing", Blogs (Jun. 6, 2017), retrieved from: https://ryubidragonfire.github.io/blogs/2017/06/06/Automating-Receipt-Processing.html, 14 pages.
(Continued)

*Primary Examiner* — Olusegun Goyea
(74) *Attorney, Agent, or Firm* — Ascenda Law Group, PC

(57) ABSTRACT

A point of sale application may initially process a transaction between a customer and a merchant. While the point of sale application processes the transaction, an add-on application may monitor a current state of a user interface of the point of sale application. Upon recognizing a triggering event associated with the current state of the user interface, the add-on application may take over the processing of the transaction from the point of sale application. Upon completion of the processing of the transaction, the add-on application may return a result of the transaction to the point of sale application by emulating user actions on the user interface of the point of sale application.

18 Claims, 43 Drawing Sheets

(58) Field of Classification Search
CPC . G06F 9/5005; G06F 9/5061; G06F 2209/508
USPC ........ 705/7.12, 14.17, 5, 39, 44, 15, 40, 59; 718/104
See application file for complete search history.

(56) References Cited

U.S. PATENT DOCUMENTS

| | | | | |
|---|---|---|---|---|
| 7,647,278 | B1* | 1/2010 | Foth | G06Q 20/10 713/168 |
| 7,702,578 | B2* | 4/2010 | Fung | G06Q 20/10 705/39 |
| 8,688,592 | B1* | 4/2014 | Abramson | G06F 21/31 705/75 |
| 8,949,142 | B1* | 2/2015 | Angrish | G06Q 50/12 705/15 |
| 9,251,538 | B1* | 2/2016 | Shakkarwar | H04L 67/02 |
| 9,324,098 | B1* | 4/2016 | Agrawal | G06Q 30/04 |
| 9,757,644 | B2* | 9/2017 | Rose | G06Q 20/12 |
| 10,152,710 | B1* | 12/2018 | Nakhuda | G06Q 20/3825 |
| 10,360,296 | B2* | 7/2019 | Greiner | G06N 7/02 |
| 2004/0044739 | A1* | 3/2004 | Ziegler | G06Q 20/02 709/213 |
| 2007/0005685 | A1* | 1/2007 | Chau | G06Q 20/202 709/203 |
| 2007/0091368 | A1 | 4/2007 | Gokaraju et al. | |
| 2008/0276243 | A1* | 11/2008 | Sood | G06F 9/5005 718/104 |
| 2011/0035319 | A1* | 2/2011 | Brand | G06Q 20/40 705/44 |
| 2011/0246357 | A1* | 10/2011 | Young | G06Q 40/00 705/39 |
| 2012/0023011 | A1* | 1/2012 | Hurwitz | G06Q 20/10 705/39 |
| 2012/0290421 | A1* | 11/2012 | Qawami | G06F 21/31 705/21 |
| 2012/0324242 | A1* | 12/2012 | Kirsch | G06F 21/6245 713/189 |
| 2013/0144706 | A1* | 6/2013 | Qawami | H04W 4/029 705/14.27 |
| 2013/0185413 | A1* | 7/2013 | Beaty | H04L 67/1001 709/224 |
| 2013/0197987 | A1* | 8/2013 | Doka | G06Q 30/0229 705/14.28 |
| 2014/0032299 | A1* | 1/2014 | Doka | G06Q 30/0229 705/14.27 |
| 2014/0081861 | A1* | 3/2014 | Berland | G06Q 10/087 705/44 |
| 2014/0249901 | A1* | 9/2014 | Qawami | G06Q 20/12 705/14.17 |
| 2014/0279457 | A1* | 9/2014 | Green | G06Q 20/10 705/40 |
| 2015/0019356 | A1 | 1/2015 | Bagdonas et al. | |
| 2015/0178712 | A1* | 6/2015 | Angrish | G06Q 20/322 705/5 |
| 2015/0248664 | A1* | 9/2015 | Makhdumi | G06Q 20/3274 235/380 |
| 2015/0269573 | A1* | 9/2015 | Subbarao | G06Q 20/382 705/44 |
| 2015/0347934 | A1* | 12/2015 | Ouyang | H04M 3/5233 705/7.12 |
| 2016/0012465 | A1* | 1/2016 | Sharp | G06Q 20/321 705/14.17 |
| 2017/0278096 | A1* | 9/2017 | Chitalia | G06Q 20/20 |
| 2018/0012206 | A1* | 1/2018 | Sood | G07F 7/025 |
| 2018/0121908 | A1* | 5/2018 | Lin | G06Q 20/4012 |
| 2018/0341505 | A1 | 11/2018 | Ebersohn | |
| 2019/0073668 | A1* | 3/2019 | Nakhuda | G06Q 40/123 |
| 2019/0107898 | A1* | 4/2019 | Cancio | G06F 3/023 |
| 2019/0287527 | A1* | 9/2019 | Lee | G10L 15/22 |

OTHER PUBLICATIONS

"Drop (loyalty program)", Wikipedia, last edited on Mar. 31, 2019, retrieved from: https://en.wikipedia.org/w/index.php?title=Drop_(loyalty_program)&oldid=890306593, 2 pages.
"Loyalty Website Account FAQ", Erik's DeliCafe website, retrieved Sep. 19, 2018 from: http://www.eriksdelicafe.com/loyalty/faq/, 3 pages.
"POS Text Overlay Solution V 1.0", Hikvision Europe Solution Team, Presentation 201603, Hikvision Digital Technology Co., Ltd., retrieved Sep. 13, 2018 from: https://www.dema.ch/media/wysiwyg/SOLUTIONS/VIDEOSURVEILLANCE/HIKVISION/01-POS_Retail/POS_Text_Overlay_Solution_EN.pdf, 24 pages.
"Puppeteer", Google Developers, retrieved Sep. 19, 2018 from: https://developers.google.com/web/tools/puppeteer/, 4 pages.
Balduzzi; et al., "A Solution for the Automated Detection of Clickjacking Attacks", ASIACCS'10, Apr. 13-16, 2010, Beijing, China, 10 pages.
Huang; et al., "Clickjacking: Attacks and Defenses", Proceedings of the 21st USENIX conference on Security symposium, paper (Aug. 2012), 16 pages.
Jin, "Applying Deep Learning for Receipt Processing—Part I: Pre-OCR", Medium.com (Mar. 9, 2018), retrieved from: https://medium.com/@alvincjin/applying-deep-learning-for-receipt-processing-part-i-pre-ocr-11021b4e760d, 3 pages.
Luo; et al., "Touchjacking Attacks on Web in Android, iOS, and Windows Phone", Paper, Published in FPS 2012, 16 pages.
Niemietz; et al., "UI Redressing Attacks on Android Devices", Black Hat Abu Dhabi, 2012, retrieved from: https://media.blackhat.com/ad-12/Niemietz/bh-ad-12-androidmarcus_niemietz-WP.pdf, 7 pages.
Python, "Fingerprinting Images for Near-Duplicate Detection", Real Python, last updated May 22, 2015, retrieved from: https://realpython.com/fingerprinting-images-for-near-duplicate-detection/, 14 pages.
Raoui-Outach; et al., "Deep Learning for automatic sale receipt understanding", HAL archives-ouvertes.fr, submitted Dec. 3, 2017, HAL Id: hal-01654191, https://hal.archives-ouvertes.fr/hal-01654191, 7 pages.
Notice of Allowance dated Aug. 19, 2022, for U.S. Appl. No. 16/449,275, (filed Jun. 21, 2019), 12 pgs.
Advisory Action dated Jul. 25, 2022, for U.S. Appl. No. 16/449,275, (filed Jun. 21, 2019), 3 pgs.
Amendment filed Jul. 8, 2022, for U.S. Appl. No. 16/449,275, (filed Jun. 21, 2019), 10 pgs.
Final Office Action dated May 10, 2022, for U.S. Appl. No. 16/449,275, (filed Jun. 21, 2019), 19 pgs.
Amendment filed Jan. 28, 2022, for U.S. Appl. No. 16/449,275, (filed Jun. 21, 2019), 12 pgs.
Non-Final Office Action dated Dec. 15, 2021, for U.S. Appl. No. 16/449,275, (filed Jun. 21, 2019), 19 pgs.
Non-Final Office Action dated Nov. 9, 2021, for U.S. Appl. No. 16/449,275, (filed Jun. 21, 2019), 18 pgs.
Non-Final Office Action dated Apr. 27, 2023, for U.S. Appl. No. 17/931,476, (filed Sep. 12, 2022), 12 pgs.
Response to Office Action dated Jul. 10, 2023, for U.S. Appl. No. 17/931,476, (filed Sep. 12, 2022), 7 pgs.

* cited by examiner

ADD-ON APPLICATION FOR POINT OF SALE DEVICE

RELATED APPLICATIONS

This application is a Continuation Application of U.S. application Ser. No. 16/449,275, filed on 21 Jun. 2019, which is incorporated by reference herein.

FIELD OF THE INVENTION

The present invention relates to the processing of a transaction between a merchant and a customer using a point of sale application and an add-on application, and more particularly relates to transitioning the processing of the transaction between the point of sale application and the add-on application.

BACKGROUND

Point of sale systems are widely used to process transactions between customers and merchants. Functions performed by typical point of sale systems include generating a list of items (or services) to be purchased (sometimes called an invoice or a purchase order), calculating a total amount to be paid by a customer, facilitating the transfer of funds from a customer to a merchant, printing a receipt, etc. Some point of sale systems may also facilitate loyalty programs, providing rewards to customers based on their purchasing history.

SUMMARY OF THE INVENTION

In accordance with one embodiment of the invention, an add-on application running on a point of sale device may monitor a current state (e.g., payment state, refund state, checkout state, etc.) of a user interface of a point of sale application also running on the point of sale device. The monitoring of the current state may include parsing images of the interface using optical character recognition (OCR), computer vision, machine learning or another methodology and/or comparing current fingerprints of the interface with fingerprints taken of the interface during an initial configuration process to determine the current state of the user interface. In response to a determined current state, on-screen overlay buttons may be displayed on the user interface of the point of sale application. Upon recognizing a triggering event associated with the current state of the user interface of the point of sale application, the processing of the transaction may transition from the point of sale application to the add-on application. Example triggering events may include recognizing an intent of the customer or the merchant to start using financial instruments to transfer funds from the customer to the merchant, or refund funds from the merchant back to the customer. One example of a triggering event is the selection of the above-mentioned on-screen overlay button.

Upon taking over the processing of the transaction, the add-on application may extract a total amount from the user interface of the point of sale application (e.g., total amount to be paid by the customer, total amount to be refunded to the customer, etc.). The add-on application may then receive identifying information of the customer, which can be used to link the customer with his/her rewards account (or more generally any account associated with the customer). In the case of a credit card transaction, the credit card number of the customer may be used as the identifying information of the customer and may be used to look-up the rewards account of the customer (specifically, a rewards account not provided by the issuer of the credit card), in which case the "login" of the customer requires no additional action beyond what a customer is accustomed to doing during a typical credit card transaction. In the case of a cash transaction, a phone number or other identifying information of the customer may be used to look-up the rewards account of the customer.

The add-on application may then process the transaction. In the case of a purchase, the add-on application may facilitate funds to be transferred from the customer to the merchant (e.g., processing a credit card, displaying a user interface to facilitate a cash transaction, etc.). Reward points from the reward account of the customer may also be redeemed to provide the customer with a discount on his/her purchase. In the case of a refund, the add-on application may facilitate funds to be transferred from the merchant to the customer. Upon completion of the processing of the transaction, the add-on application may record information associated with the transaction with the rewards account of the customer (e.g., total amount paid, total amount refunded, items purchase, items refunded, reward points redeemed, reward points earned, etc.).

Upon completion of the processing of the transaction, the add-on application may also return a result of the transaction to the point of sale application by emulating user actions on the user interface of the point of sale application. Emulated user actions on the user interface of the point of sale application may include selection of an "other tenders" button (or other user interface element) on the user interface of the point of sale application so as to navigate to an accounting screen within which emulated user actions can be performed to input the amount paid by or refunded to the customer.

These and other embodiments of the invention are more fully described in association with the drawings below.

BRIEF DESCRIPTION OF THE DRAWINGS

FIGS. 2A-2J depict screenshots of user interfaces to process a payment using a credit card, in accordance with one embodiment of the invention.

FIGS. 4A-4J depict screenshots of user interfaces to process a transaction involving the redemption of rewards, in accordance with one embodiment of the invention.

FIGS. 5A-5F depict screenshots of user interfaces to process a refund, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
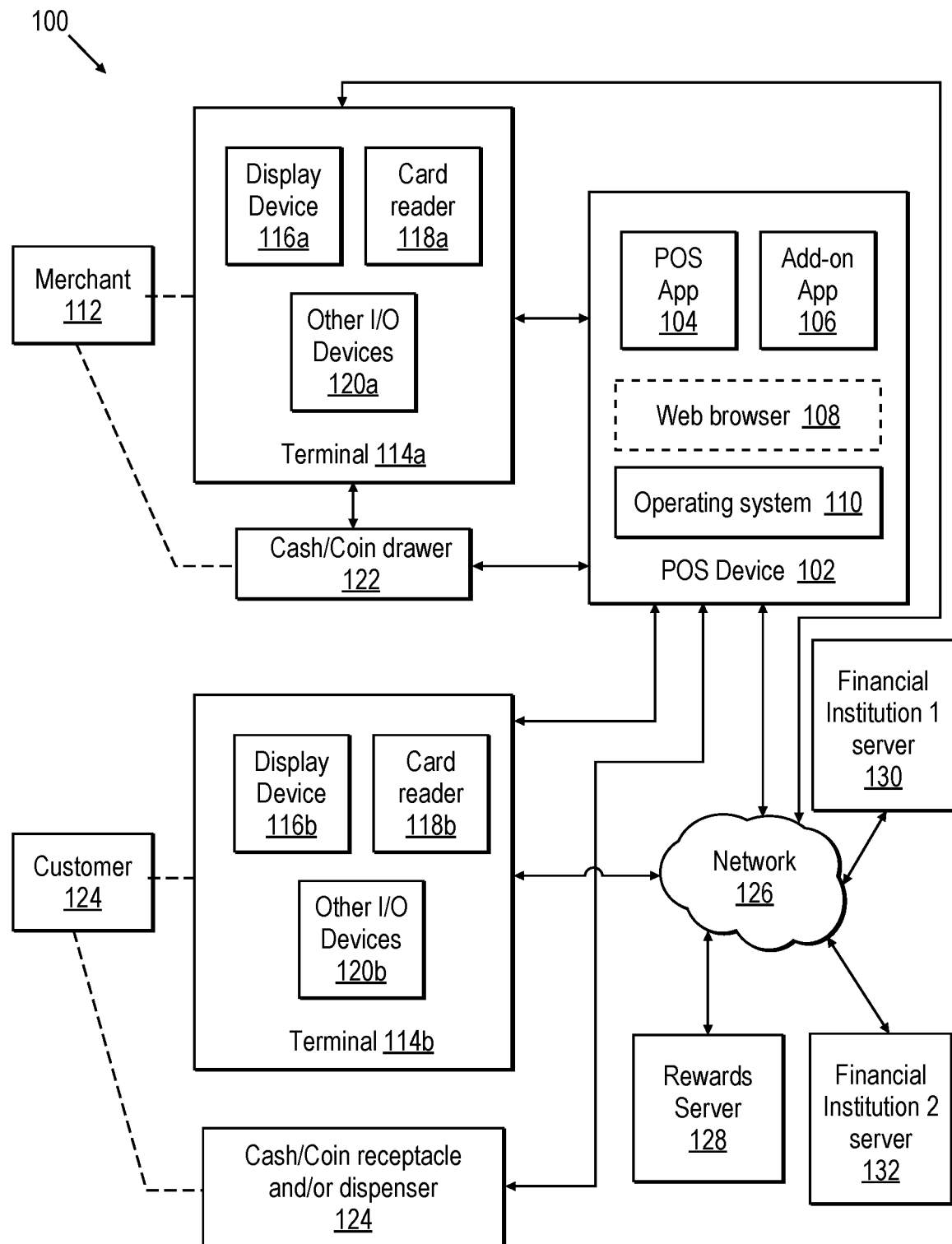
FIG. 1 depicts a block diagram of a point of sale system to process a transaction between a merchant and a customer, in accordance with one embodiment of the invention.

FIG. 1 depicts block diagram 100 of a point of sale system (or more generally, a system for processing a transaction) that is configured process a transaction between merchant 112 and customer 124. The point of sale system may include point of sale device 102 on which a point of sale application 104 and an add-on application 106 may be installed. Point of sale application 104 (on its own, without any actions from add-on application 106) may be used to process one or more transactions between merchant 112 and customer 124. A transaction may include one or more of customer 124 making a purchase, merchant 112 processing a purchase for customer 124, customer 124 making a refund, or merchant 112 processing a refund for customer 124. An example of a point of sale application 104 is Aronium, provided by Aronium of Belgrade, Serbia.

Add-on application 106 may emulate certain functionality of point of sale application 104 (e.g., charge a credit card of the customer, ring up a cash transaction). In certain instances, merchant 112 and/or customer 124 may be given the choice of either using point of sale application 104 or add-on application 106 to process a transaction. In other instances, merchant 112 and/or customer 124 may be directed to use add-on application 106 to process a transaction (or complete the processing of a transaction). Add-on application 106 may additionally provide functionality that point of sale application 104 does not offer. For example, add-on application 106 may enroll customer 124 in a rewards (or loyalty) program, track the purchases and/or refunds of customer 124, and allow customer 124 to redeem rewards earned through the rewards program. Even if point of sale application 104 were to offer a rewards program, add-on application 106 may offer a rewards program with functionality beyond what the rewards program of point of sale application 104 offers. For example, the rewards program of point of sale application 104 may be configured to work with a single merchant, whereas the rewards program of add-on application 106 may be configured to work with multiple merchants, such that rewards earned through one merchant can be redeemed at another merchant. As an additional example, add-on application 106 may allow merchant 112 to process transactions with financial institutions that may or may not already be natively supported by point of sale application 104, or allow customer 124 to utilize financial instruments for payment that are not natively supported by point of sale application 104, such as contact and contactless EMV credit that may or may not be natively supported by point of sale application 104, or alternative payment methods like AliPay® that similarly may or may not be natively supported by point of sale application 104.

Once add-on application 106 is installed on point of sale device 102, the processing of a transaction may seamlessly transition between add-on application 106 and point of sale application 104. Importantly, add-on application 106 does not modify the source code of point of sale application 104. Instead, add-on application 106 is able to operate with point of sale application 104 by, for example, monitoring the current state of point of sale application 104, overlaying or inserting user interface elements (e.g., buttons) into the user interface provided by point of sale application 104, presenting user interfaces additional to those of point of sale application 104, and/or emulating user actions (e.g., performing mouse clicks, inputting text, etc.) in the user interface of point of sale application 104. Such functionality will be described in detail in the description associated with the screenshots presented in the subsequent figures. An example of add-on application 106 is Fivestars®, provided by Fivestars® of San Francisco, Calif.

In one embodiment, point of sale application 104 and add-on application 106 may run on operating system 110 of point of sale device 102 (i.e., without the use of a web browser 108 which is shown as an optional component in FIG. 1). In another embodiment, point of sale application 104 and add-on application 106 may be browser plugins that run on web browser 108 of point of sale device 102. Web browser 108, in turn, may run on operating system 110.

Merchant 112 may communicate with point of sale device 102 via terminal 114a. Terminal 114a may include display device 116a (e.g., an LCD display, a touchscreen display, etc.), card reader 118a (e.g., a credit card reader, a debit card reader, a gift card reader, etc.), and other input/output (I/O) devices 120a (e.g., a near-field communication (NFC) reader to communicate with Apple Pay®, Google Pay®; a Bluetooth® or Bluetooth® low energy device to communicate with contactless alternative payment methods; a cursor controlling device such as a mouse; a video camera to monitor the contents of display device 116a; a microphone to allow for voice control; etc.). Cash/coin drawer 122 may also be communicatively coupled to terminal 114a and/or point of sale device 102, and may open in response to an open instruction so as to allow merchant 112 to provide change to customer 124 and/or accept a cash payment from customer 124.

Customer 124 may communicate with point of sale device 102 via terminal 114b. Terminal 114b may include display device 116b (e.g., an LCD display, a touchscreen display, etc.), card reader 118b (e.g., a credit card reader, a debit card reader, a gift card reader, etc.), and other I/O devices 120b (e.g., a near-field communication (NFC) reader to communicate with Apple Pay®, Google Pay®; a Bluetooth® or Bluetooth® low energy device to communicate with contactless alternative payment methods; a cursor controlling device such as a mouse; a video camera to monitor the content of display device 116a; a microphone to allow for voice control; etc.). Cash/coin receptacle and/or dispenser 124 may also be communicatively coupled to terminal 114*b* and/or point of sale device 102, and may be configured to provide change to customer 124 and/or accept a cash payment from customer 124.

It is understood that one or more of the components depicted in diagram 100 may be optional. For example, in a self-checkout arrangement, merchant 112, terminal 114*a* and cash/coin drawer 122 may not be present. It is understood that in a self-checkout arrangement without a cashier, merchant 112 may more generally refer to the owner of a store or restaurant which may be a person, a group of individuals or an enterprise. Thus, a transaction could be performed between a customer and a merchant, even if a merchant is not physically present at the same location as the customer. A common example of such a transaction is when a person makes an e-commerce purchase on his/her smartphone or home computer. As another example, card reader 118*a* of terminal 114*a* may be omitted, and a transaction may exclusively rely upon card reader 118*b* of terminal 114*b*.

Point of sale device 102, terminal 114*a* and/or terminal 114*b* may be communicatively coupled to rewards server 128 via network 126. Network 126 may be any form of communications means and, in some cases, may be individual communications links, or one or more communications networks, including private networks, public networks and/or virtual private networks over public networks. Rewards server 128 may be used by add-on application 106 to facilitate a rewards program. For example, rewards server 128 may include a database that maps user identifying information (e.g., phone number, credit card number, social security number, first and last name, user login/password, etc.) of a user with the purchase history of a user, reward points of the user and/or product recommendations for the user.

Point of sale device 102, terminal 114*a* and/or terminal 114*b* may also be communicatively coupled to one or more servers 130, 132 that are operated by financial institutions in order to transfer funds between merchant 112 and customer 124. For example, server 130 may be operated by American Express®, and server 132 may be operated by Worldpay®.

While terminals 114*a* and 114*b* are shown to be directly coupled to point of sale device 102 (e.g., via a cable), it is possible that in other embodiments, terminals 114*a* and 114*b* are communicatively coupled to point of sale device 102 via network 126, in which point of sale device 102 might be embodied as a server. It is also possible for terminal 114*a* and point of sale device 102 to be one integral device. It is also possible for terminal 114*b* and point of sale device 102 to be one integral device.

The screenshots below provide detailed examples of user interfaces that may be displayed during the processing of transactions by point of sale device 102. In the examples, the screenshots only capture user interfaces that are displayed on display device 116*a* and are thus merchant-facing interfaces. Given such merchant-facing interfaces, it is expected that one will be able to modify the merchant-facing interfaces into customer-facing interfaces that are displayed on display device 116*b* (e.g., for a self-checkout system). For example, instead of an interface that instructs the merchant to request the customer to swipe his/her credit card, an interface may instead directly instruct the customer to swipe his/her credit card.

Figure 2A:
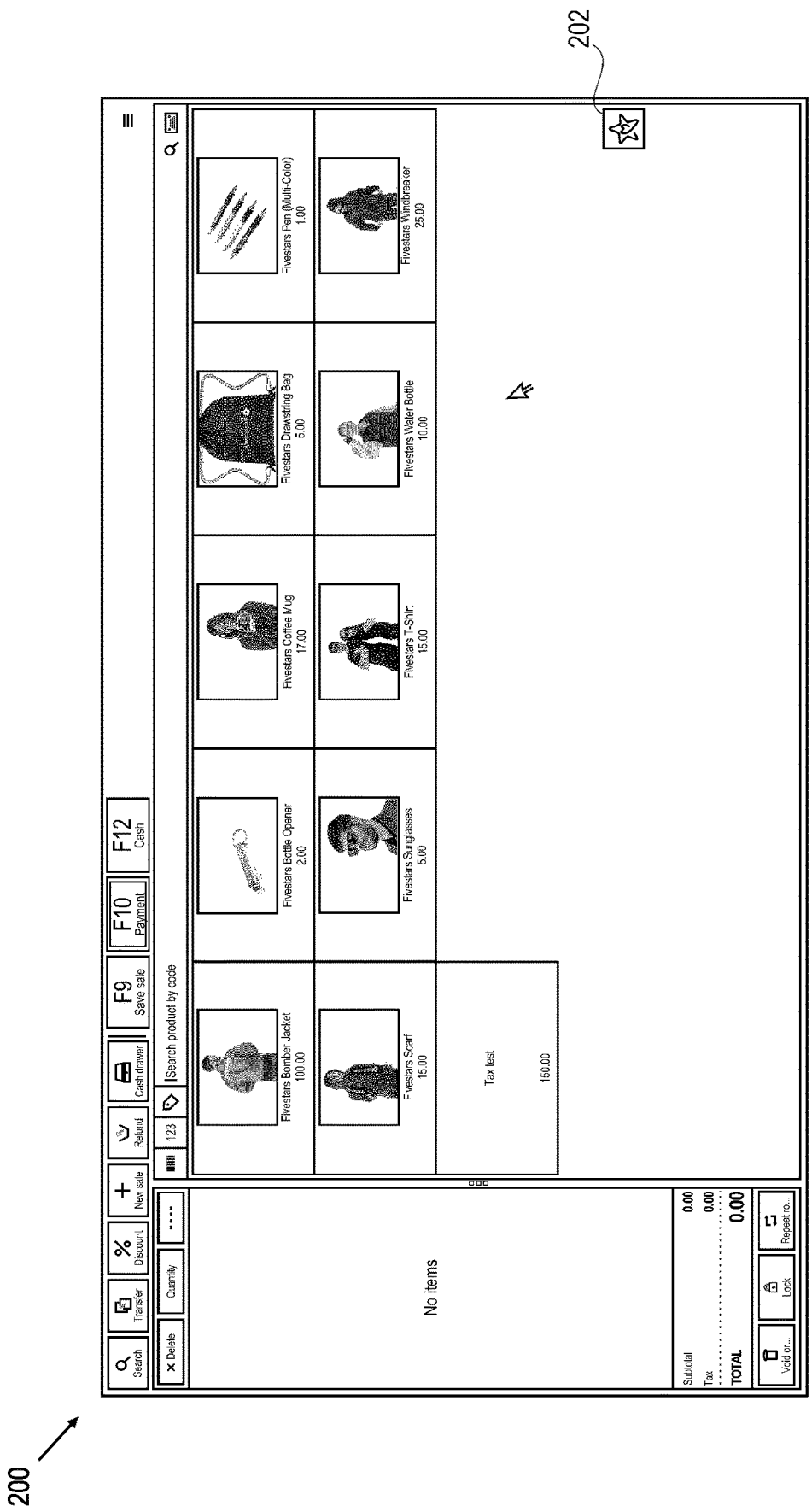
Figure 2B:
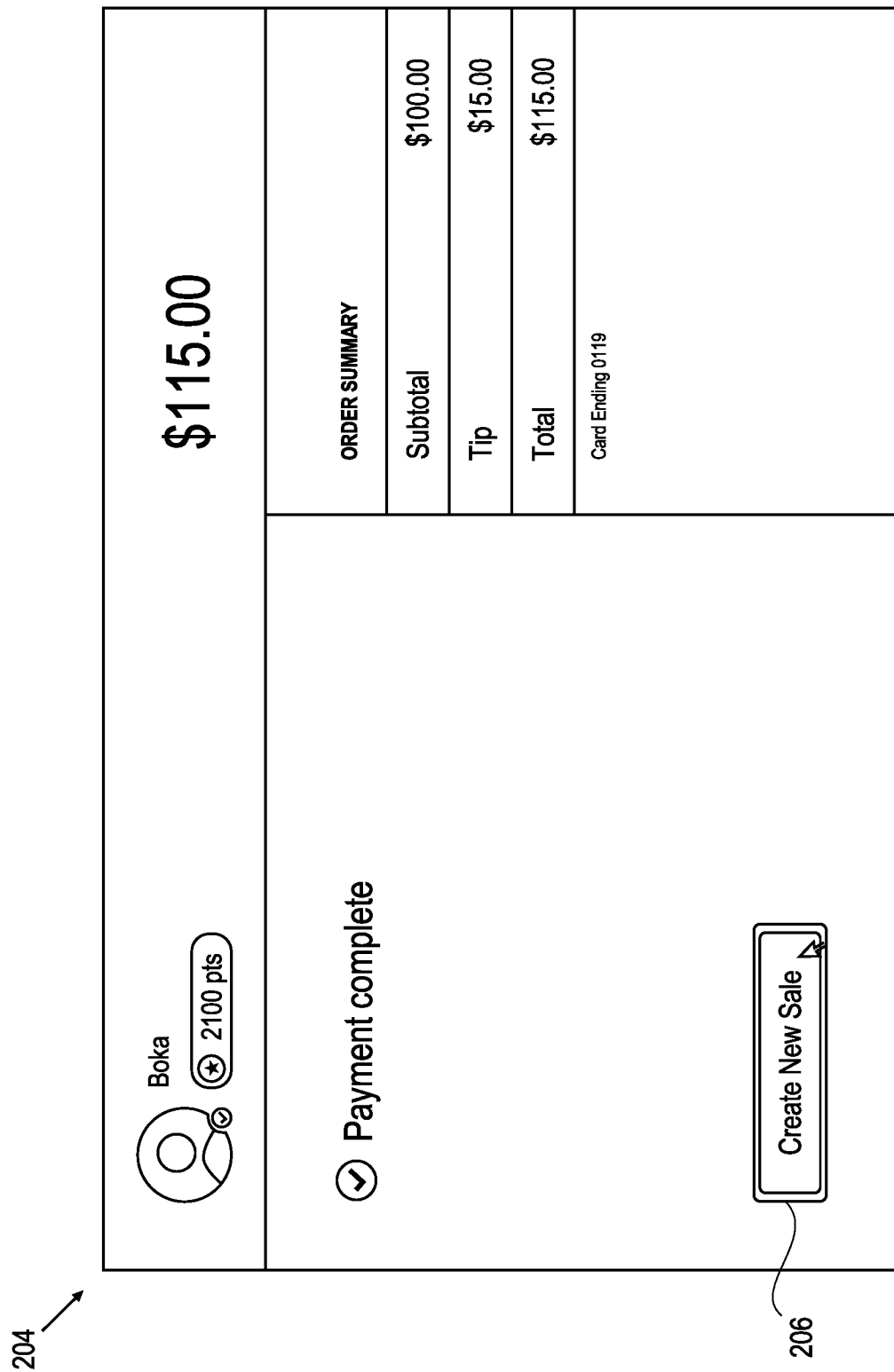

FIGS. 2A-2J depict screenshots of user interfaces to process a payment using a credit card. FIG. 2A displays screenshot 200 of an interface from point of sale application 104 at the beginning of a transaction prior to any items being selected for purchase. User interface element 202 from add-on application 106 may be inserted into the user interface from point of sale application 104. In order to notify add-on application 106 that a transaction is beginning, merchant 112 may select user interface element 202, causing the display of an interface provided by add-on application 106 (depicted in screenshot 204 of FIG. 2B), and then in the interface depicted in screenshot 204, merchant 112 may select user interface element 206 (e.g., button with text "Create New Sale"). Upon selection of user interface element 206, the interface of FIG. 2A may be depicted again, allowing items to be selected for purchase. It is noted, however, that such action from merchant 112 to notify add-on application 106 about the start of a new transaction may be omitted in certain embodiments. For clarity, it is noted that the additional details depicted in FIG. 2B (e.g., total $115.00) are from a previously completed transaction, and could be omitted from the user interface of FIG. 5B. For example, using machine learning, add-on application 106 may be trained to automatically recognize that a new transaction is about to begin or may begin based on certain characteristics of the user interface of point of sale application 104 (e.g., total equal to 0, indicating the entry process for a fresh order is at the beginning; no items in cart, similarly indicating a new order can begin, etc.").

Figure 2C:
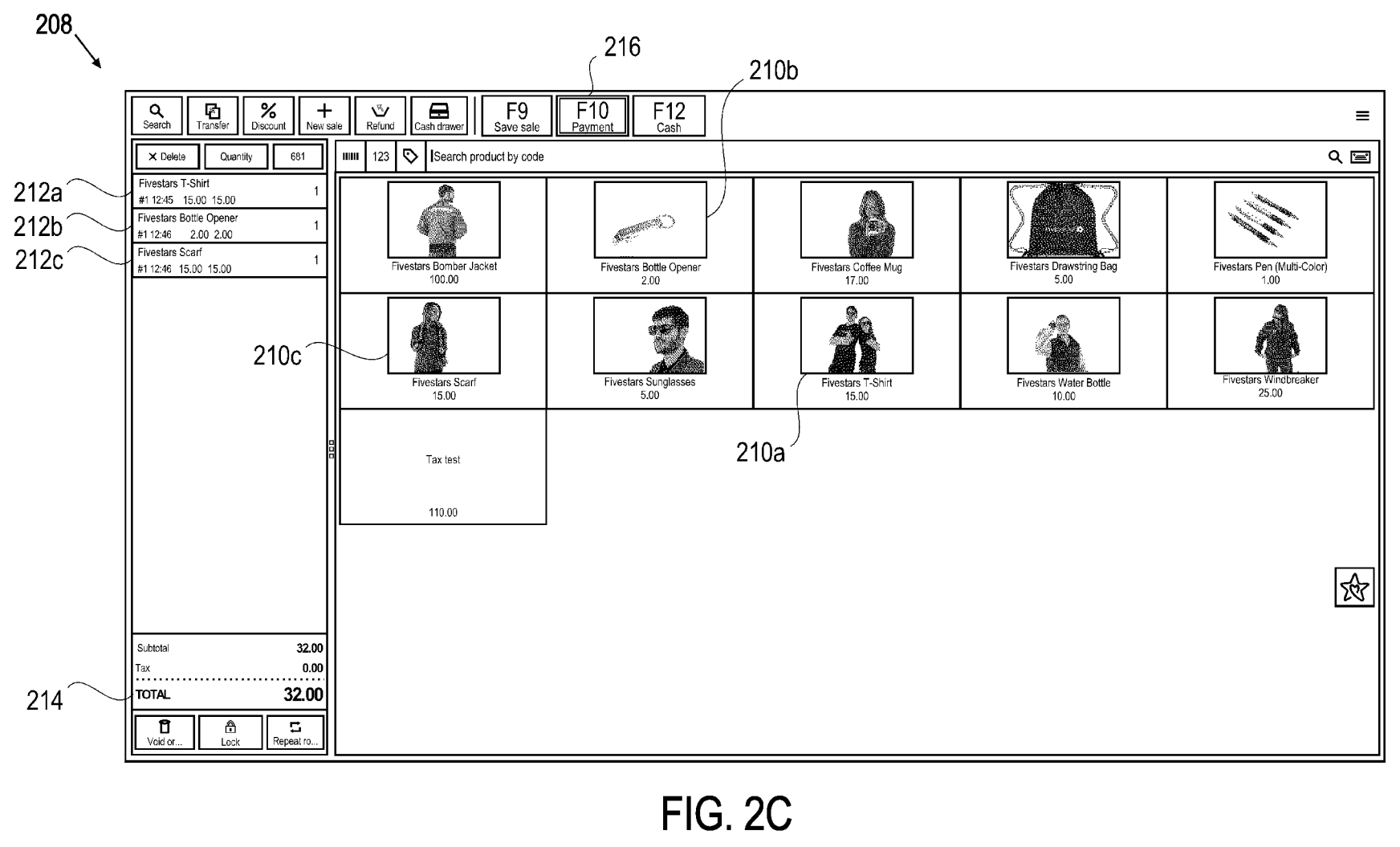

FIG. 2C depicts screenshot 208 of the interface from point of sale application 104, after three items have been selected for purchase. In particular, user interface element 210*a* (featuring a "Fivestars T-Shirt), user interface element 210*b* (featuring a "Fivestars Bottle Opener") and user interface element 210*c* (featuring a "Fivestars Scarf") were selected. In a left panel of the interface, the quantity and price of the selected items may be displayed (212*a*, 212*b*, 212*c*) along with total 214 (e.g., 32.00). Certainly, there are other ways that products could be selected for purchase, including the scanning of a barcode associated with a product, the detection of a radio-frequency identification (RFID) tag embedded in a product, the manual entry of a serial number, etc.

While the interface from point of sale application 104 is displayed, add-on application 106 may periodically monitor (e.g., every half second) the contents of the interface in order to infer the current state of the interface (e.g., product selection state, payment state, refund state, etc.). Several possible ways to monitor the contents of the interface are possible. For example, add-on application 106 may take screenshots, via the operating system's screenshot interface or screen buffer, or via a physical device pointing at display device 116*a* like a camera, or via a physical video feed intercept. Alternatively or in addition, add-on application 106 may take a fingerprint of the current contents of the screen, using a method such as examining the current color setting of a number of pixels on the screen, or taking a hash of the current screen pixel contents (i.e., the type of hash that can be used to calculate a hash difference). Alternatively or in addition, add-on application 106 may take a dump of the contents being displayed on screen, using operating system user interface introspection tools that allow reading of user interface element labels and contents, such as what the Windows API tools enable, or using the document object model (DOM) in the case of a browser-based point of sale application. Alternatively or in addition, add-on application 106 may use the operating system accessibility tools API to collect information about what is being displayed on screen, to then feed into a screen state analysis system. This information could be text, positioning, colors, window information, or any other information that an operating system accessibility or other handicapped accessible toolkit would provide. Alternatively or in addition, the add-on application 106 may take a hardware or software video feed from display device 116*a*, possibly by a USB webcam, possibly by a video intercept device like a VGA tap, or possibly by a software level video feed, like the iOS screen streaming feature.

Using machine learning, add-on application 106 may be trained to automatically identify the current state of the interface based on the monitored contents of the interface. For example, an expert installer may train the system by specifying one or more attributes that are associated with each of the states, and add-on application 106 may subsequently use the expert provided training data to identify the current state of the user interface of point of sale application 104. After a current state has been identified, add-on application 106 may further retrieve and compare one or more stored pixels (i.e., stored pixels of a user interface previously associated with the current state) with pixels of the current interface to verify whether or not the identified current state is correct. In another embodiment of the verification process, add-on application 106 may retrieve and compare one or more stored words (i.e., stored words displayed on a user interface previously associated with the current state) with words retrieved from the current user interface from OS introspection, the browser source, or full screen OCR. In another embodiment of the verification process, add-on application 106 may use trained computer vision/machine learning models to verify whether or not the identified current state is correct.

The training of add-on application 106 to perform such state identification will be described in more detail below in FIGS. 7A-7B. In the current example of FIG. 2C, add-on application 106 may identify the interface to be in a "product selection" or "ordering" state based on the presence of one or more of user interface elements 210*a*, 210*b*, 210*c*, etc. Upon selection of user interface element 216 (e.g., "F10 payment" button), the interface may transition to the payment screen depicted in screenshot 218 of FIG. 2D.

Figure 2D:
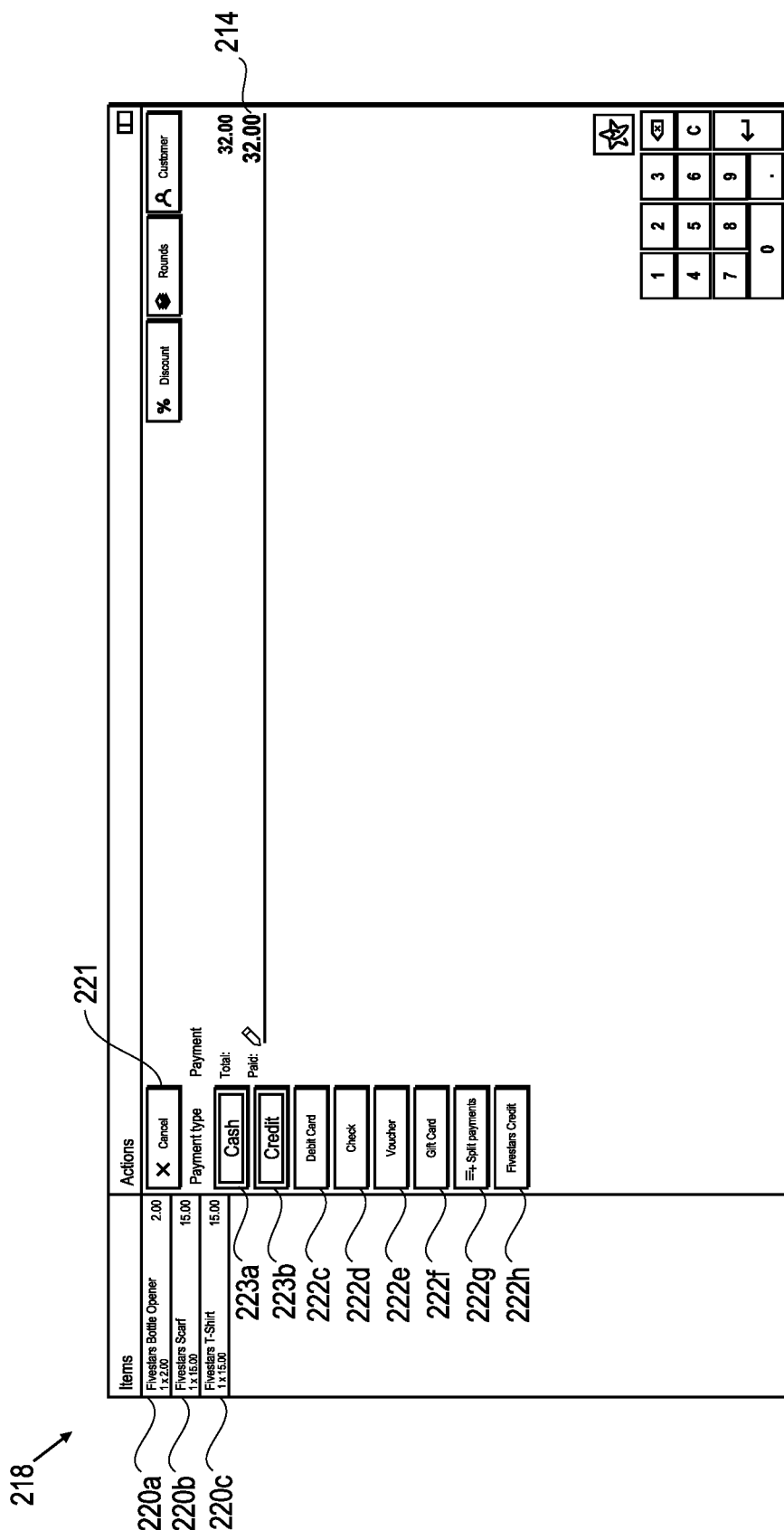

In the payment screen, items that have been selected for purchase may be displayed in a modified format (e.g., with price rather than the quantity of an item being the emphasized attribute). See, e.g., 220*a*, 220*b* and 220*c*. The total 214 (e.g., 32.00) may be displayed in a different position (e.g., off to the right side of the interface). Various user interface elements may be depicted for merchant 112 to select a payment type, for example, user interface element 223*a* corresponding to cash, user interface element 223*b* corresponding to credit, user interface element 222*c* corresponding to a debit card, user interface element 222*d* corresponding to check, user interface element 222*e* corresponding to a voucher, 222*f* corresponding to a gift card, 222*g* corresponding to a split payment option, and 222*h* corresponding to an "other tenders" option. In the example of FIG. 2D, the other tenders option is "Fivestars Credit" and represents funds that are processed by add-on application 106. The meaning of funds that are processed by add-on application 106 will be more clearly understood at the conclusion of the transaction explained in FIGS. 2A-2J.

Add-on application 106 may recognize the current state of the interface depicted in FIG. 2D to be in the "payment state" based on, for example, the particular position and/or color of cancel button 221 (as the particular position of the cancel button may be unique to the payment state), a comparison of a current fingerprint of the interface with a stored fingerprint that is associated with the payment state, etc. Any other characteristics of the interface depicted in FIG. 2D may also be used to identify the current state of the interface so long as those characteristics are unique to the interface depicted in FIG. 2D.

Upon recognizing the current state of the interface depicted in FIG. 2D to be in the "payment state," add-on application 106 may be configured to overlay the "cash" and "credit" buttons over the existing "cash" and "credit" buttons of the interface of point of sale application 104 using operating system overlay APIs or other means. In a web-based point of sale application, buttons or other user interface elements may be inserted via DOM injection. Button 223*a* shown in FIG. 2D is in fact a cash button that has been overlaid on top of the existing cash button of point of sale application 104 (not shown), and button 223*b* is a credit button that has been overlaid on top of the existing credit button of point of sale application 104 (not shown). The determination of where and when to insert buttons may involve machine learning, in which add-on application 106 is provided many examples of where and when to insert buttons (i.e., training data), and after parameters of the learning machine have been trained based on the training data, add-on application 106 may automatically insert buttons at the desired locations and at the desired times.

In the instant case, the color of the inserted buttons and the font of the text within the inserted buttons are distinct from the existing buttons of point of sale application 104 so that merchant 112 is aware that the cash and credit buttons have been provided by add-on application 106. However, such variation in the format of the inserted buttons is optional, and in another embodiment, an inserted button may be overlaid on top of an existing button and appear identical to the existing cash and credit buttons (or may be a transparent button overlaid on top of an existing button), so that merchant 112 may not be aware that the user interface has been modified. In another embodiment, rather than inserting buttons into the user interface of point of sale application 104, add-on application 106 may listen directly to clicks (and other selection commands) made upon the pre-existing buttons of point of sale application 104. The listening operation of add-on application 106 may use operating system mouse or touchscreen filters (e.g., filtering all mouse clicks, and transitioning processing of the transaction to the add-on application 106 when a click falls within the pixel coordinates that are known to be occupied by the pre-existing button of point of sale application 104). In the case of a point of sale application 104 operating within a web browser 108, the listening operation of add-on application 106 may be enabled by installing touch and click event listening hooks or modifying pre-existing touch and click event listening hooks on the DOM elements corresponding to the pre-existing buttons of point of sale application 104. Other configurable attributes of the buttons from add-on application 106 may include the size of a button, the text within a button, etc.

The reason for inserting the (overlay) buttons, or alternatively listening to and overriding clicks or touches made to the pre-existing point of sale application 104 buttons, is to enable the processing of the transaction to seamlessly transition from point of sale application 104 to add-on application 106. Upon the selection of the inserted cash button 223*a*, add-on application 106 may take over the processing of the transaction from point of sale application 104, more specifically the processing of a cash transaction. Upon the selection of the inserted credit button 223*b*, add-on application 106 may take over the processing of the transaction from point of sale application 104, more specifically the processing of a credit transaction. In the instant example of FIG. 2D, no button has been overlaid on top of user interface element 222c, so if merchant selects user interface element 222c, point of sale application 104 would continue the processing of the transaction, more specifically the processing of a debit transaction. However, in another embodiment, it is possible for a "Debit" button to be overlaid on top of user interface element 222c, and in such case, upon selection of an overlaid "Debit" button (not depicted), add-on application 106 would take over the processing of a debit transaction from point of sale application 104.

Indeed, whether a button is inserted and further the position of an inserted button is a user configurable option. In the embodiment of FIG. 2D, buttons from add-on application 106 are overlaid on top of existing buttons from point of sale application 104, so merchant 112 must select the buttons from add-on application 106 instead of the buttons from point of sale application 104 in the case of a cash or a credit transaction. However, in another embodiment (not depicted), buttons from add-on application 106 may be inserted adjacent to (i.e., next to) buttons from point of sale application 104, so merchant 112 is given the choice of continuing the processing of a transaction with either point of sale application 104 or add-on application 106.

Selection of any of the overlaid (or inserted) buttons 223a, 223b is one example of a "triggering event," and such selection indicates an intent of merchant 112 (or customer 124, in a customer-facing interface) to start using add-on application 106 to transfer an amount of funds (e.g., equal to the total of the purchase) from the customer to the merchant. Upon merchant 112 selecting credit button 223b, the transaction may transition from point of sale application 104 to add-on application 106. Add-on application 106 may then take a screenshot of the region around and including total 214 (e.g., 32.00), and use optical character recognition (OCR) to recognize total 214 so that add-on application 106 can determine how much to charge a credit card of customer 124. In addition, add-on application 106 may, at the same time, take one or more screenshots of regions that are depicted in other embodiments (e.g., a region around a sub-total, a region around a tax amount, a region around a tip amount, a region around a discount amount, and a region around the items listed in the current transaction), and use optical character recognition (OCR) to recognize and record these additional amounts and elements in the transaction history. User actions to specify such region around total 214 during an initial configuration process will subsequently be explained in FIG. 7C. The processing of a cash transaction (i.e., the process associated with the selection of cash button 223a) will subsequently be explained in FIGS. 3A-3D.

It is noted that OCR technology of add-on application 106 may also read amounts in the current order displayed in the user interface of FIG. 2D (e.g., total, tax, subtotal where available), and show those amounts to consumer 124 on consumer-facing terminal 114b, as well as record those amounts in rewards server 128, whether or not customer 124 signs up for a loyalty/rewards account.

Various embodiments to extract total 214 and additional elements which may include sub-total, tax, tips, discounts, and items in the order, in addition to the above described embodiment are possible. In one embodiment, add-on application 106 may take a screenshot of a specific location or locations, or the whole screen, send the screenshot to an OCR system like Google Cloud® OCR or Tesseract®, and read the amount to charge the user, which can be the total or part of the total, and the OCR system may send the total and other elements back to add-on application 106. In another embodiment, add-on application 106 may read the total and other elements in plain text rather than via OCR by using the UI introspection capabilities of the operating system to understand the UI element labels and contents. In another embodiment, add-on application 106 may listen in on the printer pipeline physically or virtually to understand the total to be charged and other elements (e.g., tip, tax, discounts applied, and items ordered) to be recorded along with the total in the order history of the add-on application 106 by reading from table checks and other pre-transaction printed materials. In another embodiment, add-on application 106 may allow merchant 112 to close the transaction entirely, by marking the tender as cash or other credit, or use its automation to close the transaction, entirely on the point of sale, then read the final receipt from the printer either via virtual print driver, software print interceptor, or hardware printer interceptor/printer tap so as to extract the total and other elements (e.g., tip, tax, discounts applied, and items ordered).

It is noted that the selection of credit button 223b is just one of many possible triggering events that may cause the processing of the transaction to transition from point of sale application 104 to add-on application 106. In another embodiment, a physical hardware button or buttons (e.g., hotkeys or other combinations on a keyboard or other input device) may be pressed by merchant 112 to cause the processing of the transaction to transition from point of sale application 104 to add-on application 106. For example, a hardware device can be connected through an API or SDK over the web or local connection or through a device-to-device connection.

In another embodiment, the triggering event may be an event that occurs earlier than the selection of the payment type. For example, the triggering event may be the selection of payment button 216 in FIG. 2C, and in response to the selection of payment button 216, a user interface similar to FIG. 2D may be displayed to select a payment type, but that user interface is provided by add-on application 106 instead of point of sale application 104. Therefore, it is understood that many possible triggering events are possible which cause the processing of the transaction to transition from point of sale application 104 to add-on application 106, and that the pressing of the overlaid credit button 223b is just one possible triggering event.

Figure 2E:
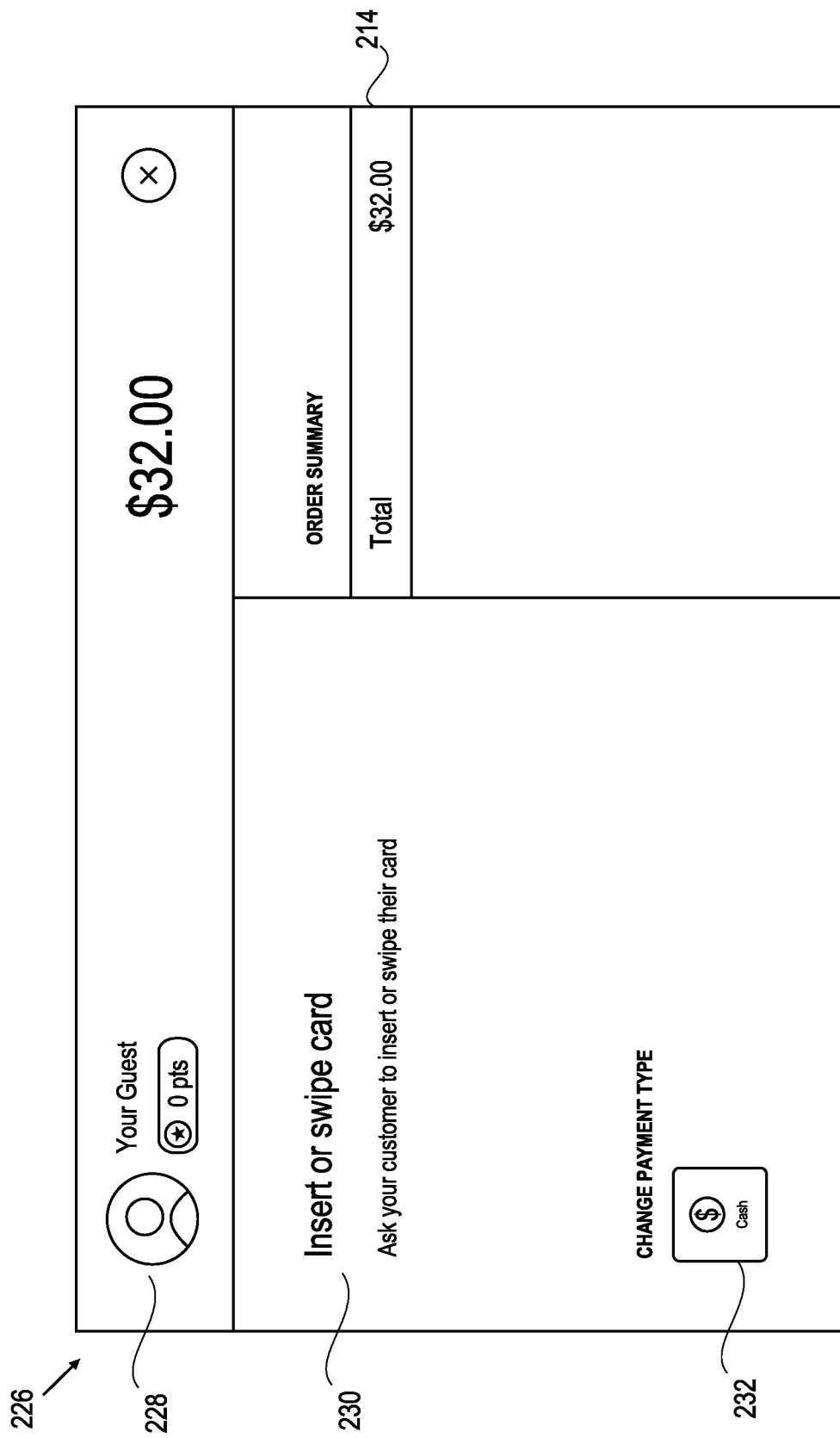

Further, in response to the selection of credit button 223b, add-on application 106 may provide the user interface depicted in screenshot 226 of FIG. 2E so as to facilitate the processing of a credit transaction. Such user interface may include user interface element 228 that is associated with customer 124. At this point in the example transaction, identifying information of customer 124 may not yet have been received, so user interface element 228 provides only a generic image of customer 124 and the generic customer name of "Your Guest" that is associated with 0 reward points. The user interface may include message 230 instructing merchant 112 to ask customer 124 to insert or swipe his/her credit card. The user interface may include a user interface element 232 allowing merchant 112 to change the payment type of customer 124 to cash. Total 214 (e.g., 32.00) may also be displayed in the user interface so that merchant 112 is aware of the amount that will be charged to the credit card of customer 124. This total amount may be determined via the OCR processing of total 214 depicted in FIG. 2D.

Figure 2F:
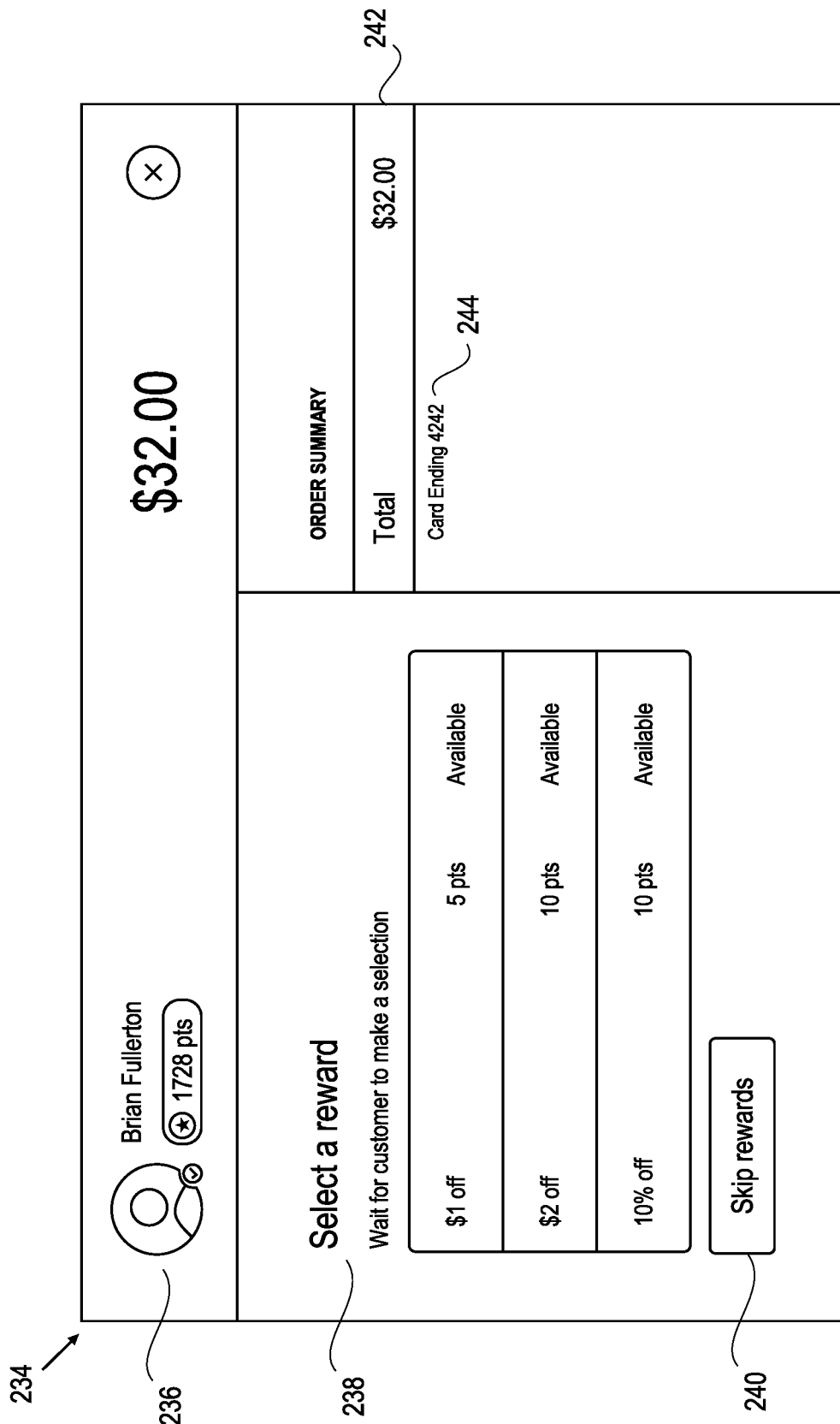

In response to a credit card of customer 124 being read by card reader 118a or 118b, add-on application 106 may provide the user interface depicted in screenshot 234 of FIG. 2F. User interface element 228 (of FIG. 2E) is now replaced with user interface element 236 (of FIG. 2F) with information associated with customer 124 (e.g., photograph, first and last name, number of reward points). In the instant example, add-on application 106 identifies customer 124 via the credit card number of customer 124. In other words, the credit card number of customer 124 was used as a login name for the rewards account of customer 124. Upon gaining access to the credit card number of customer 124, add-on application 106 may retrieve other identifying and/or personal information of customer 124 from rewards server 128 (e.g., photograph, first and last name, number of reward points). In one embodiment, a customer identifier is computed as a hash of the credit card number, and such customer identifier is used to identify customer 124 in rewards server 128 (e.g., a rewards account of customer 124 is labeled with via such customer identifier).

It is noted that in the above example in FIG. 2F, the credit card of the customer had already been linked to a rewards account of customer 124. If, however, the credit card of customer 124 were not yet linked to a rewards account, a user interface (not depicted) may be presented after customer 124 swipes his/her card. In such user interface, customer 124 may be provided numeric keys to input his/her phone number (or other identifying information). Upon receiving the customer's phone number or other identifying information, the customer's credit card may be linked to an existing (or newly created) rewards account that is associated with the customer's phone number or other identifying information, and the process may proceed to the user interface of FIG. 2F regarding the selection of a reward. If customer 124 chooses to not link his/her credit card with any phone number or other identifying information, the customer may be provided with an option to skip entry of same and the process may proceed directly to the user interface of FIG. 2G regarding the entry of tip amount.

The interface in FIG. 2F may also include user interface elements 238 that allow merchant 112 to redeem reward points on behalf of customer 124. Alternatively and/or in addition, similar user interface elements may be presented on display device 116b (i.e., the customer-facing display) so as to allow customer 124 to directly make a selection to redeem reward points. The interface in FIG. 2F may also include user interface element 240 to allow merchant 112 to skip the redemption of reward points. Total 242 (e.g., $32.00) may be presented again, and below total 242, the payment type may be specified 244 (e.g., Card Ending 4242). In the present example, the button 240 to skip the redemption of the rewards is selected, since the process to redeem rewards will be described in association with FIGS. 4A-4J below.

Figure 2G:
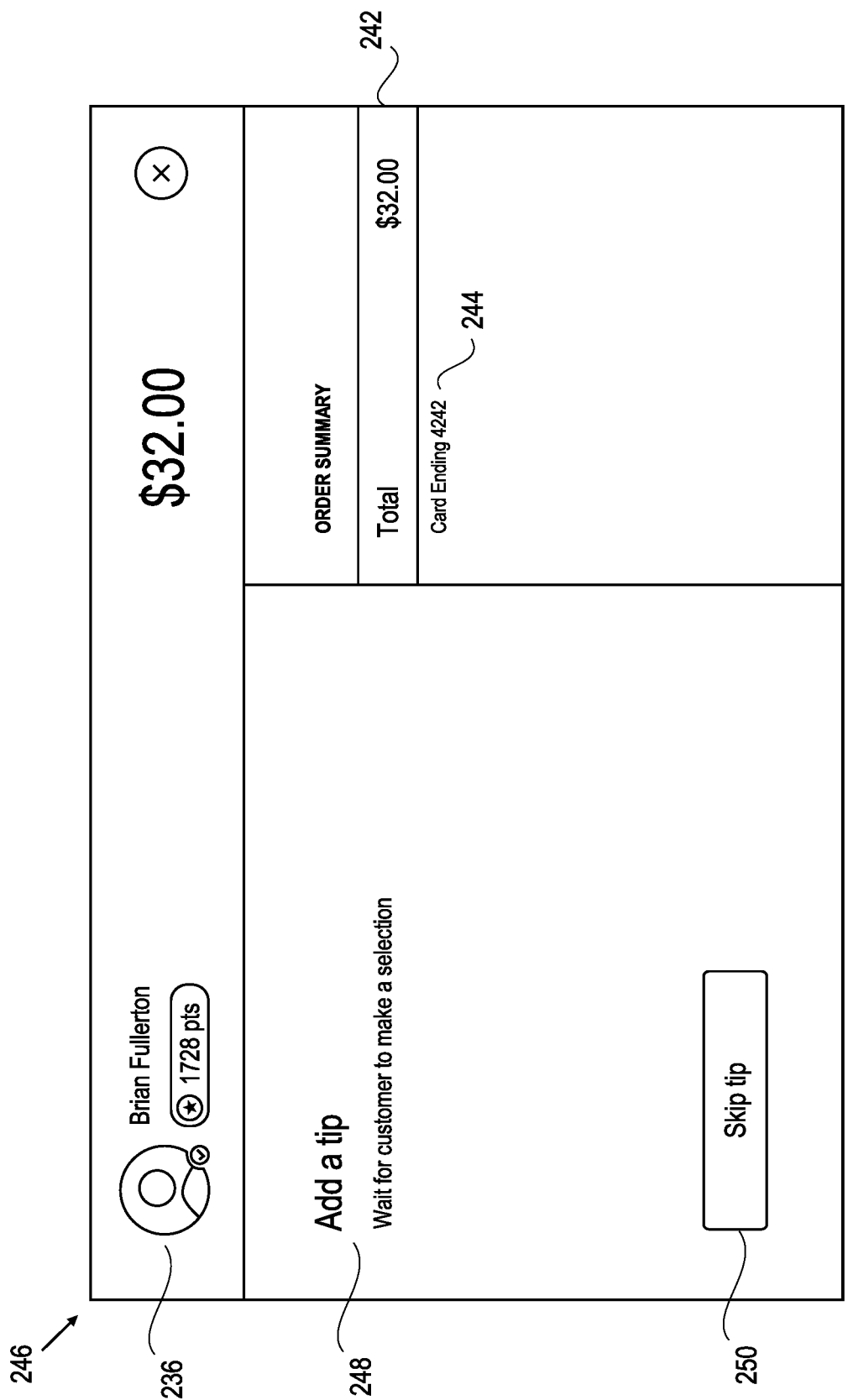

Upon selection of button 240 to skip the redemption of the rewards, add-on application 106 may provide the user interface depicted in screenshot 246 of FIG. 2G. Such user interface may include message 248, instructing merchant 112 to wait for customer 124 to add a tip. If customer 124 opts to not provide a tip, merchant 112 may select user interface element 250 to skip the payment of a tip. In another embodiment, upon customer 124 specifying that no tip will be provided, such action of customer 124 may cause the automatic selection of user interface element 250 to skip the payment of a tip, or equivalently, add-on application 106 may receive the customer's instruction and proceed with the payment transaction with the understanding that no tip will be collected. It is noted that the user interface of FIG. 2G to collect a tip may be omitted in certain environments (e.g., a grocery store).

Figure 2H:
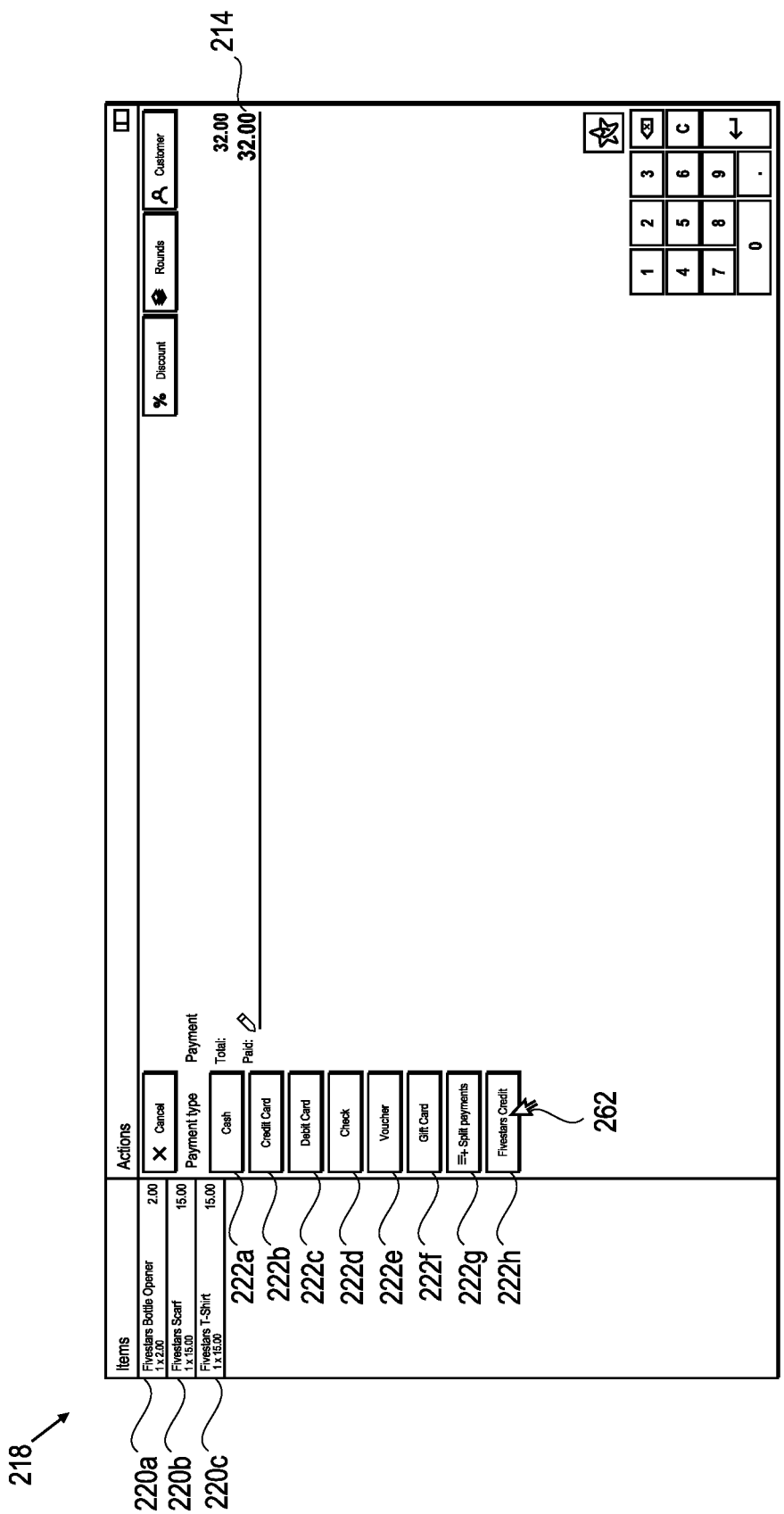
Figure 2I:
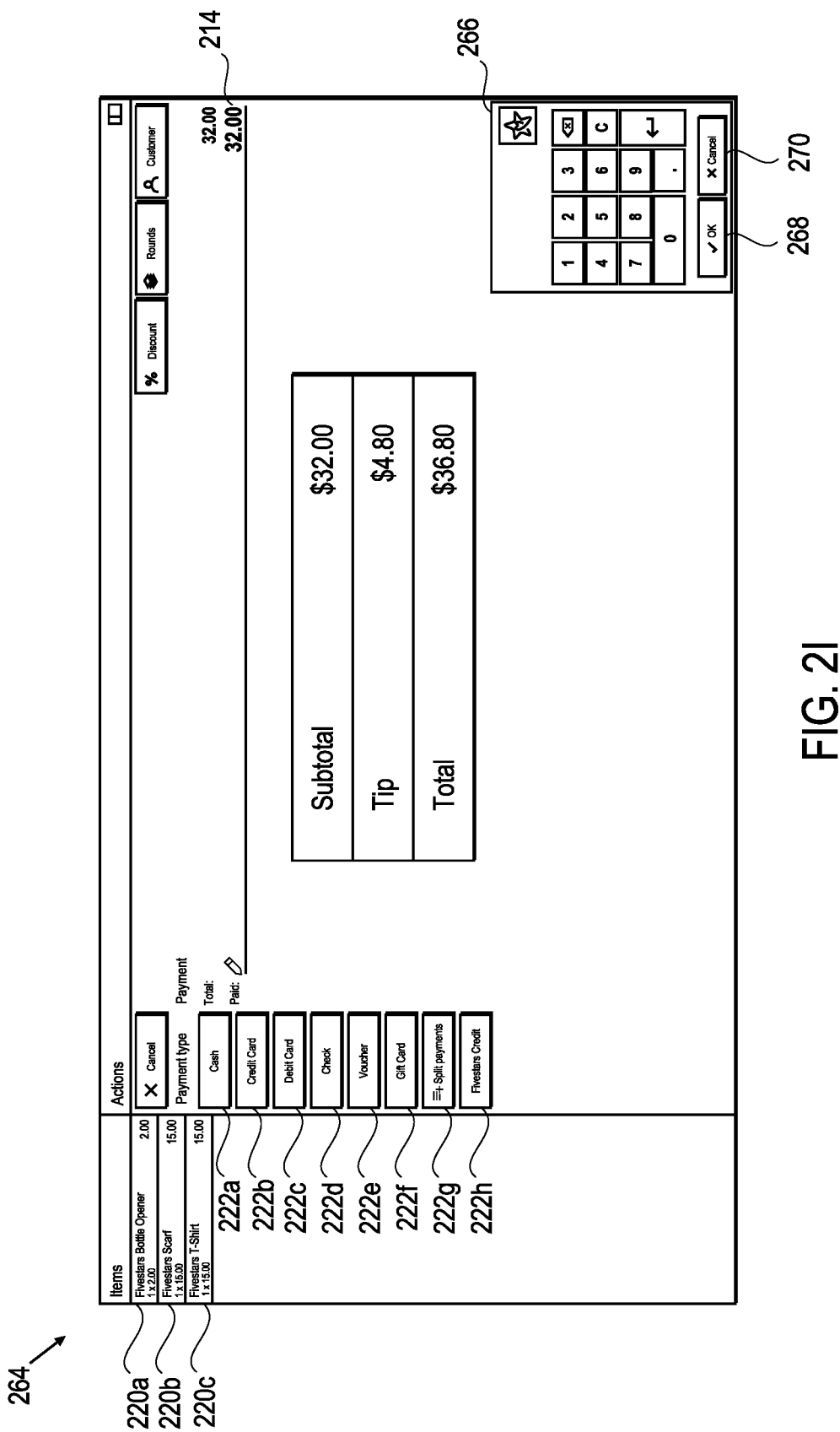
Figure 2J:
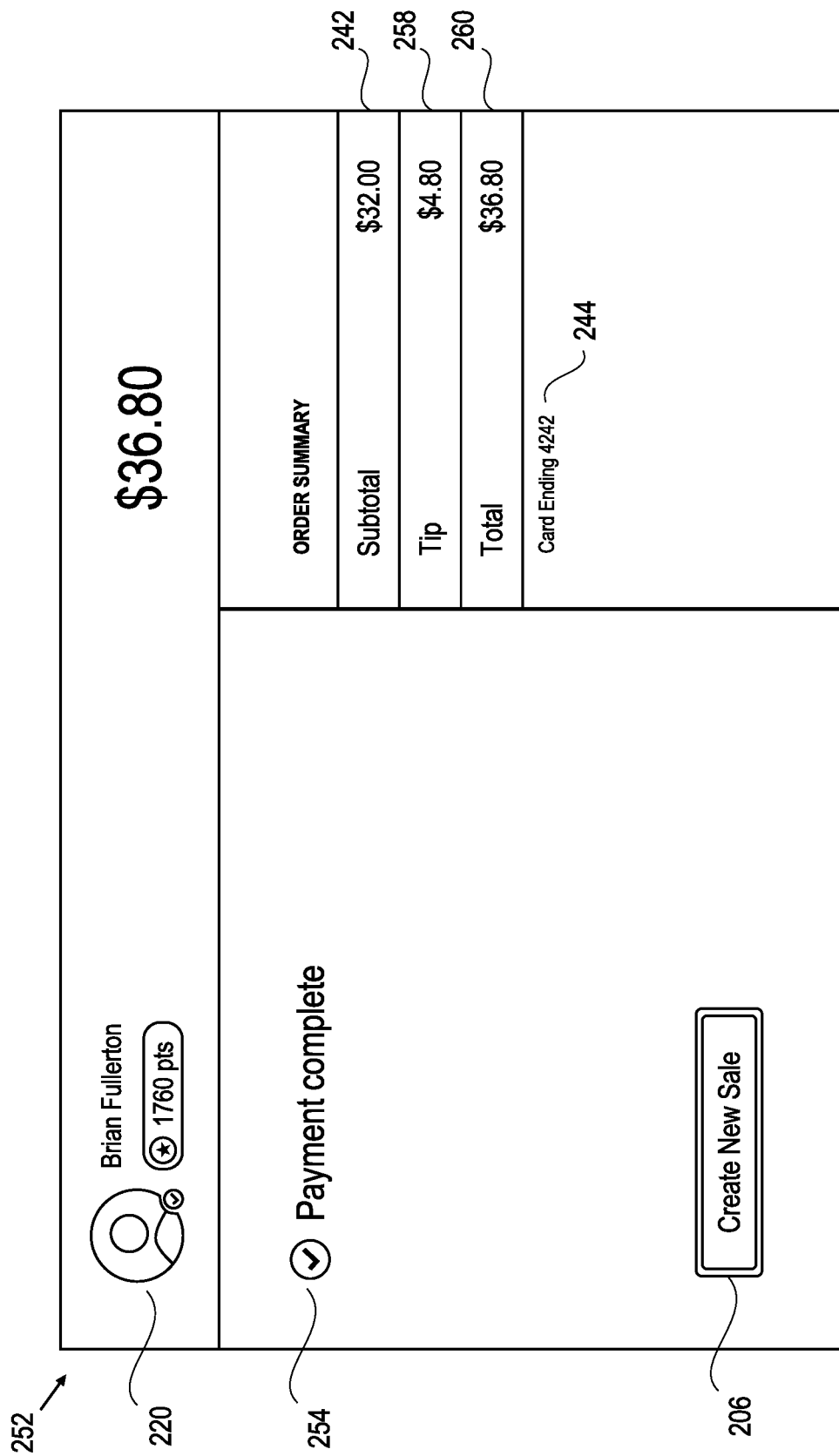

In the present example, customer 124 uses terminal 114b to specify a tip amount of $4.80 (the tip amount shown in the subsequent user interface of FIG. 2J). Of course, a tip is typically not paid by customers in the purchase of a T-shirt, bottle opener and a scarf, but a tip is paid in the instant example to illustrate the processing associated with the payment of a tip.

Upon specifying a tip by customer 124 via terminal 114b, add-on application 106 may charge the total amount (e.g., $36.80) to the credit card of customer 124, and complete the processing of the payment. More specifically, add-on application 106 may process the payment (or other transaction) through its payment facilitator (PayFac), independent sales organization (ISO) or independent software vendors (ISV) payment rails. In another embodiment, add-on application 106 may process the payment (or other transaction) through the merchant's pre-existing payment merchant account. In another embodiment, add-on application 106 may process the payment (or other transaction) by collecting the payment card data and final total, including tip, and sending directly to point of sale application 104 itself to process the transaction, or sending that payload to the point of sale's cloud or central server, or another cloud or central payment server.

Upon completion of the processing of the payment, add-on application 106 may return a result of the payment to point of sale application 104, as described in FIGS. 2H and 2I. FIG. 2H depicts a user interface of point of sale application 104, similar to the user interface depicted in FIG. 2D prior to the occurrence of the triggering event. User actions may be emulated by add-on application 106 in the user interface of FIGS. 2H and 2I in order to inform point of sale application 104 of an amount paid by customer 124 and/or whether or not the transaction was completed by add-on application 106. A monitoring process of add-on application 106 (similar to or identical to the process used to determine the state of the user interface) may be used to determine the location of user interface element 222h button (e.g., the "Fivestars Credit" button). Cursor 262 may then be positioned on Fivestars Credit button 222h, and a selection command (e.g., mouse click, tap on touchscreen, etc.) of cursor 262 may be performed by add-on application 106.

Upon an emulated user action to select Fivestars Credit button 222h, point of sale application may provide the user interface depicted in screenshot 264 of FIG. 2I. Before emulating any additional user actions, add-on application 106 may verify the user interface displayed in response to selecting Fivestars Credit button 222h. That is, add-on application 106 may retrieve a stored (i.e., pre-determined) screenshot of the user interface that is expected in response to selecting Fivestars Credit button 222h, and compare the interface (e.g., or compare certain selected attributes thereof) depicted in FIG. 2I to the expected user interface. If the verification step fails (e.g., a discrepancy is determined based on the comparison), the process described in FIG. 2H may be attempted again, or the process may be aborted. If the verification step is successful, various aspects of the completed payment may be input into the interface of FIG. 2I, such as a subtotal (e.g., $32.00), a tip amount (e.g., $4.80) and a total amount (e.g., $36.80) that was paid by customer 124. In certain embodiments, the input of a tip amount into the interface of FIG. 2I may be omitted and/or may not be possible. It is noted that the input of these amounts may be performed via emulated user actions (e.g., emulated keypresses, emulated mouse clicks of keypad 266 depicted in FIG. 2I, etc.). Upon the various aspects of the completed payment being entered into the user interface, user interface element 268 (e.g., "OK" button) may be selected (e.g., by an emulated mouse click). If for some reason the communication of the transaction result to point of sale application 104 needs to be aborted, user interface element 270 (e.g., "Cancel" button) may be selected (e.g., by an emulated mouse click).

Following selection of the OK button, add-on application 106 may provide the user interface depicted in screenshot 252 of FIG. 2J. Such user interface may include message 254 that the payment is complete, as well as an order summary with the subtotal amount 242 (e.g., "$32.00"), tip amount 258 (e.g., "$4.80") and total amount (e.g., "$36.80"). At some point after the payment has been processed, add-on application 106 may also store information associated with the transaction with the rewards account of customer 124 (e.g., total paid, tip paid, items purchased, reward points earned from the purchased, etc.).

In view of the description of the user interfaces depicted in FIGS. 2H and 2I, the purpose for Fivestars Credit button 222h should now be more apparent. Such button may not be used to select a type of payment to pay for a transaction (as was the case for buttons 223a, 223b, and the other payment buttons), but rather may be used to select a type of payment that was used to pay for a transaction. Stated differently, such button may be used to navigate to one or more interfaces to perform an accounting step (e.g., for point of sale application 104 to be updated on whether or not the transaction was successfully processed by add-on application 106 and if so, the amount that was paid by customer 124). In some embodiments, other buttons may also be used to navigate to one or more interfaces to perform an accounting step. For example, native cash button 222a may be selected to navigate to one or more interfaces to, in the typical circumstance, input an amount of cash that was collected by merchant 112. However, to complete the instant accounting step, the amount collected by add-on on 106 may be entered in lieu of an amount of cash. Such practice may allow point of sale device 102 to properly account for the dollar value of the transaction, but it may result in a discrepancy in the various amounts of the tender types (e.g., amount of cash in cash drawer may not be what is expected). Further, selection of native cash button 222a, in most instances, would cause cash drawer 122 to open, so merchant 112 would additionally need to close cash drawer 112 during such accounting step that makes use of native cash button 222a. As another example, native credit button 223a may also be used to complete the instant accounting step if a null-transaction option is provided and the purchase amount can be entered without actually charging a credit card.

It is noted that there are various ways to emulate user actions. In one embodiment, a physical device may be attached to point of sale device 102 that can send physical keyboard and mouse signals to point of sale device 102 to control point of sale application 104 and close-out the transaction in the appropriate amount. In another embodiment, add-on application 106 may use browser keyboard and mouse press events to control the close-out flow of the point of sale (only in the cases that point of sale application 104 is implemented as a browser plug-in). In another embodiment, add-on application 106 could also interface with an API or SDK on point of sale device 102 or on the web to close out a specific amount on point of sale application 104.

It is further noted that, in another embodiment (not depicted), it is possible to have a "Fivestars payment" button (distinct from Fivestars Credit button 222h used for accounting) in the user interface of FIG. 2D, and no overlays may be present over the native cash and credit buttons. Selection of the Fivestars payment button in the context of FIG. 2D may result in a triggering event, causing add-on application 106 to take over the processing of a payment transaction. At a later time point, such as in the interface of FIG. 2E, merchant 112 may then be offered the selection between the cash payment type and the credit payment type.

FIGS. 3A-3D depict screenshots of user interfaces to process a cash transaction. For conciseness of explanation, the process explained in FIGS. 3A-3D omits the above-described interface in which add-on application 106 is notified about the start of a new sale (e.g., FIG. 2B) and omits the above-described interface for selecting items to purchase (e.g., FIG. 2C). Instead, the process of FIGS. 3A-3D begins in the payment state, after an order has already been received to purchase a Fivestars bottle opener.

Upon merchant 112 selecting cash button 223a, the processing of the transaction may transition from point of sale application 104 to add-on application 106. Again, it is noted that the selection of cash button 223a is just one of many possible triggering events that may cause the processing of the transaction to transition from point of sale application 104 to add-on application 106. In another embodiment, a physical hardware button that is associated with the processing of a cash transaction may be pressed by merchant 112 to cause the processing of a cash transaction to transition from point of sale application 104 to add-on application 106.

Add-on application 106 may then take a screenshot of the region around and including total 302 (e.g., 2.00), and use optical character recognition (OCR) to recognize total 302 within the screenshot in order for add-on application 106 to determine how much cash to request from customer 124. Add-on application 106 may then provide the user interface depicted in screenshot 304 of FIG. 3B so as to facilitate the processing of a cash transaction. Such user interface may include user interface element 228 that is associated with customer 124. At this point in the example transaction, identifying information of the customer may not yet have been received, so user interface element 228 provides only a generic image of customer 124 and the generic customer name of "Your Guest" that is associated with 0 reward points. The user interface may include message 306, requesting merchant 112 to ask customer 124 whether he/she would like to join the rewards program (or ask customer 124 whether he/she has already joined the rewards program), and if so, to provide his/her mobile number. Thus, in the context of a cash transaction, the mobile number of customer 124 may be used as the user login for the rewards account of customer 124. If customer 124 does not wish to join the rewards program (or declines to provide his/her mobile number associated with his/her existing rewards account), merchant 112 may select user interface element 308 to skip the processing associated with the rewards program. The user interface may also include user interface element 310 allowing merchant 112 to change the payment type of customer 124 to card (e.g., credit card). Total 302 (e.g., 2.00) may also be displayed in the interface of FIG. 3B so that merchant 112 is aware of the amount of cash to collect from customer 124. This total amount may be determined by the above-described OCR of total 302 depicted in FIG. 3A. Message 312 may be provided, indicating that the payment method for the transaction is cash. In the example transaction, the option to "skip rewards" is selected, as the reward processing will be described below in association with FIGS. 4A-4J.

Figure 3A:
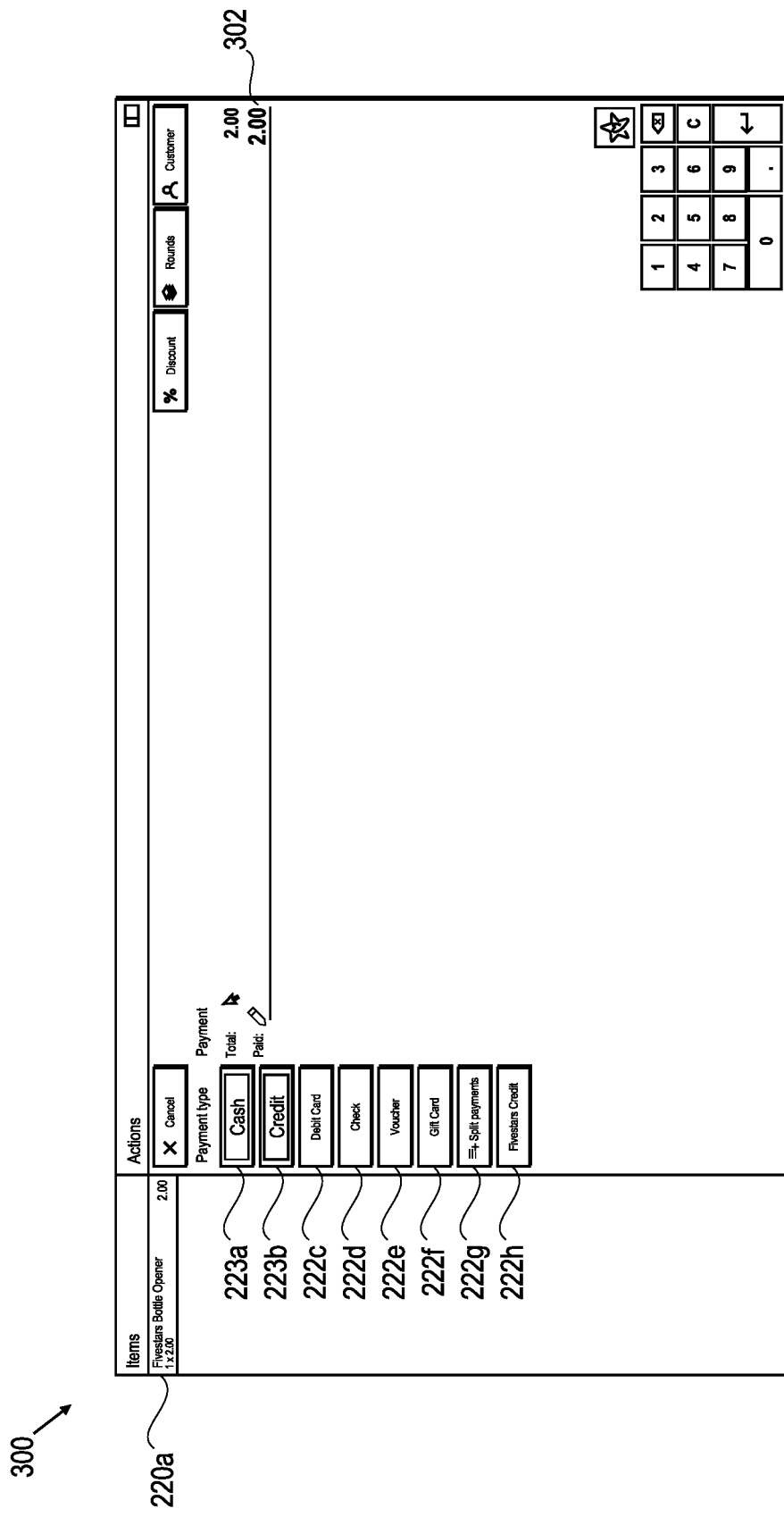
FIGS. 3A-3D depict screenshots of user interfaces to process a cash transaction, in accordance with one embodiment of the invention.
Figure 3B:
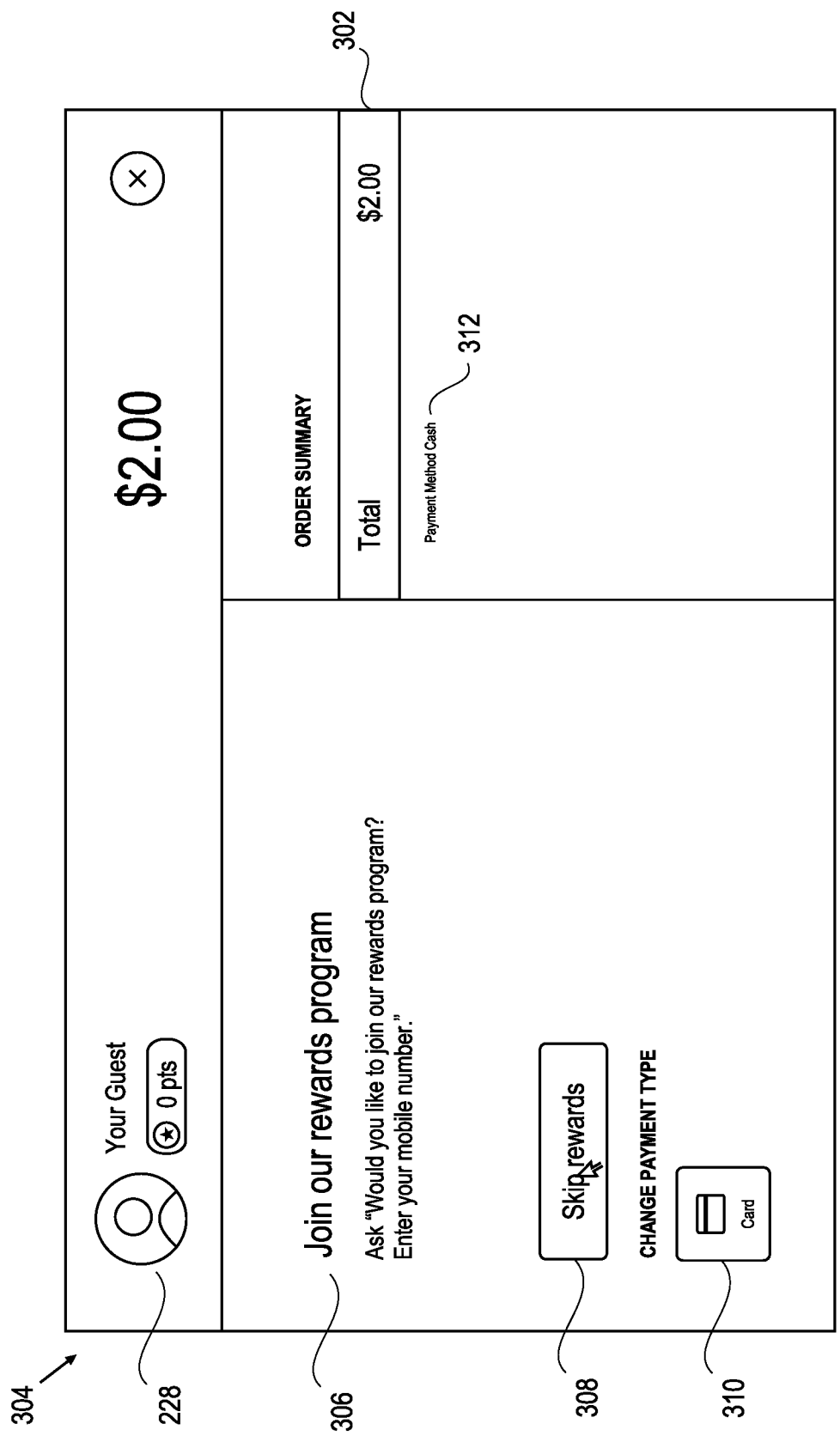
Figure 3C:
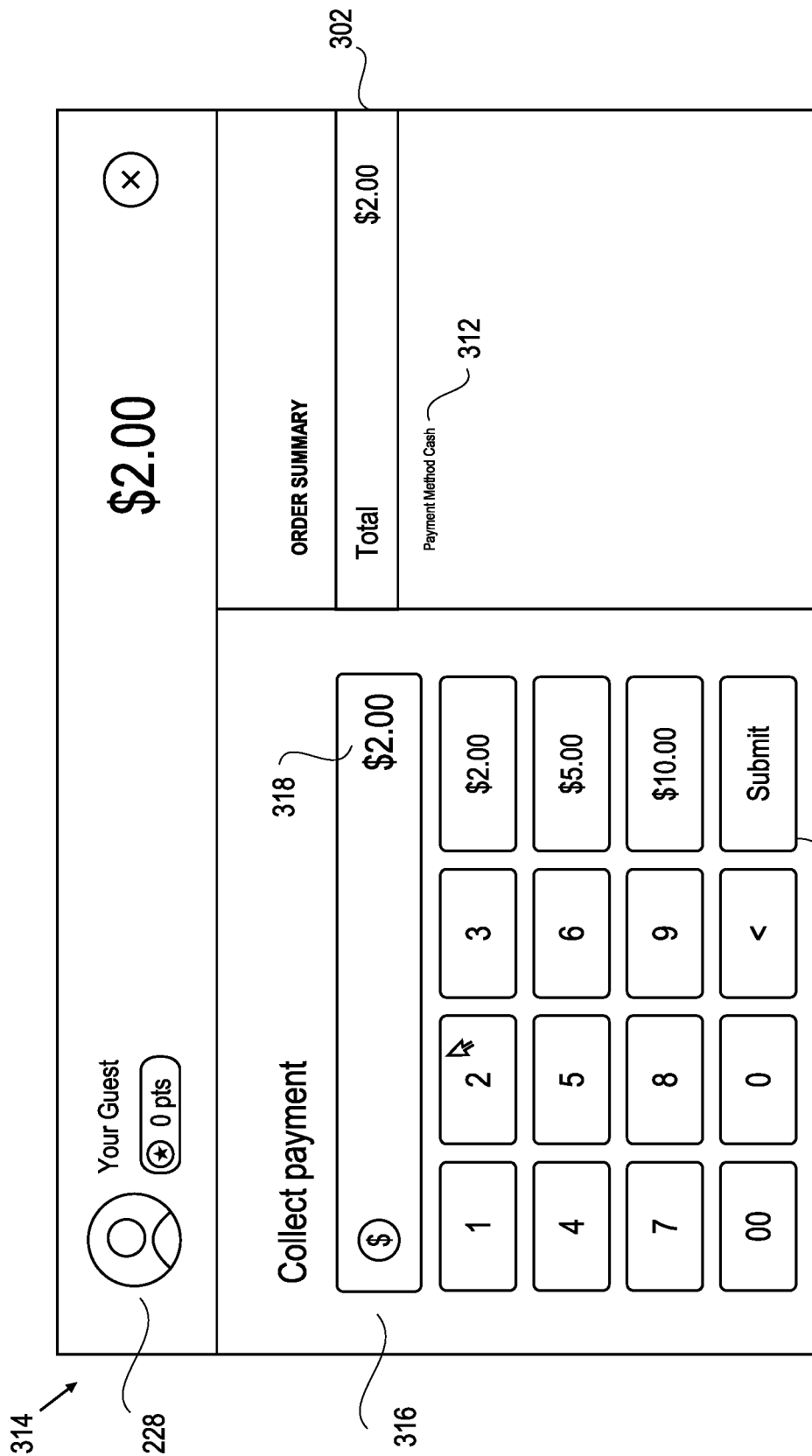

Upon selection of button 308 to skip rewards, add-on application 106 may provide the user interface depicted in screenshot 314 of FIG. 3C. Such user interface may provide user interface elements allowing merchant 112 to enter the amount of cash that customer 124 has paid. In the instant example, customer 124 pays $2.00 in cash, so merchant 112 enters $2.00 for the amount paid 318. As will be more clearly understood from FIG. 3D, the amount paid need not be exactly equal to the purchase total. If the amount paid exceeds the purchase total, merchant 112 will be instructed to provide change to customer 124 (as shown below in FIG. 3D). Upon selection of user interface element 320 (e.g., submit button), the processing of the cash payment is complete, and add-on application 106 may return a result of the cash payment to point of sale application 104. Such a process may be similar to the process described above in FIGS. 2H and 2I, and hence will not be described in detail for the sake of conciseness.

Figure 3D:
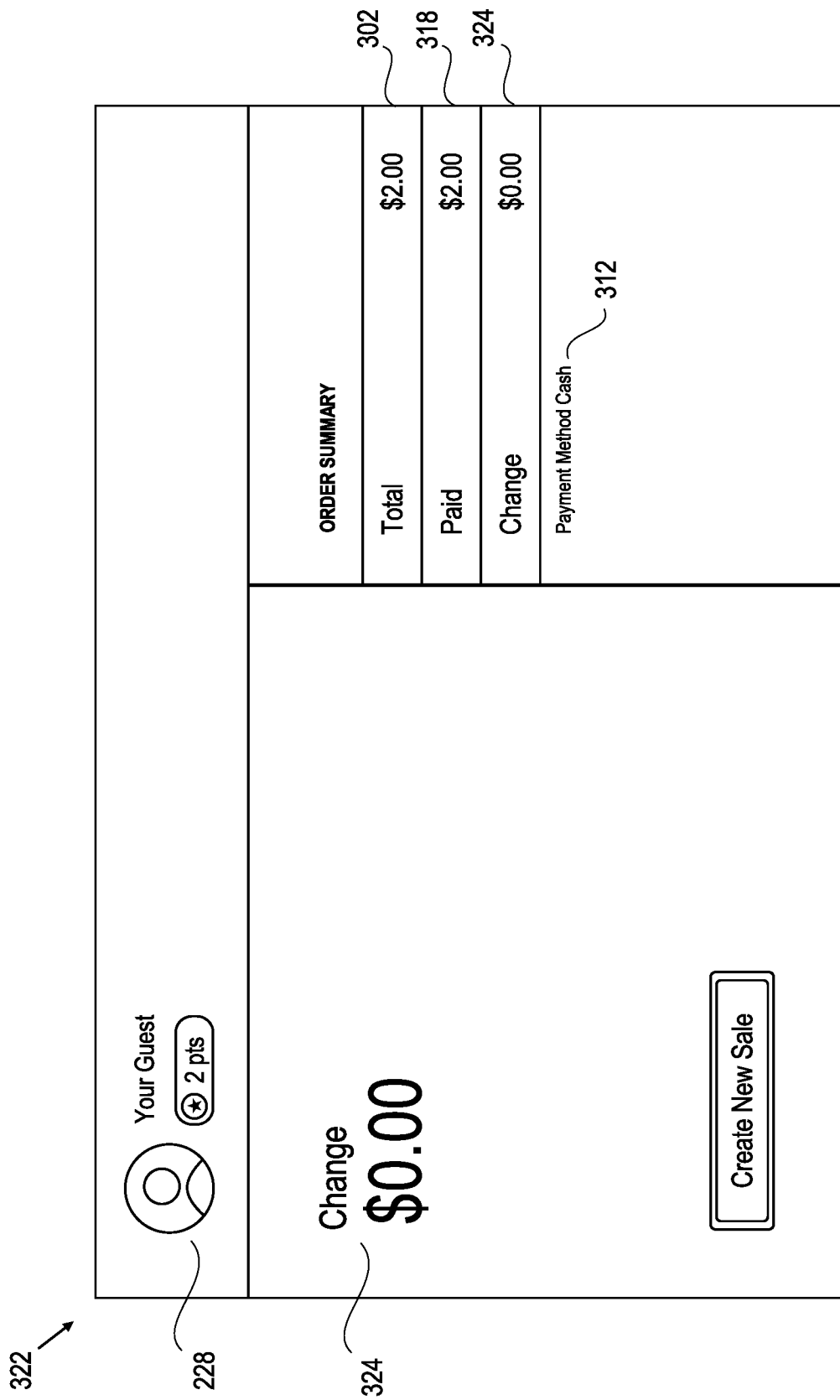

Upon the accounting process with the point of sale application 104 concluding, add-on application 106 may provide the user interface depicted in screenshot 322 of FIG. 3D. Such user interface may include an amount of change that merchant 112 has provided (or should provide) to customer 124 (e.g., $0.00 change in the instant example), as well as an order summary with the total amount of the purchase (e.g., $2.00), the amount paid by customer 124 (e.g., $2.00) and the change amount ($0.00). At some point after the payment has been processed, add-on application 106 may store information associated with the transaction with the rewards account of customer 124 (e.g., total paid, items purchased, reward points earned from the purchased, etc.).

FIGS. 4A-4J depict screenshots of user interfaces to process a transaction involving the redemption of rewards. For conciseness of explanation, the process explained in FIGS. 4A-4J omits the above-described interface in which add-on application 106 is notified about the start of a new sale (e.g., FIG. 2B). Instead, the process of FIGS. 4A-4J begins with the user interface in the product selection state, as depicted in screenshot 400, after two items have been selected for purchase. In particular, user interface element 210b (featuring a "Fivestars Bottle Opener") and user interface element 210d (featuring a "Fivestars Bomber Jacket) were selected. In a left panel of the interface, the quantity and price of the selected items are displayed (212b, 212d) along with total 402 (e.g., 102.00). Upon selection of user interface element 216 (e.g., "F10 payment" button), the interface may transition to the payment screen depicted in screenshot 404 of FIG. 4B.

In the payment screen, items selected for purchase again may be displayed in a modified format (e.g., with price rather than the quantity of an item being the emphasized attribute). See, e.g., 220d and 220b. The total 406 (e.g., 102.00) may be displayed in a different position (e.g., off to the right side). Upon merchant 112 selecting credit button 223b, the processing of the transaction may transition from point of sale application 104 to add-on application 106 (i.e., one example of a triggering event). Add-on application 106 may then take a screenshot of the region around and including total 406 (e.g., 102.00), and use OCR to recognize total 406 within the screenshot in order to determine how much to charge a credit card of customer 124. Add-on application 106 may then provide the user interface depicted in screenshot 408 of FIG. 4C so as to facilitate the processing of a credit card transaction. Such user interface may include message 230, requesting merchant 112 to ask customer 124 to insert or swipe his/her credit card.

Figure 4A:
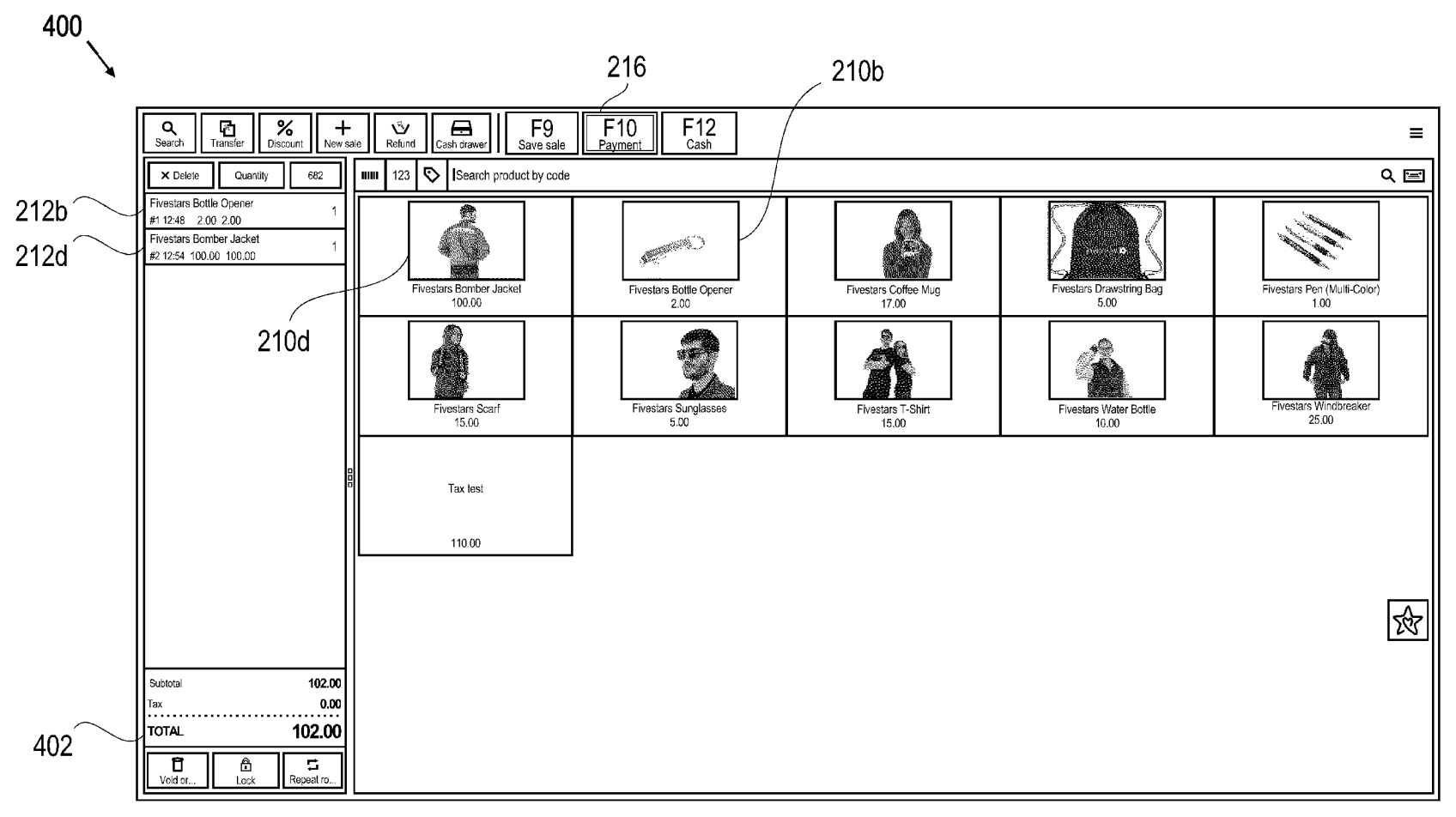
Figure 4B:
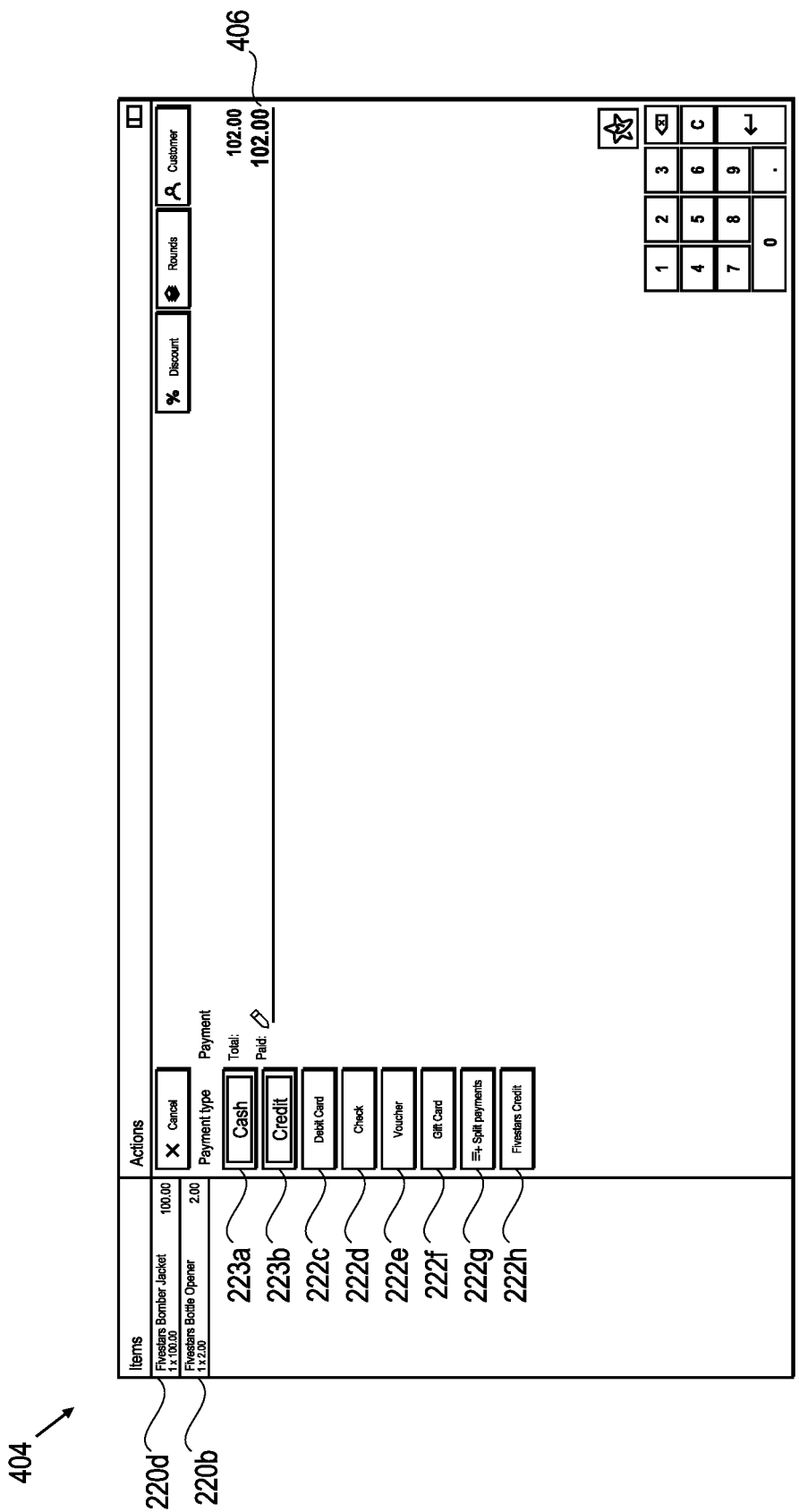
Figure 4C:
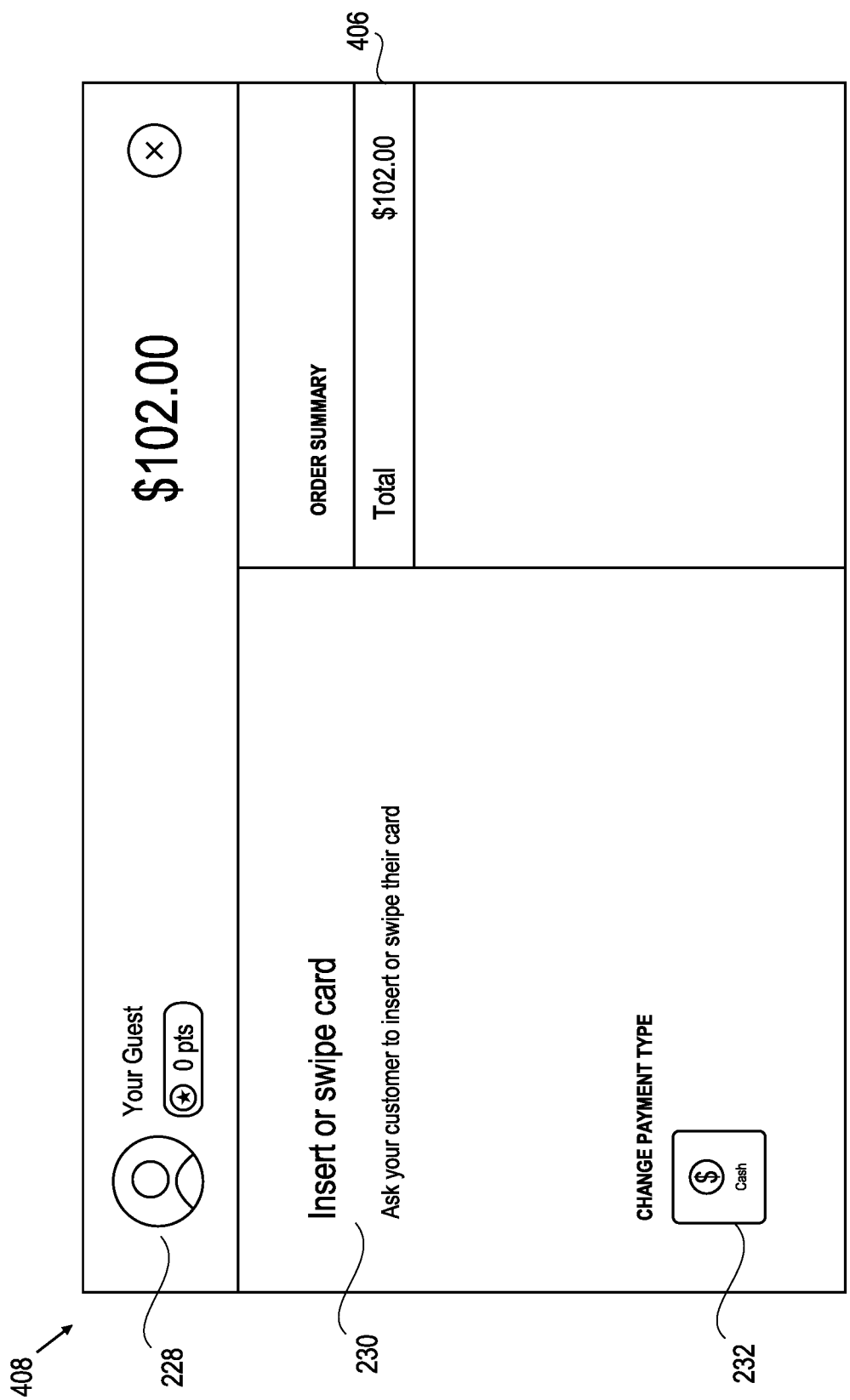
Figure 4D:
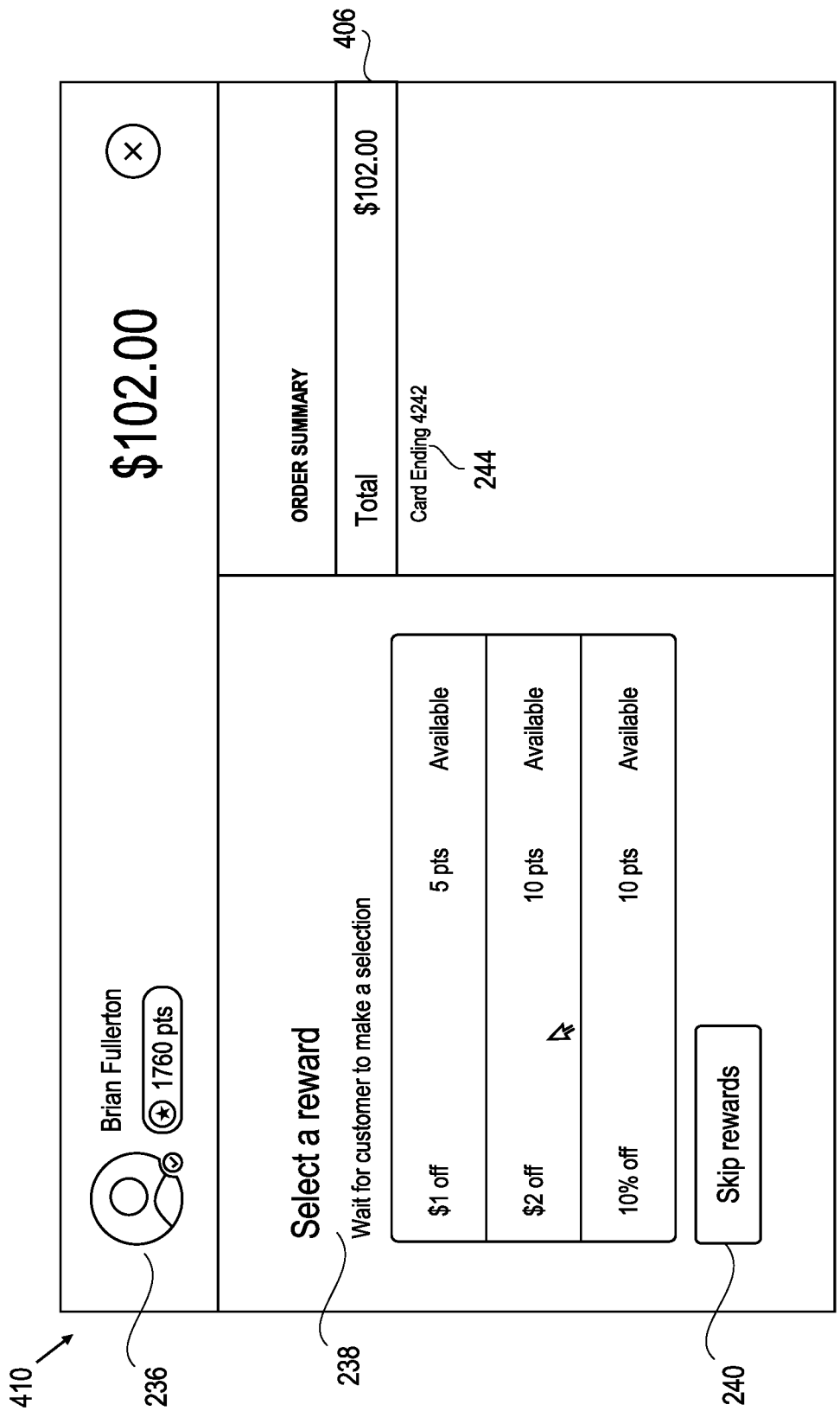

In response to a credit card of customer 124 being read by card reader 118a or 118b, add-on application 106 may display the user interface depicted in screenshot 410 of FIG. 4D. Such user interface may include user interface elements 238 that allow merchant 112 to redeem reward points on behalf of customer 124. Alternatively and/or in addition, similar user interface elements may be presented on display device 116b (i.e., the customer-facing display) to allow customer 124 to directly make a selection to redeem reward points. In the present example, the option to redeem ten reward points in exchange for a $2 discount is selected by customer 124.

Figure 4E:
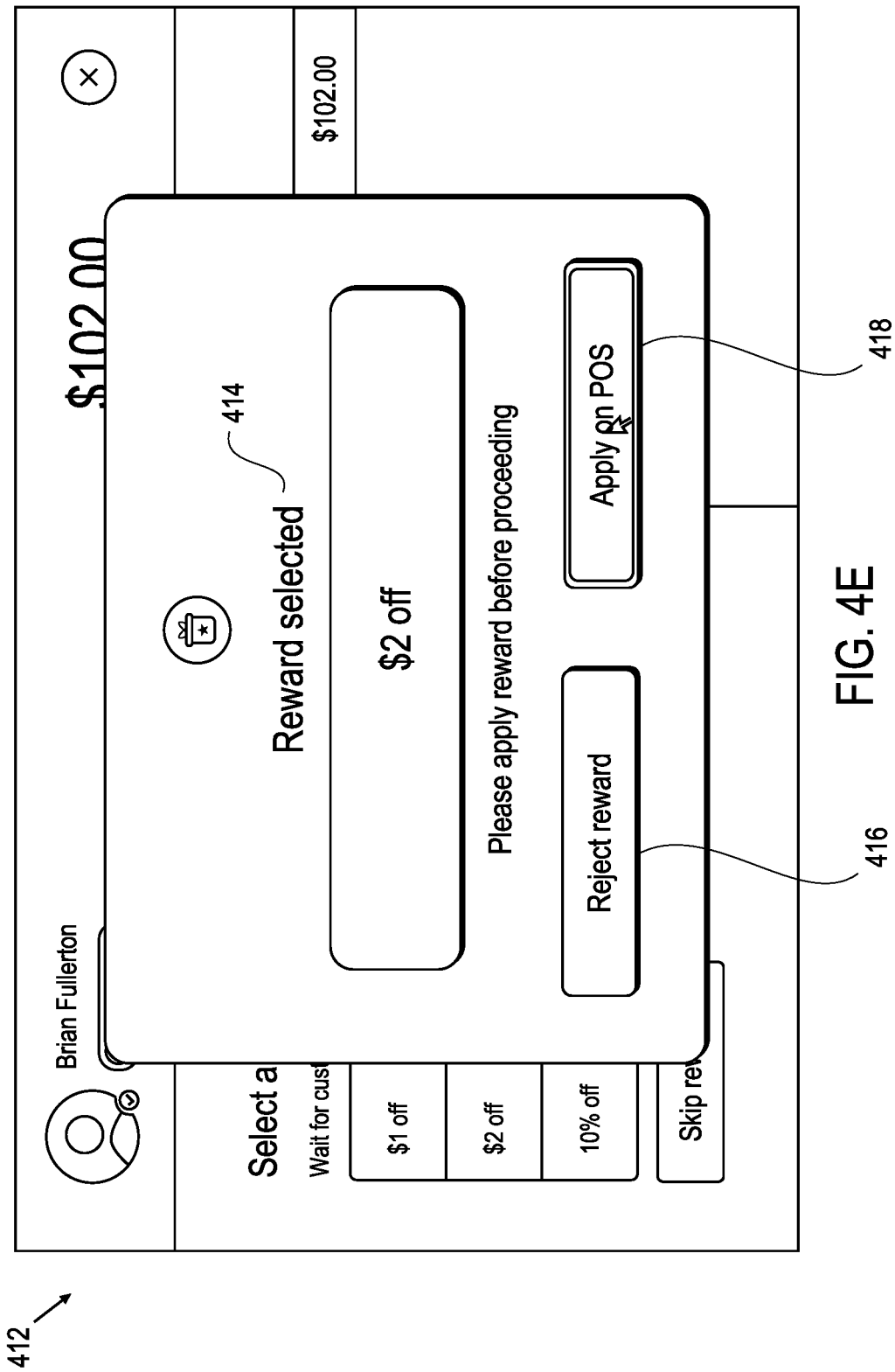
Figure 4F:
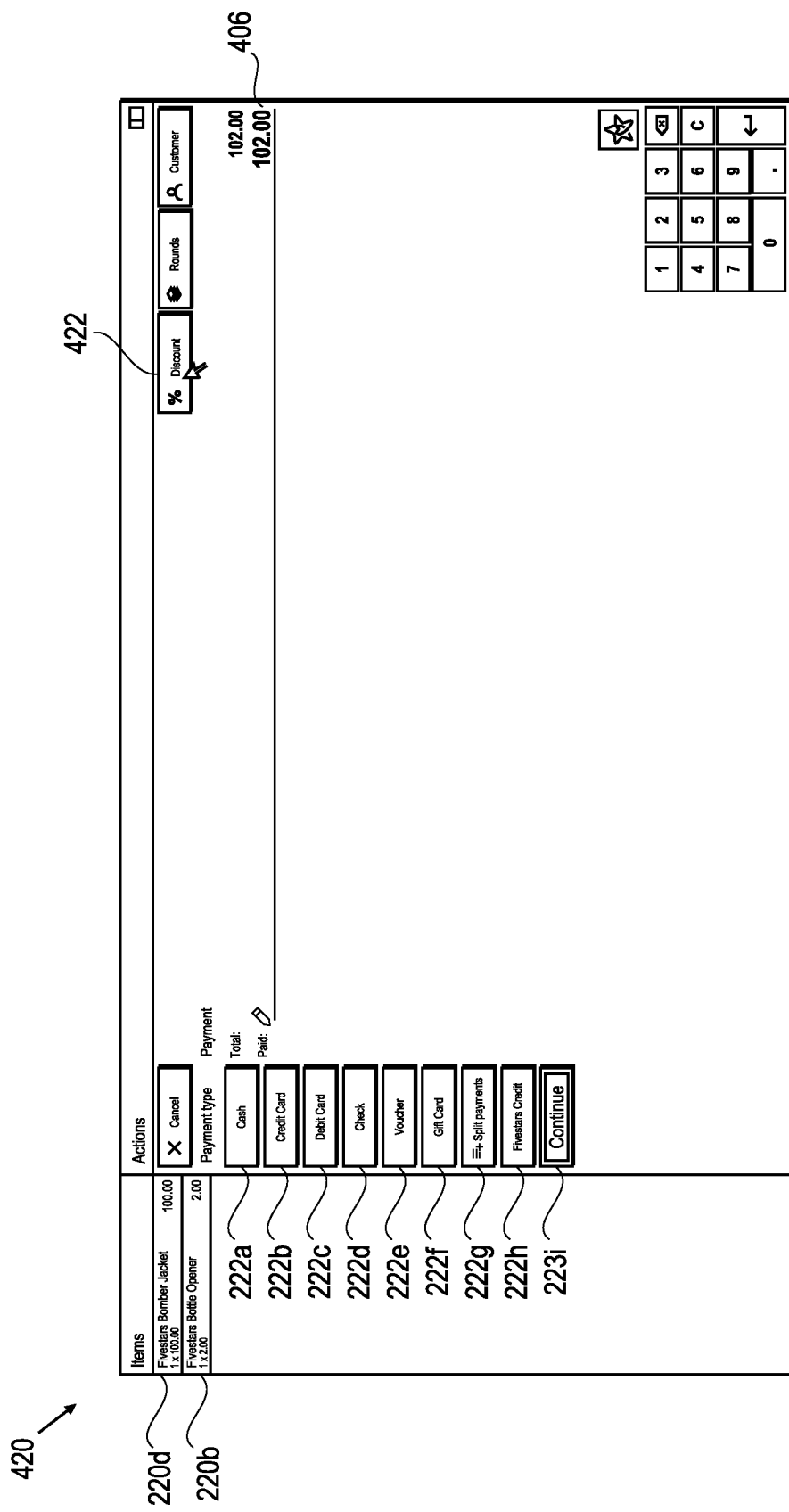

Upon the selection of a rewards option, add-on application 106 may provide the user interface depicted in screenshot 412 of FIG. 4E, including message 414 that notifies merchant 112 of the reward redemption that is requested by customer 124 (e.g., $2 off). Such user interface may provide merchant 112 with an opportunity to either reject the customer's request (by selecting user interface element 416), or proceed to a process to apply the rewards (by selecting user interface element 418). In the instant example, merchant 112 selects user interface element 418 in order to apply the rewards on point of sale device 102.

Upon selection of button 418 labeled "Apply on POS," the processing of the transaction may transition from add-on application 106 back to point of sale application 104. More specifically, point of sale application 104 may provide the user interface depicted in screenshot 420 of FIG. 4F. Such user interface may be similar to the earlier presented interface depicted in the screenshot of FIG. 4B (just prior to the occurrence of the triggering event), except that the existing cash button 222a and credit card button 222b of point of sale application 104 are displayed (i.e., overlays 223a and 223b are no longer present), and a user interface element 223i labeled "Continue" has been inserted into the interface by add-on application 106. The use of continue button 223i will be explained below in FIG. 4H. The user interface also includes user interface element 422 labeled "discount" for merchant 112 to navigate to a user interface to apply the rewards requested by customer 124.

Figure 4G:
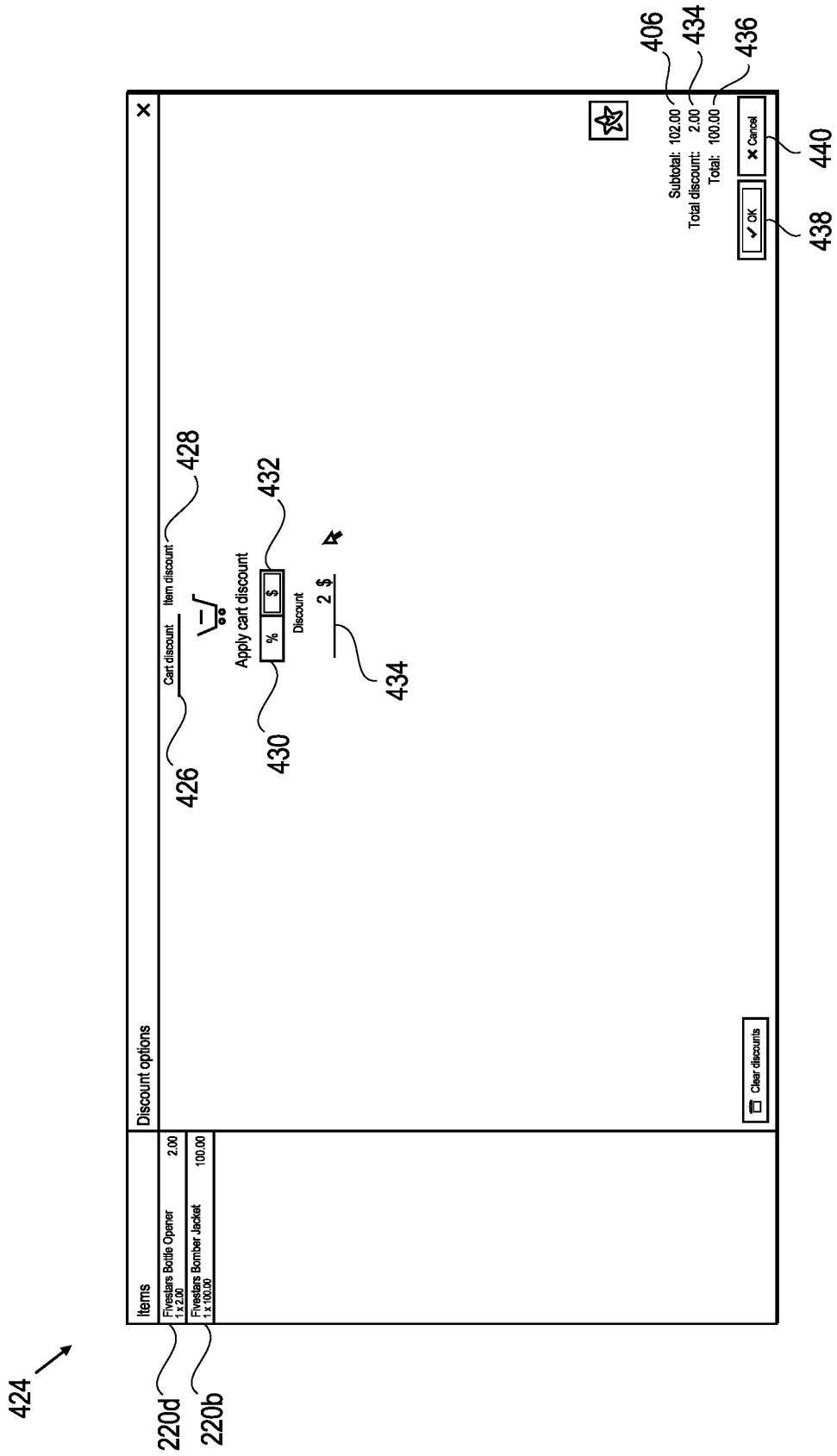

Upon selection of discount button 422, point of sale application 104 may display the user interface depicted in screenshot 424 of FIG. 4G. Such user interface may provide an option to apply a discount to the entire "cart" or entire purchase (via user interface element 426), an option to apply a discount to a specific item (via user interface element 428), and an option to add a zero-dollar or discounted cost item to the order (not depicted). For example, some discounts that merchants enter may be in the form of items with low or $0 prices, for example, "Hess Cabernet $1.00," "Any dessert $0.00," "Vanilla vape juice $0.01," "Shrimp taco $0.00," etc.

In the instant example, merchant 112 has selected the "cart discount" option. Such interface may also provide an option to apply a percent discount (via user interface element 430) or an exact dollar amount discount (via user interface element 432). In the instant example, merchant 112 has selected the exact dollar amount discount option. Such interface may also provide text box 434 for merchant 112 to input the dollar amount to discount (or percent to discount if the percent discount option were selected). In the instant example, merchant 112 has input the discount amount of $2.

The user interface may also display a summary of the rewards redemption, including subtotal amount 406 (e.g., $102.00, equal to the amount prior to the discount being applied), an amount to discount 434 (e.g., $2.00) or the name and cost of a discounted or zero-dollar item associated with the reward redeemed, and the new total amount 436 after the discount (e.g., $100.00). Upon the discount being entered, merchant 112 may select user interface element 438 to confirm the entry of the discount (e.g., "OK" button) or may select user interface element 440 to cancel the application of the discount (e.g., "Cancel" button). In the instant example, merchant 112 selects the "OK" button.

Figure 4H:
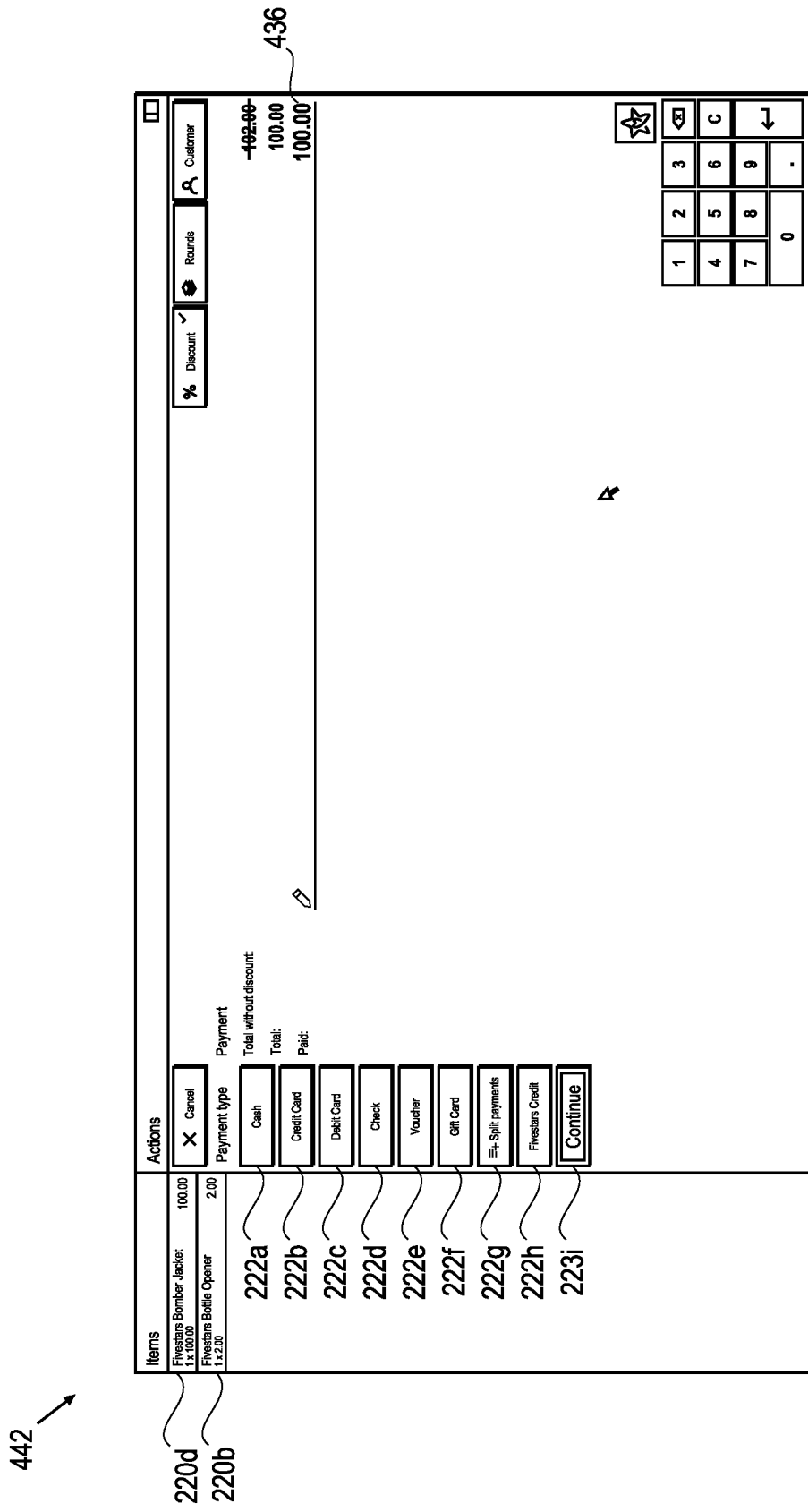
Figure 4I:
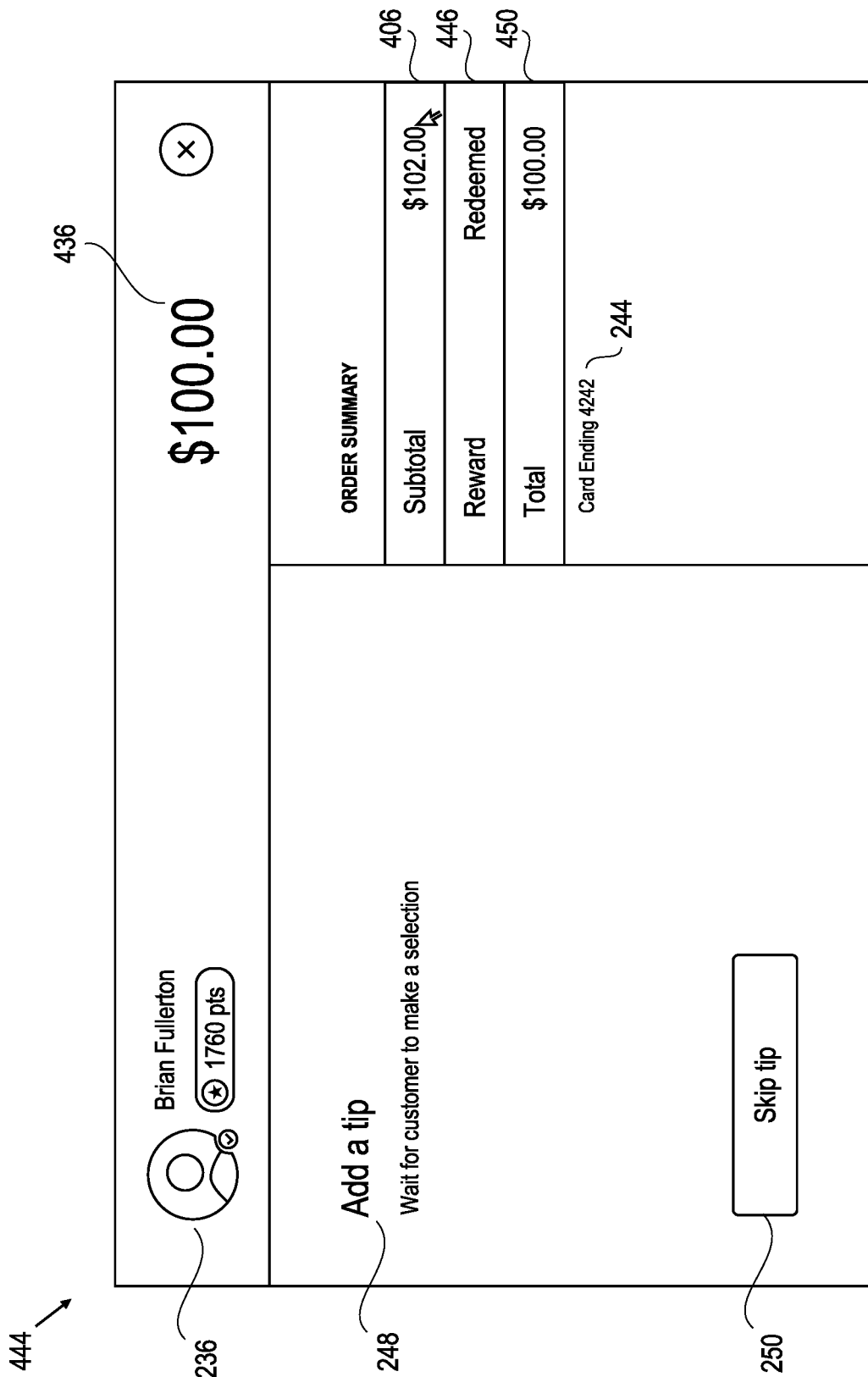

Upon receiving the selection of the "OK" button, point of sale application 104 may display the user interface depicted in screenshot 442 of FIG. 4H. The discounted total amount 436 (e.g., $100.00) may be displayed in the user interface. Once merchant 112 visually confirms the discounted total amount 436, merchant 112 may press user interface element 223*i* (e.g., Continue button), which may cause the processing of the transaction to transition from point of sale application 104 back to add-on application 106. Hence, the selection of the Continue button may be another example of a triggering event. Add-on application 106 may take a screenshot of the discounted total amount and use OCR to determine the discounted total amount from the screenshot. Add-on application 106 may then provide the user interface depicted in screenshot 444 of FIG. 4I, with the new total 436 determined via the OCR. Similar to the interface of FIG. 2G, there may be a user interface element 248 that prompts merchant 112 to wait for customer 124 to add a tip, and a user interface element 250 that allows merchant 112 to designate that no tip is being paid. In the instant example, customer 124 makes a selection to pay a 15% tip via terminal 114*b*.

Upon receipt of the customer's designation of the tip amount or tip percentage, add-on application 106 may charge the total amount to the credit card of customer 124, and complete the processing of the payment. Upon completion of the processing of the payment, add-on application 106 may return a result of the payment to point of sale application 104. Such a process may be similar to the process described above in FIGS. 2H and 2I, and hence will not be described in detail for the sake of conciseness.

Figure 4J:
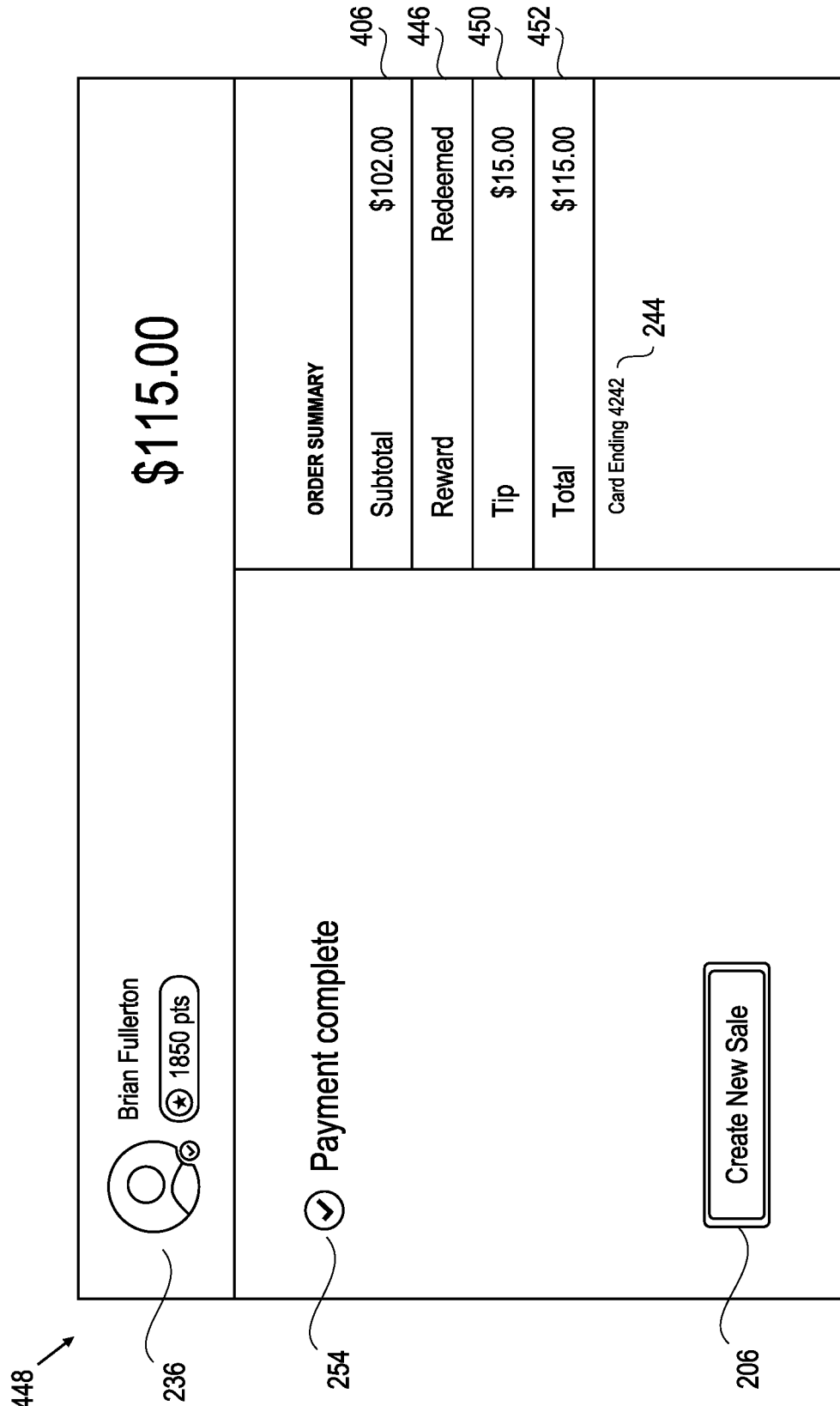

Upon the accounting process with the point of sale application 104 finishing, add-on application 106 may provide the user interface depicted in screenshot 448 of FIG. 4J. Such user interface may include a message that the payment is complete, as well as an order summary with a subtotal amount 406 (e.g., $102.00), a message that a reward has been redeemed 446 (or an amount of the discount), a tip amount 450 (e.g., $15.00) and a total amount 452 (e.g., $115.00). At some point after the processing of the payment, add-on application 106 may also store information associated with the transaction with the rewards account of customer 124 (e.g., total paid, tip paid, items purchased, reward points earned from the purchased, reward points redeemed, etc.).

It is noted that in the above-described reward redemption process, merchant 112 manually entered the discount provided by the redemption of rewards into point of sale application 104. However, in another embodiment, add-on application 106 may emulate such user actions (e.g., mouse clicks, keyboard presses, etc.) of merchant 112 such that the discount can be automatically entered into point of sale application 104.

FIGS. 5A-5F depict screenshots of user interfaces to process a refund. For conciseness of explanation, the process explained in FIGS. 5A-5J omits the above-described interface in which add-on application 106 is notified about the start of a new sale or transaction (e.g., FIG. 2B). Instead, the process of FIGS. 5A-5F begins with the user interface in the product selection state, as depicted in screenshot 500, after one item has been selected to be refunded. In particular, user interface element 210*d* (featuring a "Fivestars Bomber Jacket") has been selected. In a left panel of the interface, the quantity and price of the selected item is displayed 212*d*, along with total 501 (e.g., 100.00) of the transaction. Upon selection of user interface element 502 (e.g., "Refund" button), the interface may transition to the refund screen depicted in screenshot 504 of FIG. 5B.

In the refund screen, items selected for refund may be displayed in a modified format 220*d* (e.g., with price rather than the quantity of an item being the emphasized attribute), along with total 508 (e.g., −100.00) of the purchase amount to be refunded. Upon merchant 112 selecting user interface element 222*b* associated with the refund payment type of "credit card," add-on application 106 may recognize that the user interface of point of sale application 104 is in a credit card refund state. In response to recognizing the credit card refund state, add-on application 106 may then insert user interface element 223*j* (e.g., refund button) into the user interface. To clarify, refund button 223*j* may be an overlay button that is inserted by add-on application 106, similar to overlay cash button 223*a* and overlay credit button 223*b* in FIG. 2D. Upon selection of refund button 223*j* (which may be interpreted as a triggering event), the processing of the credit card refund may transition from point of sale application 104 to add-on application 106. Add-on application 106 may take a screenshot of total refund amount 508, and read the total refund amount from the screenshot using OCR.

Similar functionality may be provided in response to the selection of the other refund payment types. For instance, in response to selection of user interface element 222*a* associated with the refund payment type of "cash," add-on application 106 may recognize that the user interface of point of sale application 104 is in a cash refund state, and similarly insert the refund button into the user interface. Upon selection of a refund button (which may be interpreted as a triggering event), the processing of the cash refund may transition from point of sale application 104 to add-on application 106. Likewise, in response to selection of user interface element 222*c* associated with the refund payment type of "debit card," add-on application 106 may recognize that the user interface of point of sale application 104 is in a debit card refund state, and similarly insert a refund button into the user interface. Upon selection of the refund button (which may be interpreted as a triggering event), the processing of the debit card refund may transition from point of sale application 104 to add-on application 106. In another embodiment, a physical hardware button may be used instead of the inserted user interface element refund button 223*j*, and pressing the physical hardware button may be equivalent to using a cursor controlling device to select refund button 223*j*.

If, however, merchant 112 desires to continue processing the refund using point of sale application 104 (instead of transitioning the processing of the refund to add-on application 106), merchant 112 may select the refund payment type and then select user interface element 510 (e.g., "OK" button). Such processing of the refund by point of sale application 104 is known in the art, and will not be described further herein. If merchant 112 desires to cancel the refund, merchant 112 may select user interface element 512 (e.g., "Cancel" button) to cancel the refund.

Figure 5A:
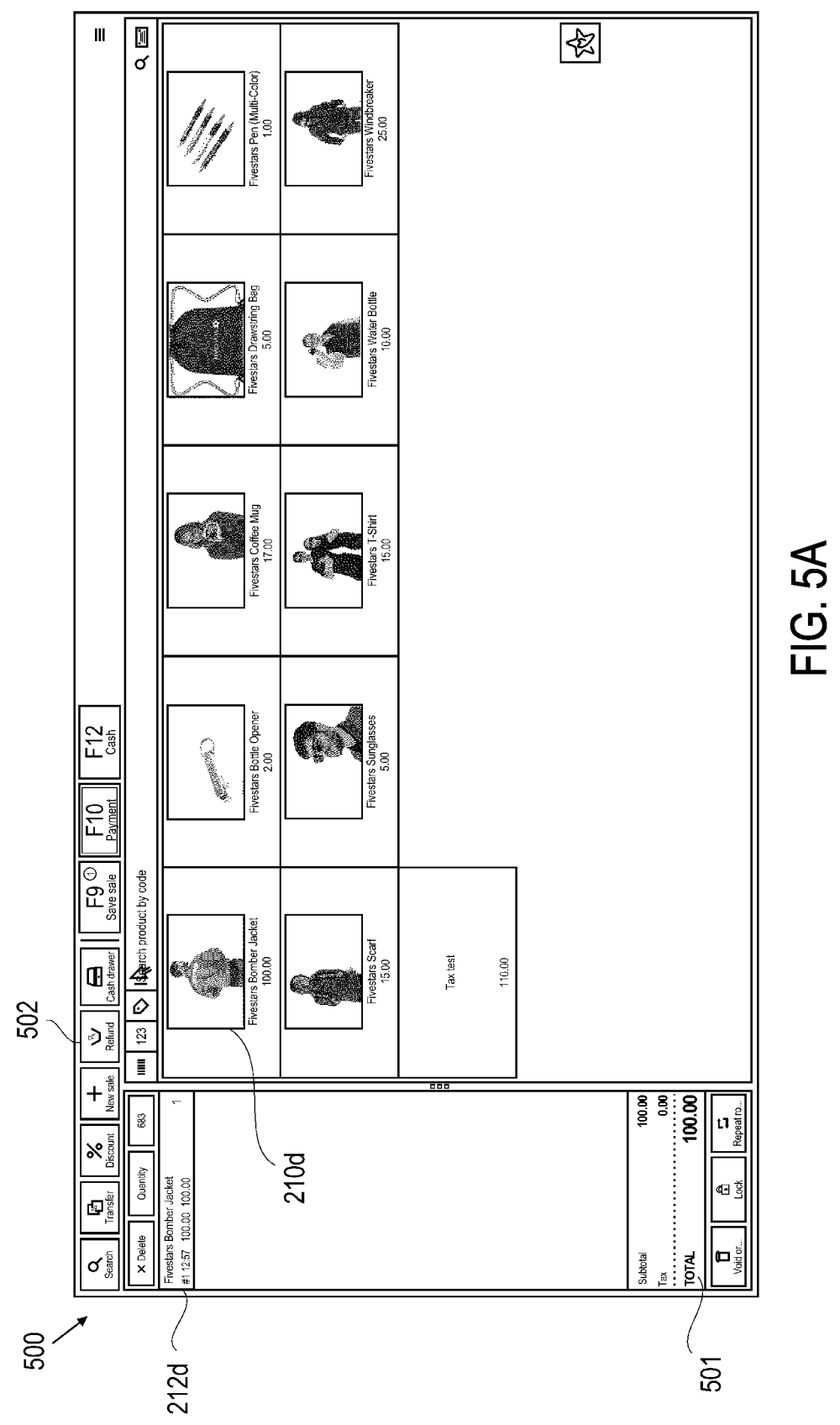
Figure 5B:
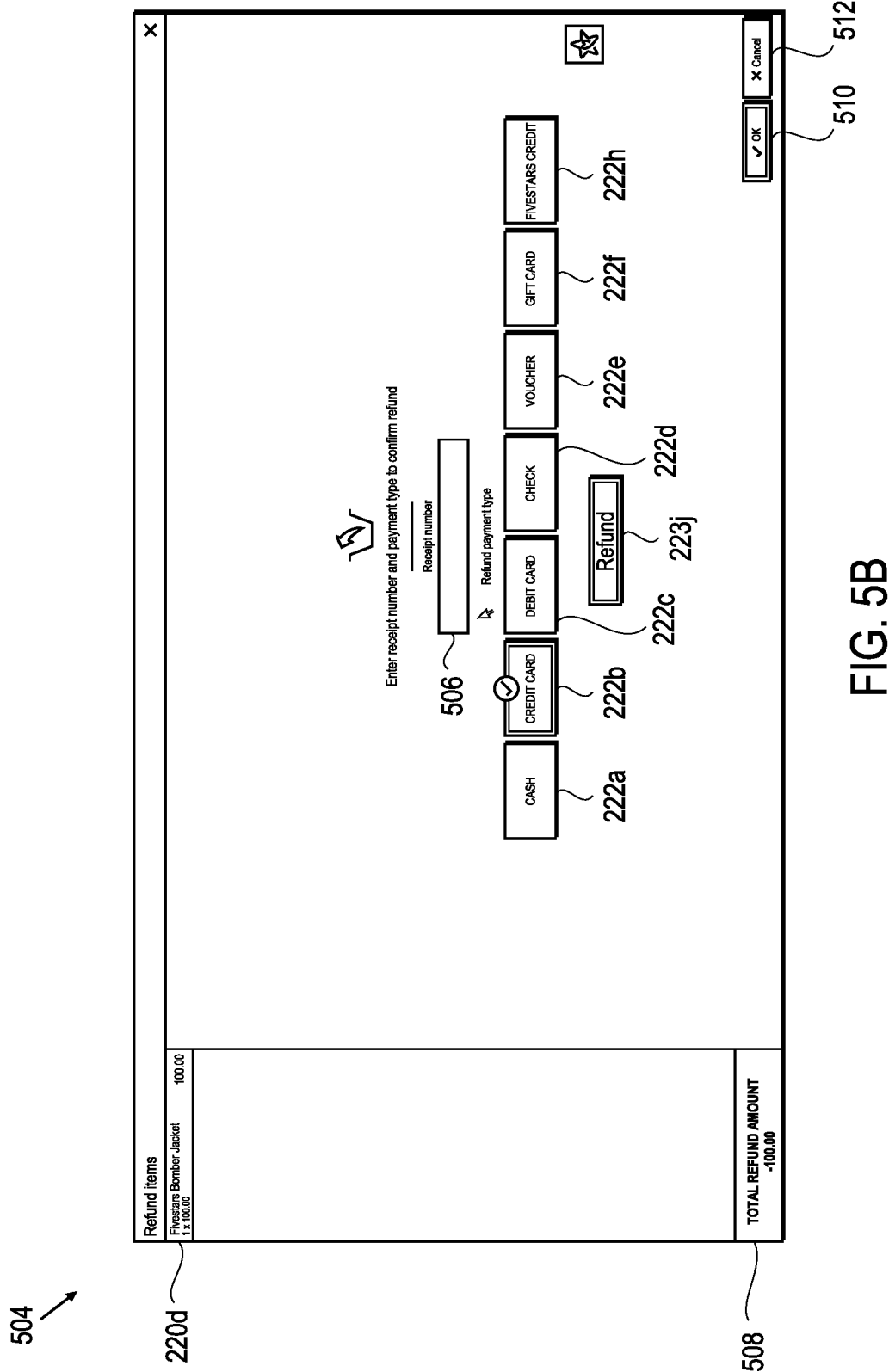
Figure 5C:
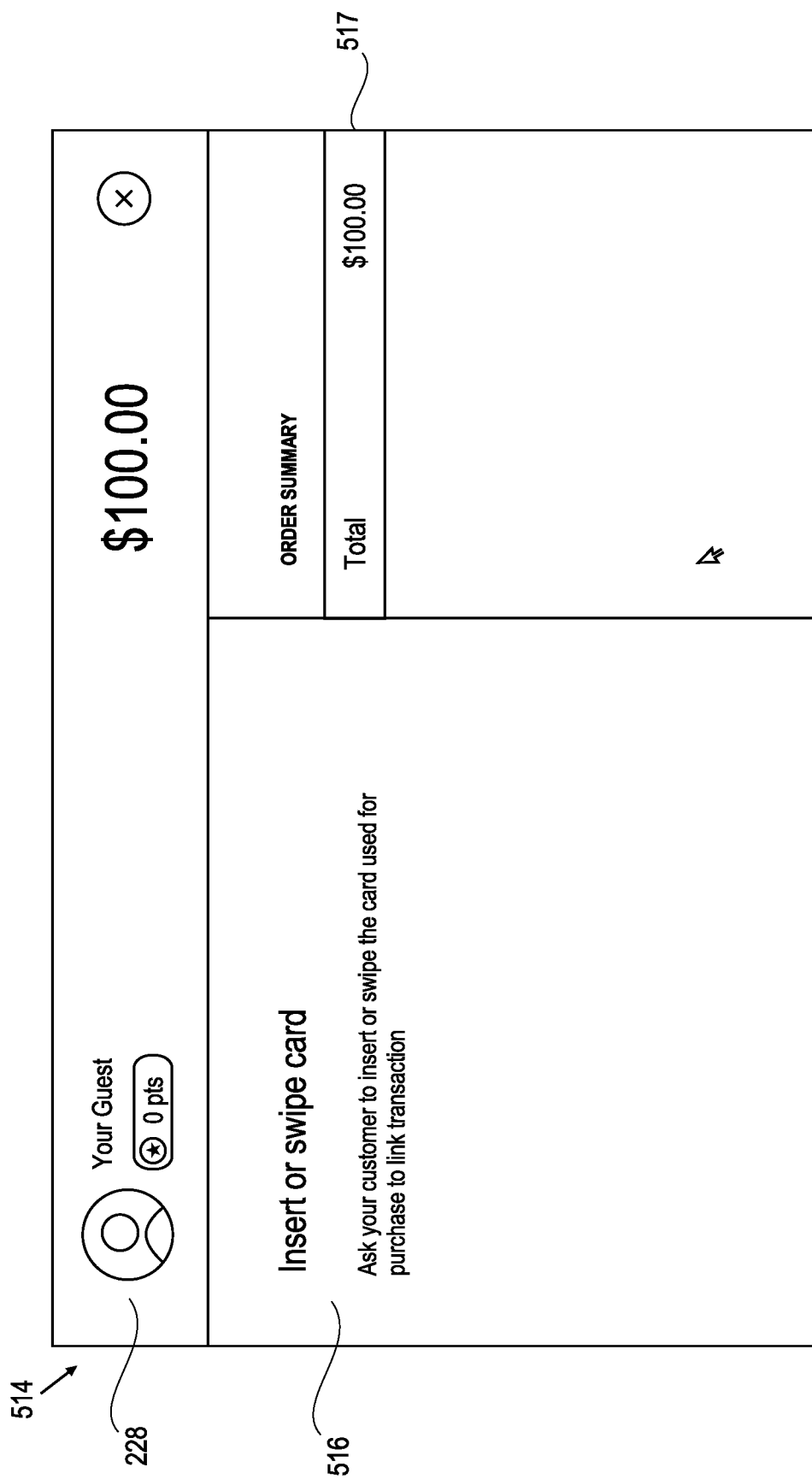

Continuing with the instant example in which credit card button 222*b* has been selected, add-on application 106 may display the user interface depicted in screenshot 514 of FIG. 5C. Such user interface may include message 516, requesting merchant 112 to ask the customer to insert or swipe the credit card that was used for the purchase of the item(s) to be refunded. The user interface may also include an order summary with total amount 517 to be refunded (e.g., $100.00). Total amount 517 provided in the order summary may be (−1) times total refund amount 508 that was read by add-on application 106 using OCR. In another embodiment (not depicted), total amount 517 may be equal to total refund amount 508.

In another embodiment (not depicted), add-on application 106 may display a user interface that allows merchant 112 to enter in an amount for a partial refund that might be provided in a circumstance in which an item is returned in a damaged or a worn condition.

Figure 5D:
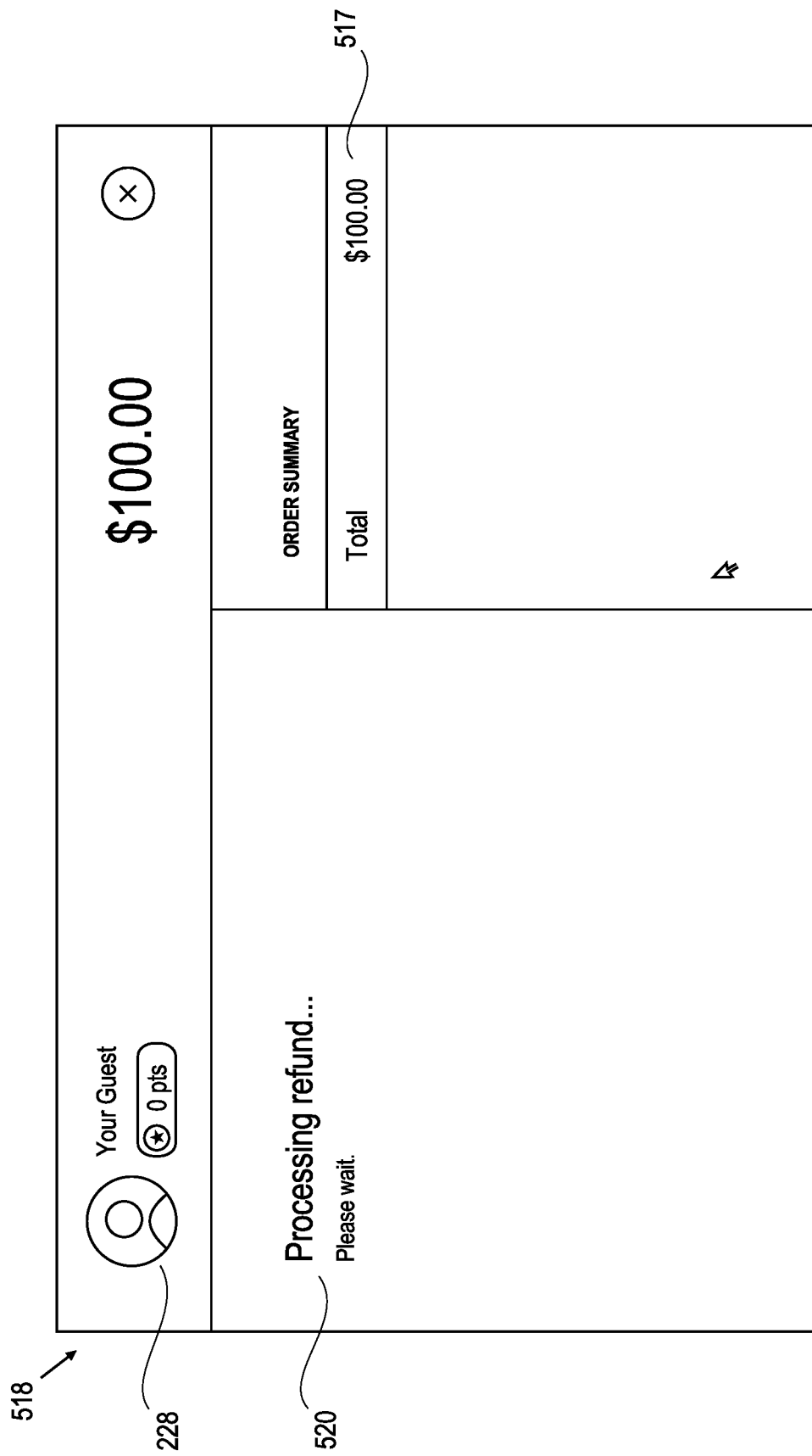
Figure 5E:
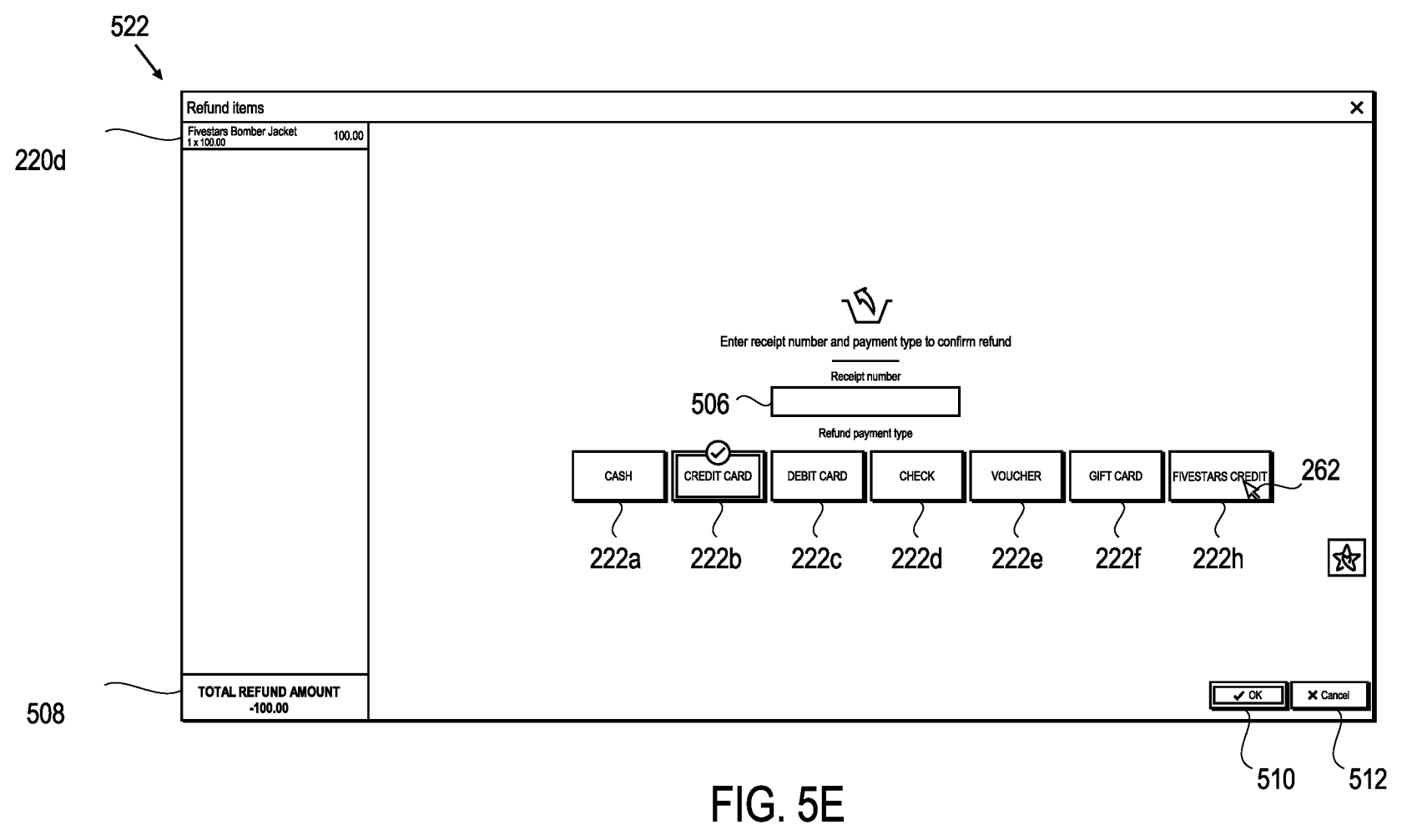

Upon the customer's credit card being read by credit card reader 118a or 118b, add-on application 106 may provide the user interface depicted in screenshot 518 of FIG. 5D. The user interface may include message 520 that informs merchant 112 that the refund is being processed. Upon the refund being successfully processed, add-on application 106 may return a result of the transaction to point of sale application 104, as described in FIGS. 5E and 5F. FIG. 5E depicts screenshot 522 of a user interface of point of sale application 104, similar to the interface of FIG. 5B prior to the occurrence of the triggering event. One difference is that refund button 223j may not be present, as the refund has already been processed by add-on application 106. User actions may be emulated by add-on application 106 in the interface of FIG. 5E in order to inform point of sale application 104 of an amount refunded to customer 124 and/or whether or not the refund was completed by add-on application 106. A monitoring process of add-on application 106 (similar to or identical to the process used to determine the state of the user interface) may be used to determine the location of user interface element 222h (e.g., the "Fivestars Credit" button). Cursor 262 may then be positioned on Fivestars Credit button 222h, and a selection command (e.g., mouse click, tap on touchscreen, etc.) of cursor 262 may be performed by add-on application 106.

Figure 5F:
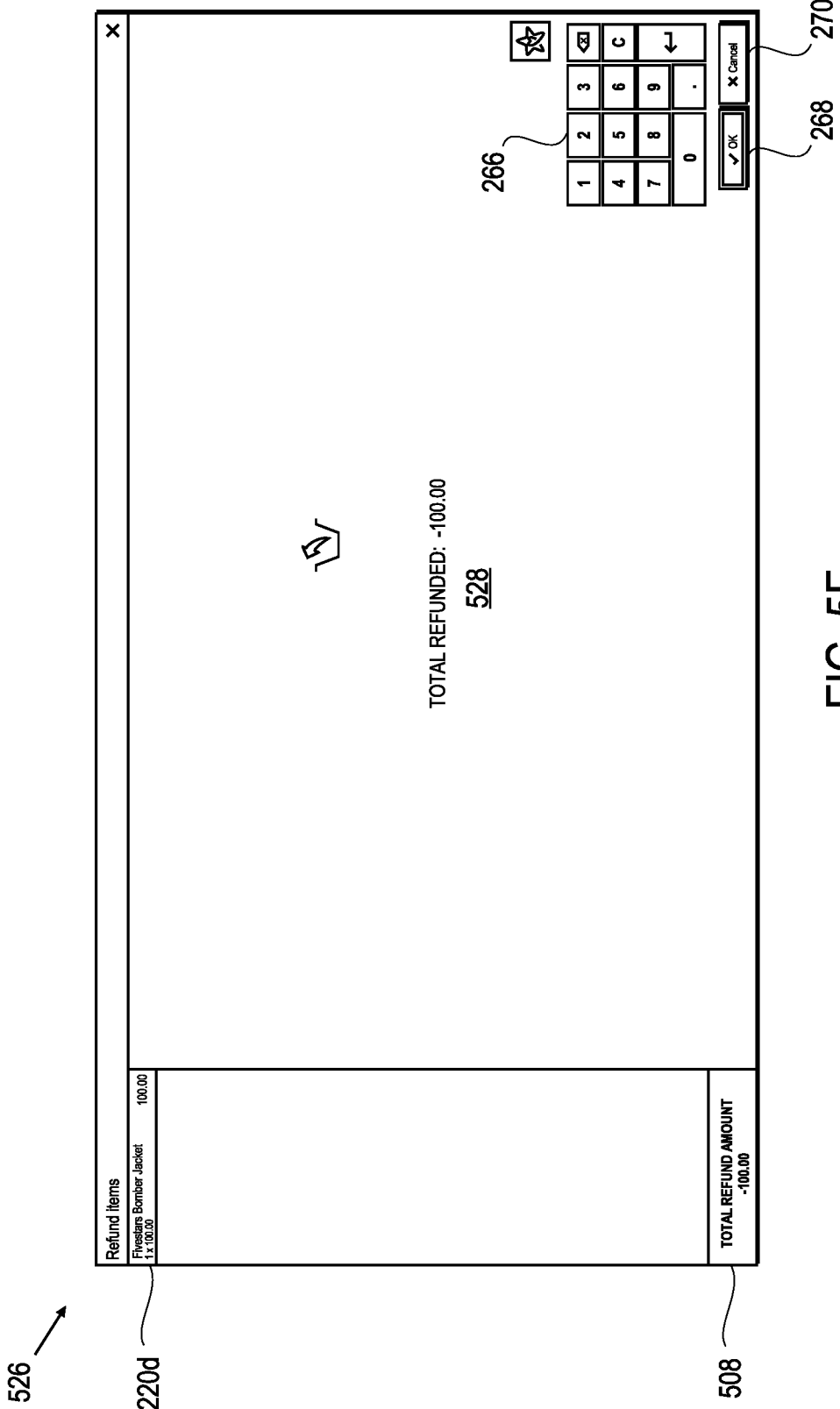

Upon an emulated user action being performed to select Fivestars Credit button 222h, point of sale application 104 may provide the user interface depicted in screenshot 526 of FIG. 5F. Before emulating any additional user actions, add-on application 106 may verify the user interface displayed in response to clicking Fivestars Credit button 222h. That is, in one embodiment, add-on application 106 may retrieve a stored (i.e., pre-determined) screenshot of the user interface that is expected in response to selecting Fivestars Credit button 222h, and compare the interface (e.g., or compare certain selected attributes thereof) depicted in FIG. 5E to the expected user interface. In another embodiment, add-on application 106 may further retrieve and compare one or more stored pixels (i.e., pixels from the expected user interface) with pixels of the current interface to verify whether or not the interface depicted in FIG. 5E is the expected interface. In another embodiment of the verification process, add-on application 106 may retrieve and compare one or more stored words (i.e., words from the expected user interface) with words depicted in the interface depicted in FIG. 5E that are retrieved from OS introspection, the browser source, or full screen OCR. In another embodiment of the verification process, add-on application 106 may use trained computer vision/machine learning models so as to verify whether the interface depicted in FIG. 5E is the expected interface.

If the verification step fails (e.g., a discrepancy is determined based on the comparison), the process described in FIG. 5E may be attempted again, or the process may be aborted. If the verification step is successful, the refunded amount 528 may be input into the interface of FIG. 5F (e.g., −100.00). It is noted that the input of this refunded amount may also be performed via emulated user actions (e.g., emulated keypresses, emulated mouse clicks on keypad 266 depicted in FIG. 5F, etc.). Upon the refunded amount being input into the user interface, user interface element 268 (e.g., "OK" button) may be selected (e.g., by an emulated mouse click). If for some reason the communication of the transaction result to point of sale application 104 needs to be aborted, user interface element 270 (e.g., "Cancel" button) may be selected (e.g., by an emulated mouse click). At some point after the refund has been successfully processed, add-on application 106 may also store information associated with the transaction with the rewards account of customer 124 (e.g., amount refunded, etc.).

Figure 6A:
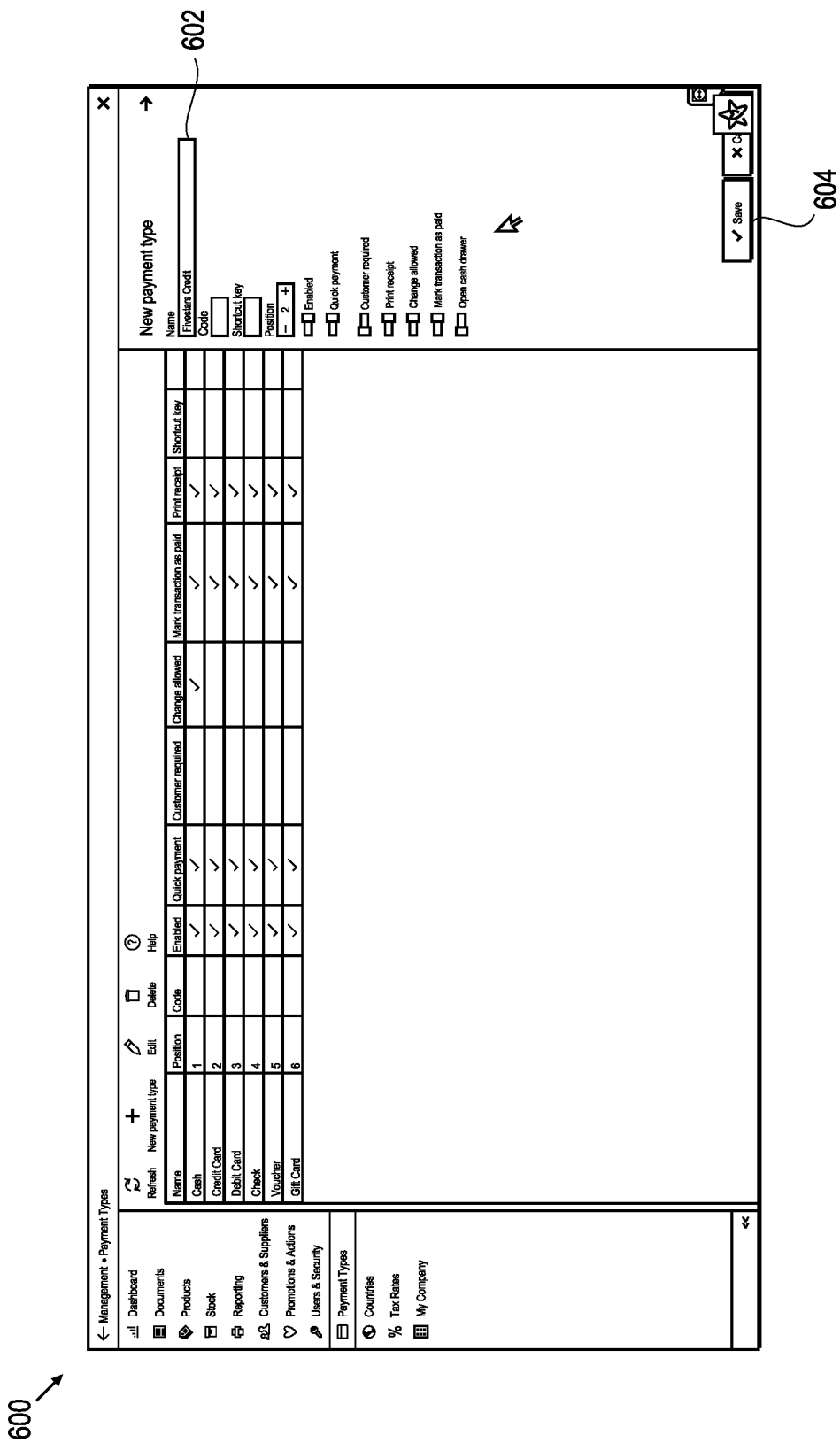
FIGS. 6A and 6B depict screenshots of user interfaces to add a new payment type, in accordance with one embodiment of the invention.
Figure 6B:
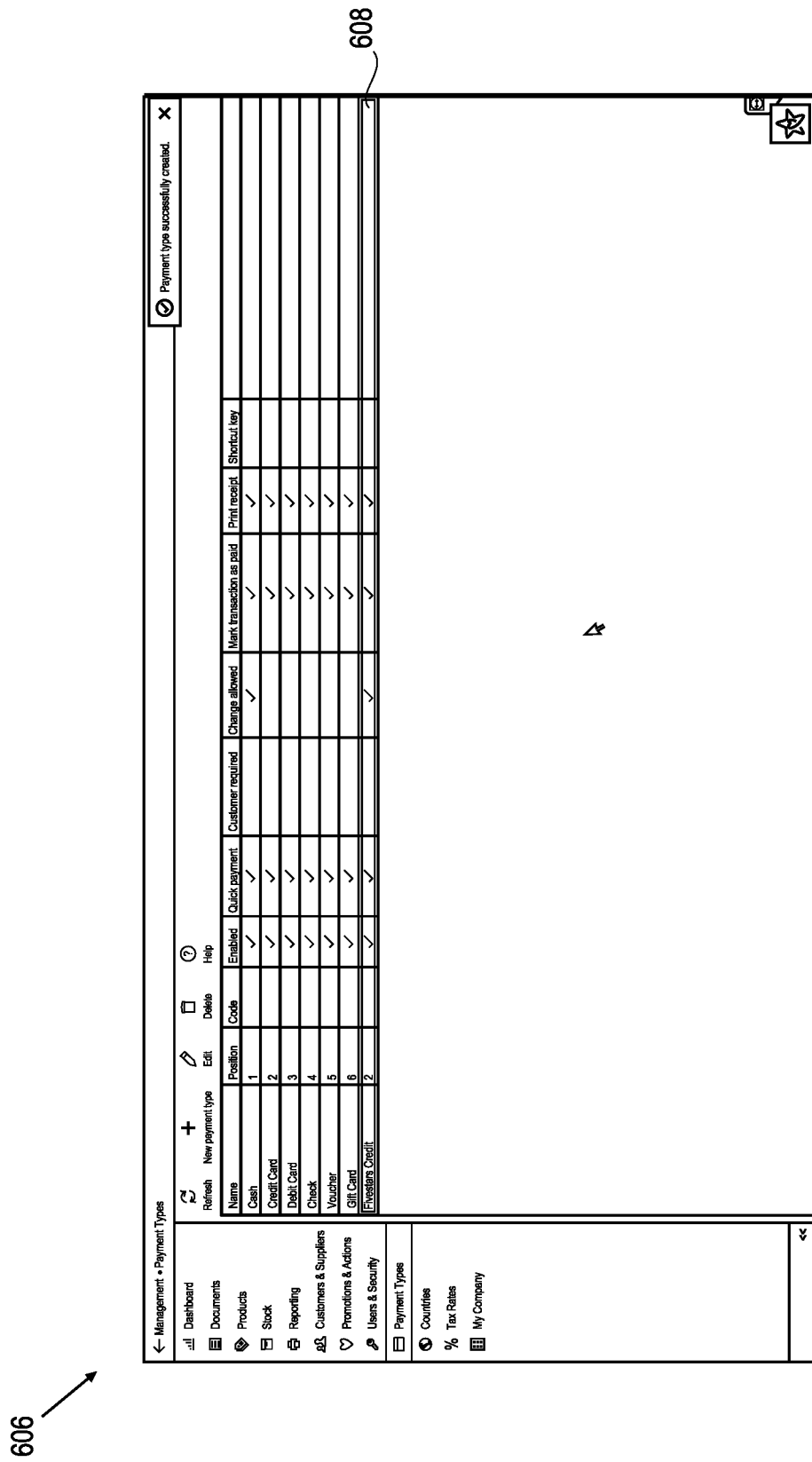

FIGS. 6A and 6B depict screenshots of user interfaces of point of sale application 104 to add an "other tenders" payment button, for example, the above-described Fivestars Credit button. Such process typically occurs during an initial configuration procedure when add-on application 106 is being installed on point of sale device 102. Point of sale application 104 may provide the user interface depicted in screenshot 600 of FIG. 6A, which includes a textbox 602 for merchant 112 to add a "New payment type". In the instant example, the new payment type of "Fivestars Credit" is input into textbox 602. Various configurable options may be provided along with the input of the new payment type, for example, the position that the new payment type should be displayed on the user interface of point of sale application 104 (i.e., relative to the other payment types), whether to print a receipt upon a merchant's selection of the new payment type, whether the cash drawer should be opened upon a merchant's selection of the new payment type, etc. Upon selection of user interface element 604 (e.g., "Save" button), point of sale application 104 may provide the user interface (depicted in screenshot 606 of FIG. 6B), which includes a summary of the payment options, including the new payment option 608 of Fivestars credit. If not already apparent, it is noted that the insertion of the "Fivestars credit" button may be accomplished using the existing point of sale application 104 user interface, and does not require access to or modification of the source code of point of sale application 104.

FIGS. 7A-7E depict screenshots of user interfaces to train add-on application 106 to recognize the payment screen provided by point of sale application 104 and various elements within the payment screen. It is understood that such user interfaces can be modified to train add-on application 106 to recognize other states (e.g., refund state, etc.), and various elements within the other states.

Figure 7A:
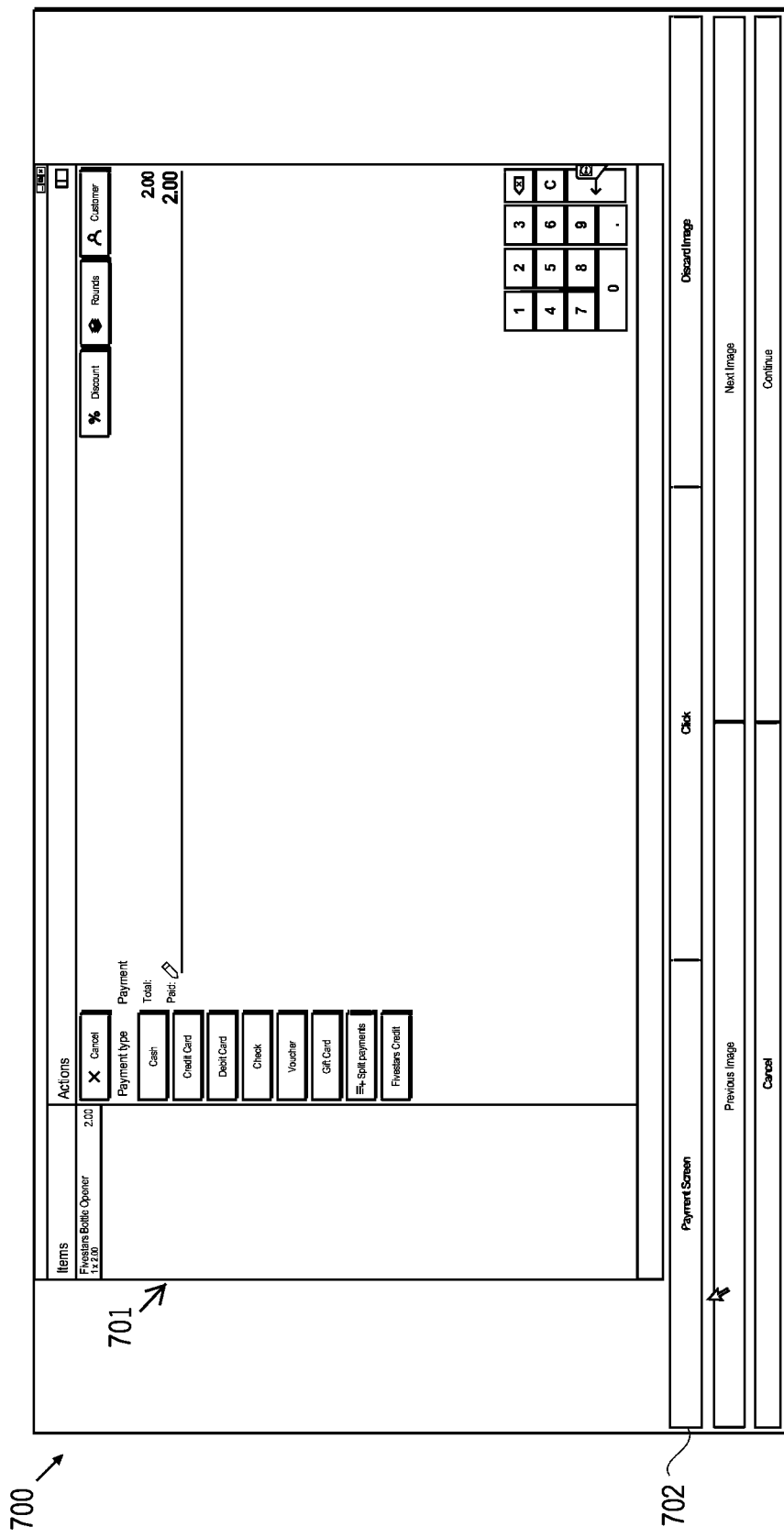
FIGS. 7A-7E depict screenshots of user interfaces to train the add-on application to recognize various states and elements of a user interface provided by a point of sale application, in accordance with one embodiment of the invention.

FIG. 7A depicts screenshot 700 of a user interface with user interface element 702 (e.g., "Payment Screen" button) that can be used by an individual (e.g., merchant 112, or an individual familiar with the configuration process for add-on application 106) to tag and/or label a user interface of point of sale application 104 as a "Payment Screen" (i.e., the "Payment Screen" is identical to the "payment state" described herein). In the current example, image 701 (i.e. image within screenshot 700 excluding the bottom three rows of buttons in screenshot 700) is a screenshot of the user interface of point of sale application 104 in the payment state, and an individual may select Payment Screen button 702 to label image 701 as a payment screen. Subsequent to such training, when add-on application 106 encounters a user interface that is similar to image 701 that has been tagged as the payment screen, add-on application 106 may recognize that user interface to be in the payment state. While the example in FIG. 7A labeled only one screen (i.e., image 701) as the payment screen, it is noted that a plurality of screens could each be labeled as a possible example of the payment screen. For example, the position of buttons in the plurality of screens could be shifted with respect to one another, but all of the screens could still be payment screens. As another example, the number of payment types depicted in the screens could differ, but all of the screens could still be payment screens. In such case, a user interface could be determined as a payment screen if that user interface is similar to one or more of the plurality of screens that have been labeled as examples of the payment screen.

Figure 7B:
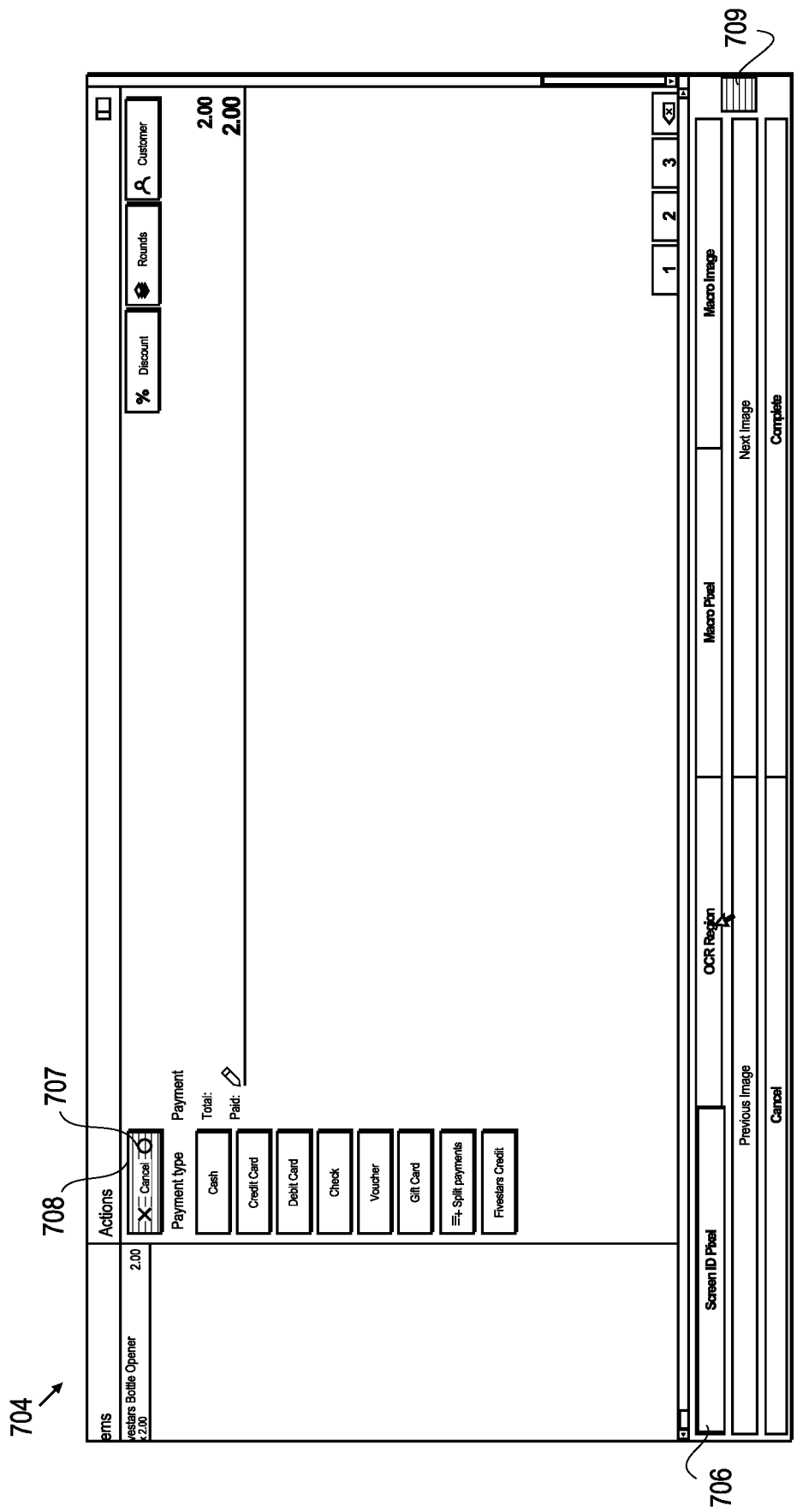

FIG. 7B depicts screenshot 704 of a user interface with user interface element 706 (e.g., "Screen ID Pixel" button) that can be used by an individual to further label a pixel that is unique to the payment screen and/or state. In other words, the user may first select Screen ID Pixel button 706, and then select a pixel in the payment screen that is unique to the payment screen. In the instant example, the selected screen ID pixel is pixel 707 within Cancel button 708, since the location and the color of pixel 707 within Cancel button is unique to the payment screen and/or state. To help the individual see which pixel has been selected, region 709 may show the color of selected screen ID pixel 707. Subsequent to such training, when add-on application 106 encounters a user interface with a pixel having the same color and location as the selected screen ID pixel for the payment screen, such determination can be one additional factor that add-on application 106 uses to determine whether or not the user interface is in the payment state.

Figure 7C:
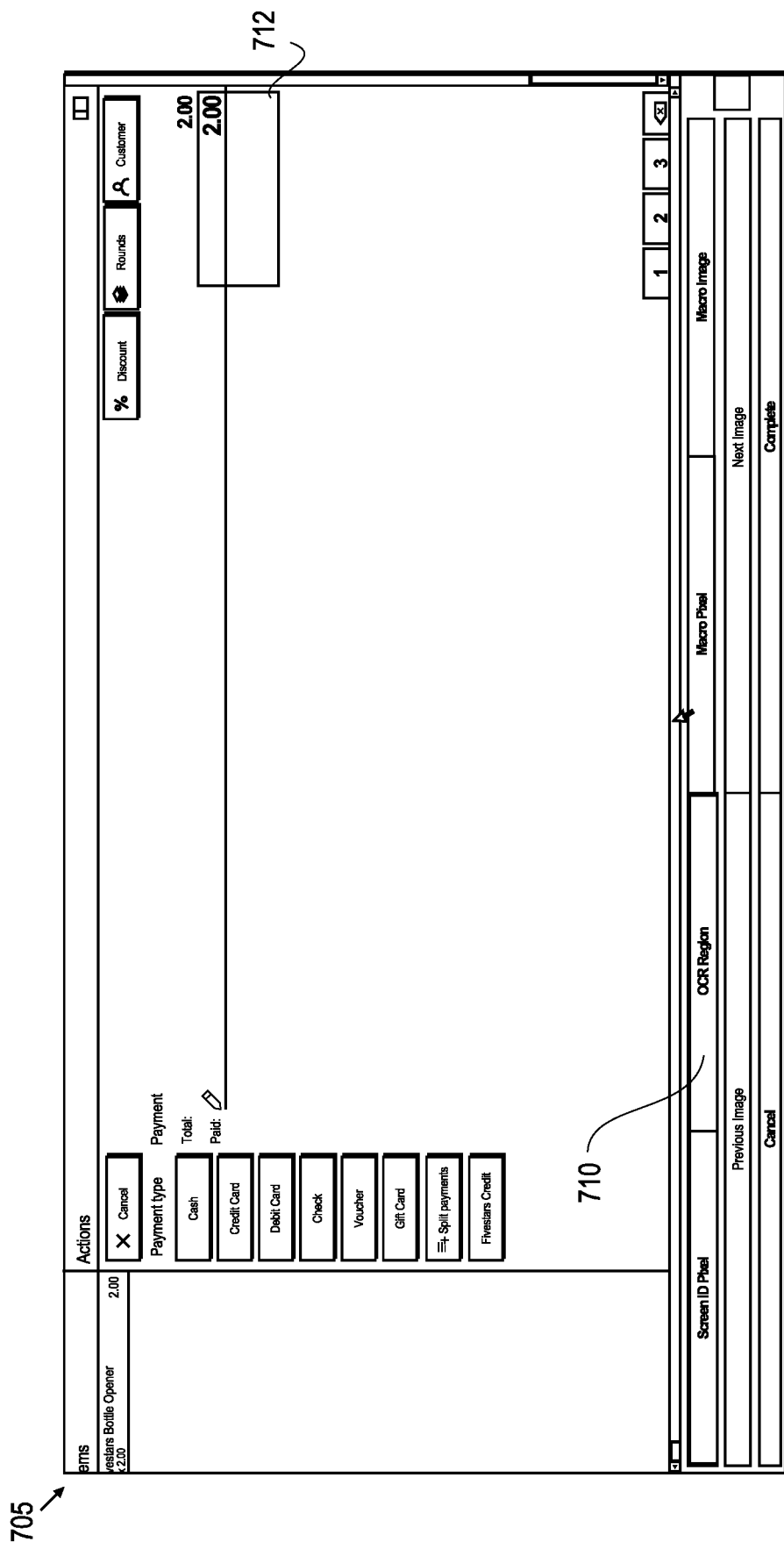

FIG. 7C depicts screenshot 705 of a user interface with user interface element 710 (e.g., "OCR Region" button) that can be used by an individual to further specify a region with a purchase total within the payment screen and/or state. In other words, the user may first select OCR Region button 710, and then specify a region in the payment screen with the purchase total. In the instant example, the OCR region is specified as region 712, since region 712 contains the total $2.00. Recall, in the interface of FIG. 2D, upon selection of credit button 223b, add-on application 106 was able to automatically take a screenshot of a region with the purchase total. Such action of add-on application 106 may be enabled by the presently described specification of OCR region 712 that identifies the region with the purchase total.

Figure 7D:
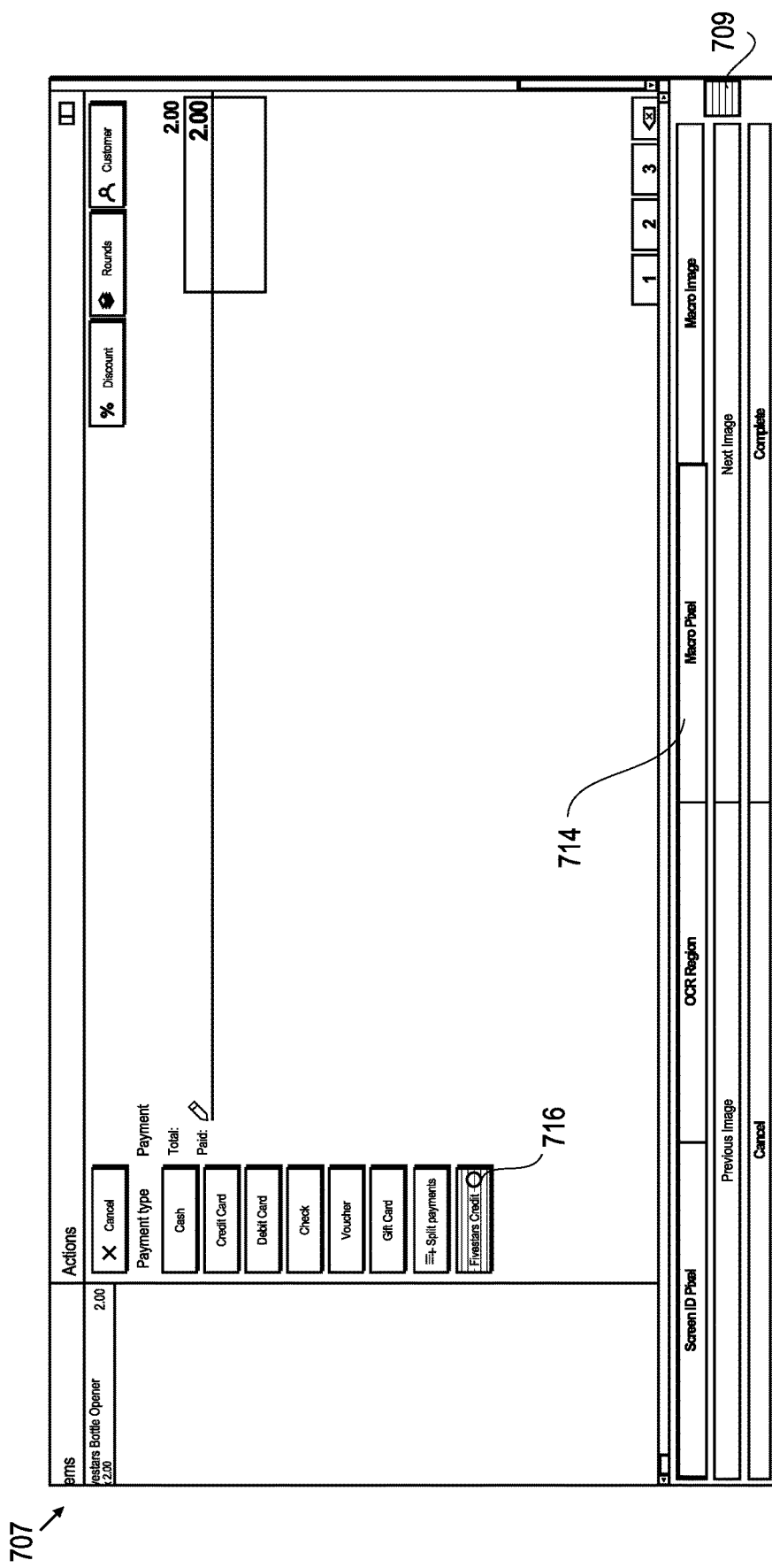

FIG. 7D depicts screenshot 707 of a user interface with user interface element 714 (e.g., "Macro Pixel" button) that can be used by an individual to specify a button (or other user interface element) within the payment screen and/or state that should be automatically selected by add-on application 106 (more specifically, to specify a pixel that is unique to the button that should be automatically selected). In other words, the user may first select the Macro Pixel button 714, and then select the pixel that is unique to the button that should be automatically "clicked" (e.g., as part of the procedure to return a result of the transaction from add-on application 106 to point of sale application 104). In the present example, the selected macro pixel is pixel 716 within the "Fivestars Credit" button. To help the individual see which pixel has been selected, region 709 may show the color of the selected macro pixel. Recall, in FIG. 2H, add-on application 106 was able to emulate user actions to select Fivestars Credit button 222h. Such automatic detection of the Fivestars Credit button may be accomplished by add-on application 106 searching for the color and location of the presently identified macro pixel. However, if the placement of the Fivestars Credit button 222h were to change in the user interface of point of sale application 104 (e.g., due to the addition of more payment types), the specified macro pixel may not lead to the correct identification of the Fivestars Credit button. In such cases, additional tagging information described below in FIG. 7E may be used to locate the Fivestars Credit button.

Figure 7E:
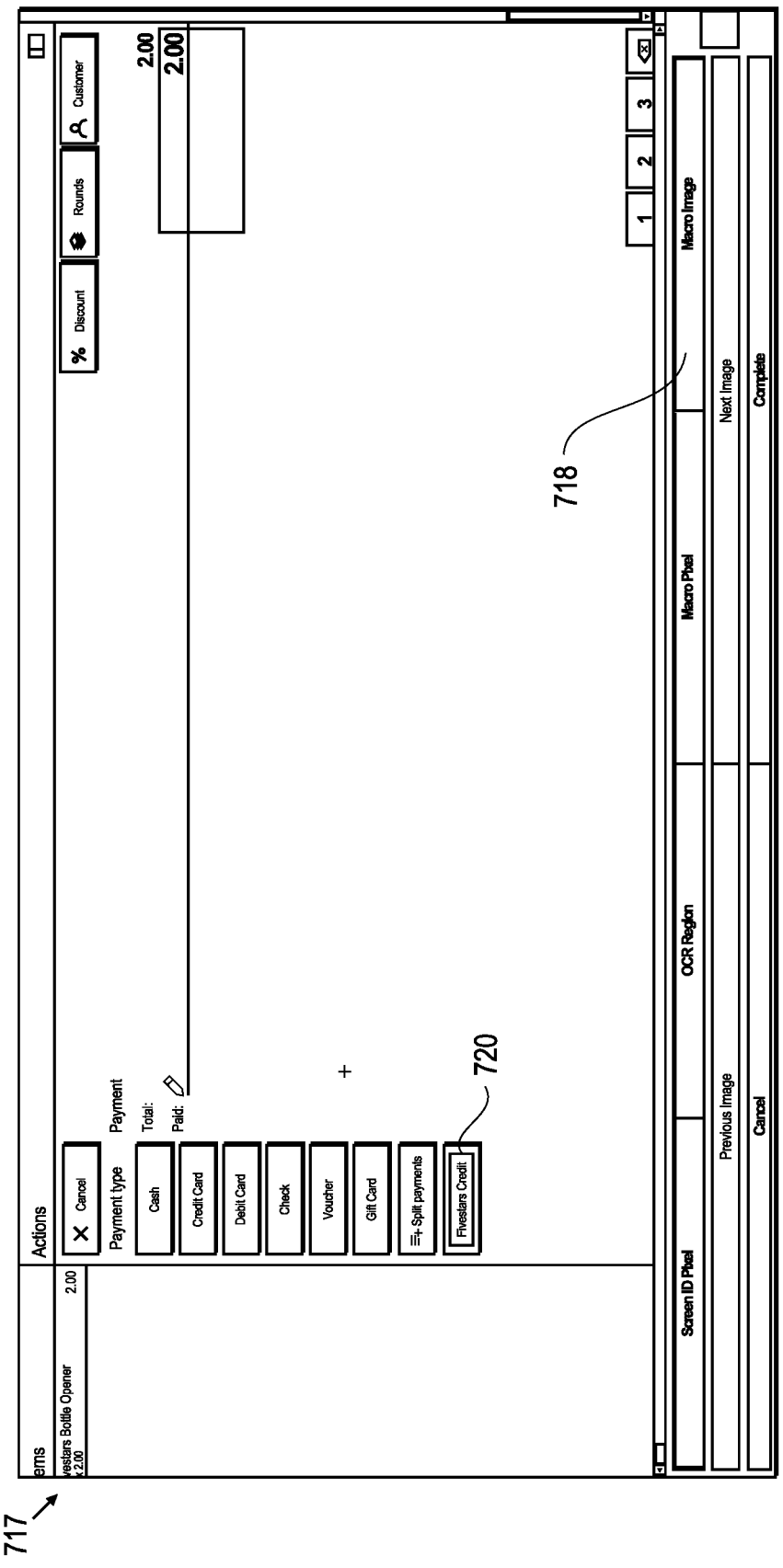

FIG. 7E depicts screenshot 717 of a user interface with user interface element 718 (e.g., "Macro Image" button) that can be used by an individual to additionally specify a button (or other user interface element) in the payment screen (or other user interface) and/or state that should be automatically selected by add-on application 106 (more specifically, to specify an image that is unique to the button that should be automatically selected). In other words, the user may first select the Macro Image button 718, and then select an image that is unique to the button that should be automatically "clicked". In the present example, the macro image is selected as image 720 within the "Fivestars Credit" button. Image 720 may be a group of pixels within the Fivestars Credit button that includes the text "Fivestars Credit," as the text "Fivestars Credit" is unique to the "Fivestars Credit" button. Subsequent to this training, even if the location of the Fivestars Credit button within the payment screen were to change, add-on application 106 can still locate the location of the instant button in the payment screen by searching for image 720 (e.g., by using a visual grep tool). Alternatively, a trained computer vision and machine learning technology could automatically identify the appropriate buttons and their locations in the point of sale application 104 for desired input actions taken by add-on application 106, enabling the add-on application 106 to contextualize and recognize the location of the appropriate button for the desired input action, in this case, the Fivestars Credit button, which may or may not be accomplished with additional human training.

Figure 8:
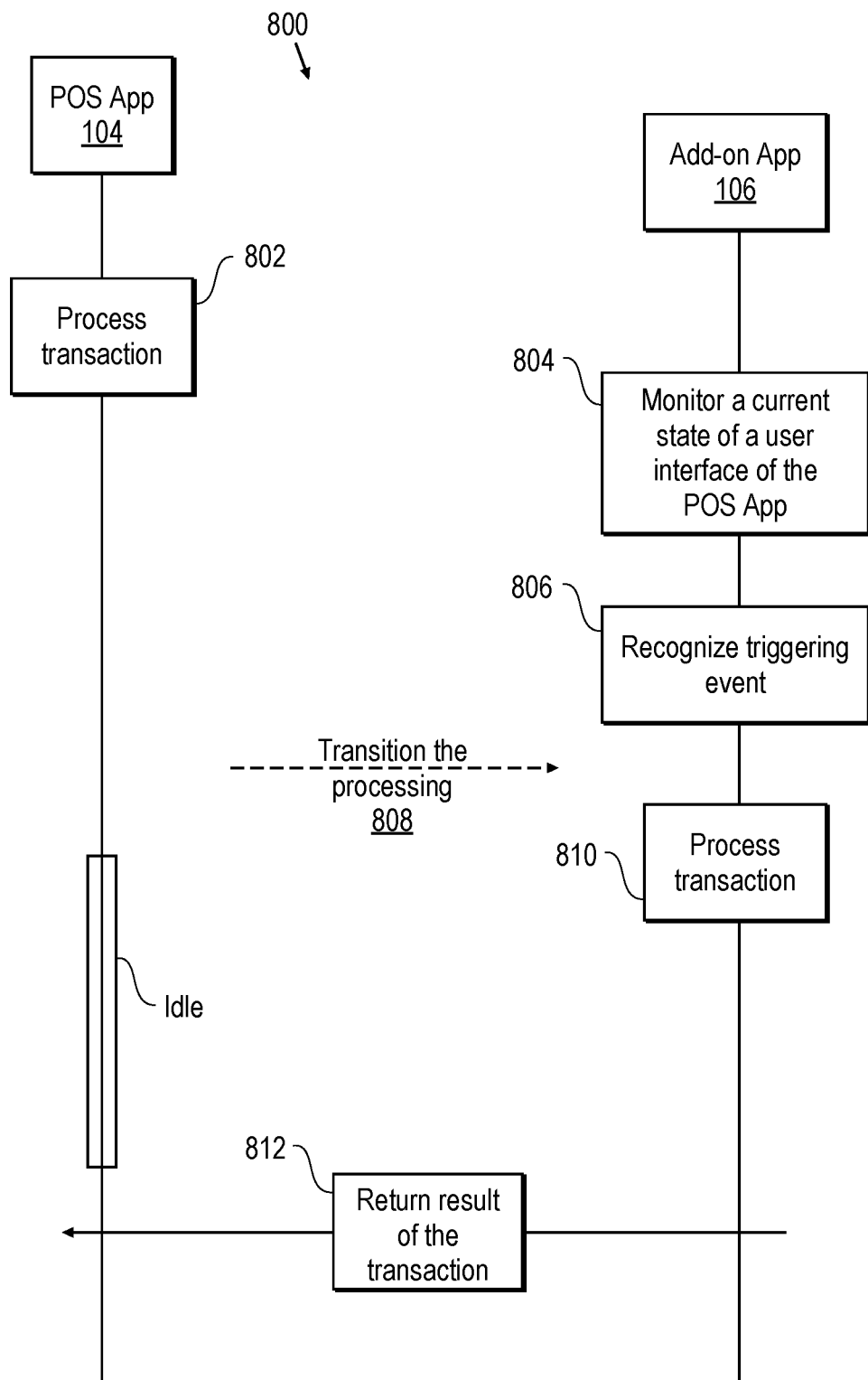
FIG. 8 depicts a sequence diagram for processing a transaction between a merchant and a customer using a point of sale application and an add-on application, in accordance with one embodiment of the invention.

The following sequence diagrams are presented to summarize the processes described in the above screenshots. FIG. 8 depicts sequence diagram 800 for processing a transaction between merchant 112 and customer 124 using point of sale application 104 and add-on application 106. At step 802, point of sale application 104 may process a transaction between merchant 112 and customer 124. At step 804, while point of sale application 104 is processing the transaction, add-on application 106 may monitor a current state (e.g., payment state, refund state, ordering state) of a user interface of point of sale application 104. At step 806, add-on application 106 may recognize a triggering event associated with the current state of the user interface (e.g., selection of cash button 223a, selection of credit button 223b, selection of refund button 223j, etc.). At step 808, the processing of the transaction may transition from point of sale application 104 to add-on application 106. At step 810, add-on application 106 may process the transaction, during which point of sale application 104 may be idle. At step 812, upon completion of the processing of the transaction, add-on application 106 may return a result of the transaction to point of sale application 104 (e.g., return the amount that was paid by customer 124, return the amount that was refunded to customer 124, etc.).

Figure 9:
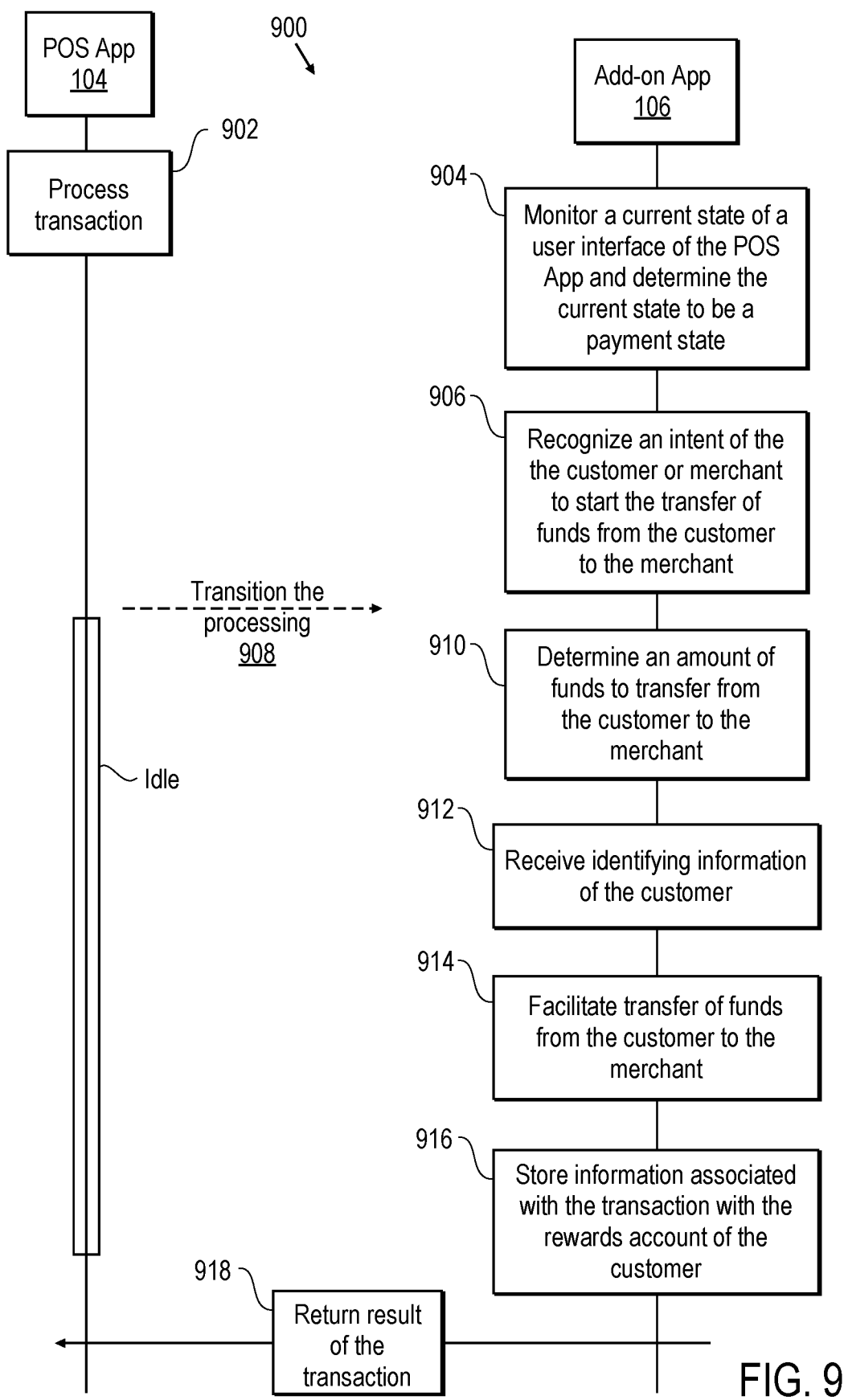
FIG. 9 depicts a sequence diagram for processing a payment from a customer using a point of sale application and an add-on application, in accordance with one embodiment of the invention.

FIG. 9 depicts sequence diagram 900 for processing a payment from customer 124 using point of sale application 104 and add-on application 106. At step 902, point of sale application 104 may process a transaction between merchant 112 and customer 124. Processing a transaction may include receiving a selection of items to be purchased. At step 904, while point of sale application 104 is processing the transaction, add-on application 106 may monitor a current state of a user interface of point of sale application 104 and determine that the current state is a payment state (e.g., based on the location of cancel button 221). There may additionally be a verification step to confirm the identification of the current state. For example, the location of cancel button 221 may be used to identify the state as a payment state, but the location of other buttons in the current user interface, the text present in the current user interface, and other attributes in the current user interface may be used to confirm that the state is in fact in the payment state. At step 906, add-on application 106 may recognize an intent of customer 124 or merchant 112 to start using financial instruments (e.g., cash, credit card, debit card, etc.) to transfer funds from customer 124 to merchant 112 (i.e., one example of a triggering event). As described in FIG. 2D, such intent may be expressed by merchant 112 selecting cash button 223*a* or credit button 223*b*. At step 908, the processing of the transaction may transition from point of sale application 104 to add-on application 106. Stated differently, at step 908, add-on application 106 may take over the processing of the transaction from point of sale application 104.

At step 910, add-on application 106 may determine an amount of funds to be transferred from customer 124 to merchant 112 (e.g., by performing an OCR of total 214 depicted in the user interface of point of sale application 104, as described in FIG. 2D). As explained above in FIG. 7C, there may be an initial configuration step in which a user specifies region 712 in which add-on application 106 should search for total 214. In step 910, other information such as the items that are being purchased, tax amount, subtotal, tip amount, etc. may also be extracted from the user interface of point of sale application 104. At step 912, add-on application 106 may receive identifying information of customer 124 (e.g., phone number, credit card number, etc.), the identifying information associated with a rewards account of customer 124. If a customer's credit card has already been linked to a rewards account of a customer, the swiping of a credit card may be sufficient to identify the rewards account of a customer. At step 914, add-on application 106 may facilitate a transfer of the amount of funds from customer 124 to merchant 112 (e.g., by displaying user interfaces to facilitate a cash or credit card transaction, processing a credit card, etc.). At step 916, add-on application 106 may store information associated with the transaction with the rewards account of the customer (e.g., total paid by customer 124, tip paid by customer 124, items purchased by customer 124, etc.). The information that is stored may include the information that was extracted from the user interface of point of sale application 104 in step 910. At step 918, upon completion of the processing of the transaction by add-on application 106, add-on application 106 may return a result of the transaction to point of sale application 104 (e.g., return the amount that was paid by customer 124). As described above in FIGS. 2H and 2I, step 918 may involve add-on application 106 emulating user actions in the user interface of point of sale application 104. For example, add-on application 106 may select Fivestars Credit button 222*h* to enter an accounting screen, in which various payment amounts (e.g., subtotal, tip, total, etc.) may be entered into the user interface of point of sale application 104. In another embodiment, selection of Fivestars Credit button 222*h* in the payment screen may have the effect of communicating to point of sales application 104 that 1) the exact amount due was tendered, 2) the transaction is closed, and 3) the purchase total concurrently displayed in the payment screen with the Fivestars Credit button 222*h* (e.g., purchase total 214 depicted in FIG. 2H) should be recorded under the payment type of "Fivestars Credit". In this latter embodiment, no payment amounts need to be entered into an accounting screen, but it is possible that a tip amount (known only to add-on application 106) may not be communicated from add-on application 106 to point of sale application 104.

Figure 10:
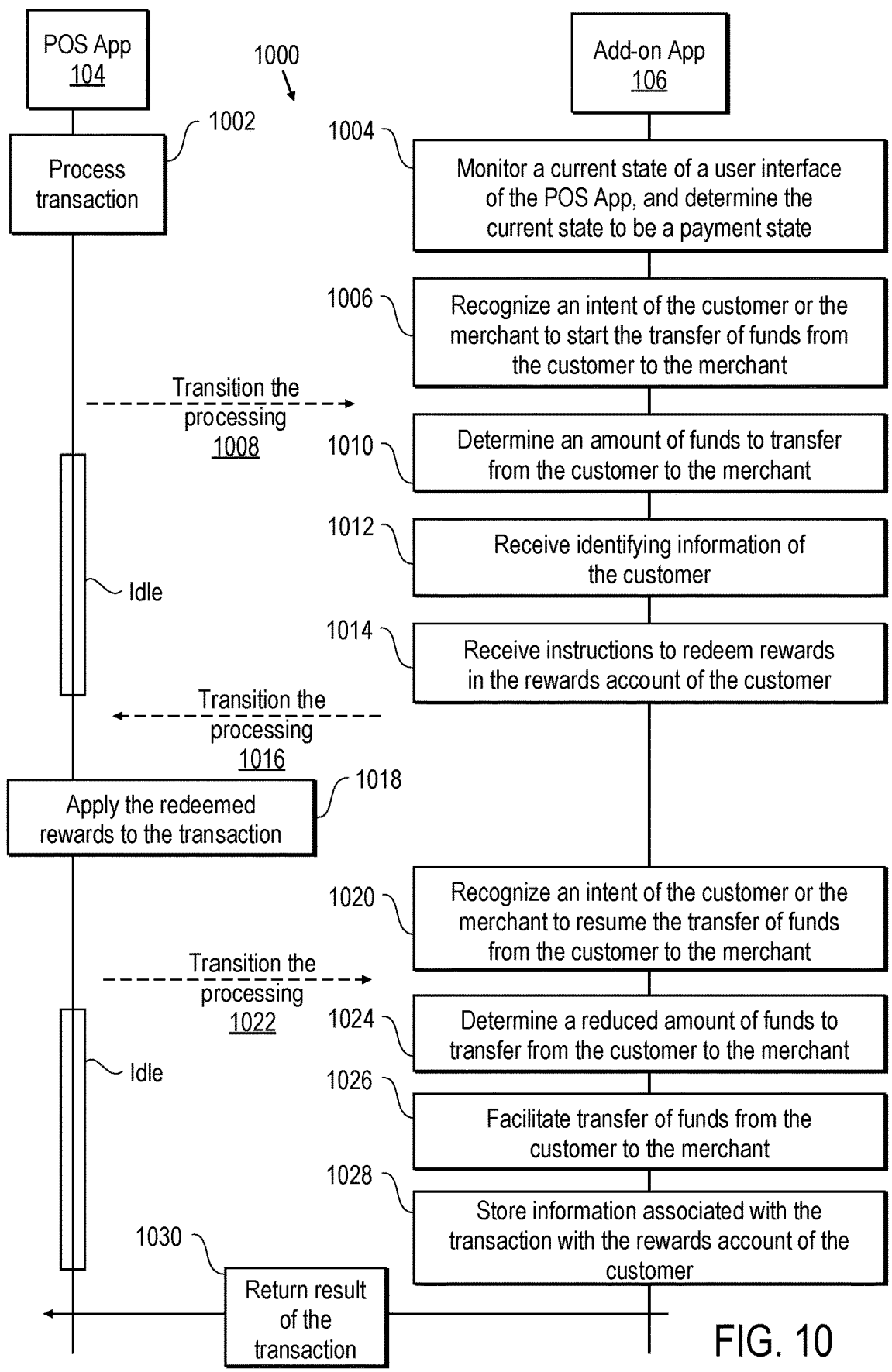
FIG. 10 depicts a sequence diagram for processing a transaction involving the redemption of rewards using a point of sale application and an add-on application, in accordance with one embodiment of the invention.

FIG. 10 depicts sequence diagram 1000 for processing a transaction involving the redemption of rewards using point of sale application 104 and add-on application 106. Processing a transaction may include receiving a selection of items to be purchased. At step 1002, point of sale application 104 may process a transaction between merchant 112 and customer 124. At step 1004, while point of sale application 104 is processing the transaction, add-on application 106 may monitor a current state of a user interface of point of sale application 104 and determine that the current state is a payment state (e.g., based on the location of cancel button 221). At step 1006, add-on application 106 may recognize an intent of customer 124 or merchant 112 to start using financial instruments (e.g., cash, credit card, debit card, etc.) to transfer funds from customer 124 to merchant 112 (i.e., one example of a triggering event). At step 1008, the processing of the transaction may transition from point of sale application 104 to add-on application 106. Stated differently, at step 1008, add-on application 106 may take over the processing of the transaction from point of sale application 104.

At step 1010, add-on application 106 may determine an amount of funds to be transferred from customer 124 to merchant 112 (e.g., by performing an OCR of total 214, as described in FIG. 2D). In step 1010, other information such as the items that are being purchased, tax amount, subtotal, tip amount, etc. may also be extracted from the user interface of point of sale application 104. At step 1012, add-on application 106 may receive identifying information of customer 124 (e.g., phone number, credit card number, etc.), the identifying information associated with a rewards account of customer 124. At step 1014, add-on application 106 may receive instructions from merchant 112 or customer 124 to redeem rewards that are available in the rewards account of customer 124. Rewards may be redeemed in order for customer 124 to receive a discount on his/her purchase. At step 1016, the processing of the transaction may transition from add-on application 106 back to point of sale application 104. Stated differently, at step 1016, point of sale application 104 may take over the processing of the transaction from add-on application 106. At step 1018, the redeemed rewards may be applied to the transaction (e.g., applied by merchant 112 through user interface of point of sale application 106 or applied by emulating user actions of merchant 112 by add-on application 106).

At step 1020, add-on application 106 may recognize an intent of customer 124 or merchant 112 to resume using financial instruments to transfer a reduced amount of funds from customer 124 to merchant 112 (e.g., selection of continue button 223*i*, depicted in FIG. 4H). At step 1022, the processing of the transaction may transition from point of sale application 104 back to add-on application 106. Stated differently, at step 1022, add-on application 106 may take over the processing of the transaction from point of sale application 104.

At step 1024, add-on application 106 may determine a reduced amount of funds to be transferred from customer 124 to merchant 112 (e.g., by performing an OCR of total 436, as described in FIG. 4H). At step 1026, add-on application 106 may facilitate a transfer of the reduced amount of funds from customer 124 to merchant 112 (e.g., by displaying user interfaces to facilitate a cash or credit card transaction, charging a credit card, etc.). At step 1028, add-on application 106 may store information associated with the transaction with the rewards account of customer 124 (e.g., total paid by customer, reward points redeemed, reward points earned by purchase, items purchased, etc.). The information that is stored may also include the information that was extracted from the user interface of point of sale application 104 in step 1010. At step 1030, upon completion of the processing of the transaction, add-on application 106 may return a result of the transaction to point of sale application 104 (e.g., return the amount that was paid by customer 124). As described above in FIGS. 2H and 2I, step 1030 may involve add-on application 106 emulating user actions in the user interface of point of sale application 104. For example, add-on application 106 may select Fivestars Credit button 222h to enter an accounting screen, in which various payment amounts (e.g., subtotal, rewards redeemed, reduced total, etc.) may be entered into the user interface of point of sale application 104. In another embodiment, selection of Fivestars Credit button 222h in the payment screen has the effect of communicating to point of sales application 104 that 1) the exact amount due was tendered, 2) the transaction is closed, and 3) the purchase total concurrently displayed in the payment screen with the Fivestars Credit button 222h (e.g., purchase total 436 depicted in FIG. 4H) should be recorded under the payment type of "Fivestars Credit". In this latter embodiment, no payment amounts need to be entered into an accounting screen, but it is possible that a tip amount (known only to add-on application 106) may not be communicated from add-on application 106 to point of sale application 104.

Figure 11:
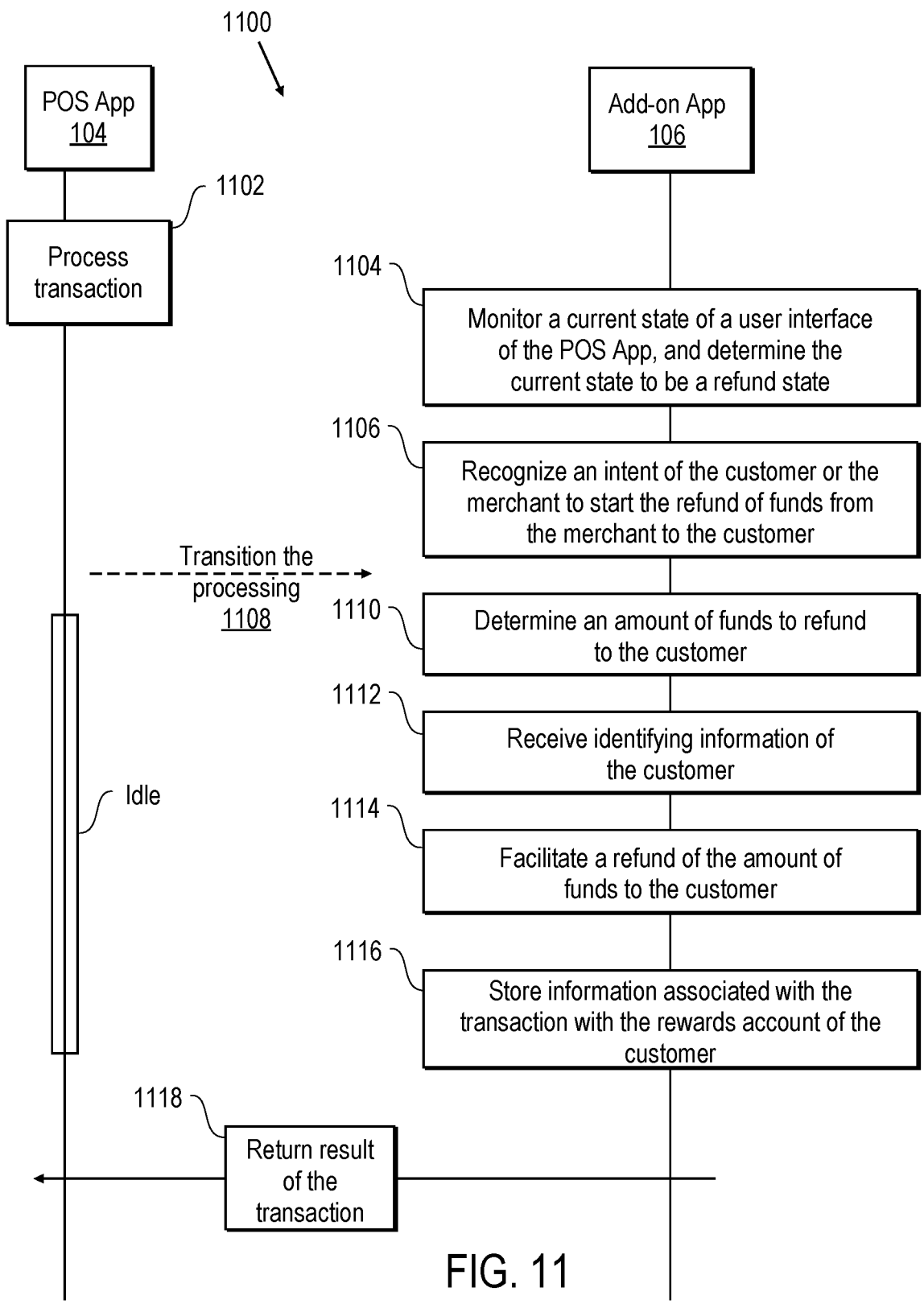
FIG. 11 depicts a sequence diagram for processing a refund to a customer using a point of sale application and an add-on application, in accordance with one embodiment of the invention.

FIG. 11 depicts sequence diagram 1100 for processing a refund from customer 124 using point of sale application 104 and add-on application 106. Processing a transaction may include receiving a selection of items to be refunded. At step 1102, a point of sale application 104 may process a transaction between merchant 112 and customer 124. At step 1104, while point of sale application 104 is processing the transaction, add-on application 106 may monitor a current state of a user interface of point of sale application 104 and determine the current state to be a refund state. As described above in FIG. 5B, based on the selection of user interface element 222b associated with the refund payment type of "credit card," add-on application 106 may determine that the user interface of point of sale application 104 is in a credit card refund state. At step 1106, add-on application 106 may recognize an intent of customer 124 or merchant 112 to start using financial instruments to refund funds from merchant 112 to customer 124 (i.e., one example of a triggering event). As described in FIG. 5B, such intent may be expressed by merchant 112 selecting refund button 223j. At step 1108, the processing of the transaction may transition from point of sale application 104 to add-on application 106. Stated differently, at step 1108, add-on application 106 may take over the processing of the transaction from point of sale application 104.

At step 1110, add-on application 106 may determine an amount of funds to be refunded by the merchant to the customer (e.g., via the OCR of total amount 508, depicted in FIG. 5B). In step 1110, other information such as the items that are being refunded may also be extracted from the user interface of point of sale application 104. At step 1112, add-on application 106 may receive identifying information of customer 124 (e.g., phone number, credit card number, etc.), the identifying information associated with a rewards account of customer 124. At step 1114, add-on application 106 may facilitate a refund of the amount of funds by merchant 112 to customer 124 (e.g., by displaying user interfaces to facilitate a cash or credit card transaction, refunding funds to a credit card, etc.). At step 1116, add-on application 106 may store information associated with the refund with the rewards account of the customer (e.g., amount that was refunded, items that were returned, etc.). The information that is stored may also include the information that was extracted from the user interface of point of sale application 104 in step 1110. At step 1118, upon completion of the processing of the refund, add-on application 106 may return a result of the transaction to point of sale application 104 (e.g., return amount that was refunded to customer 112). As described above in FIGS. 5E and 5F, step 1118 may involve add-on application 106 emulating user actions in the user interface of point of sale application 104. For example, add-on application 106 may select Fivestars Credit button 222h to enter an accounting screen, in which the total amount that was refunded may be entered into the user interface of point of sale application 104. In another embodiment, selection of Fivestars Credit button 222h has the effect of communicating to point of sales application 104 that 1) the transaction is closed, and 2) the total refund amount concurrently displayed with Fivestars Credit button 222h (e.g., total refund amount 508 displayed in FIG. 5E) should be recorded in the payment type of "Fivestars Credit". In this latter embodiment, no refund amount needs to be entered into an accounting screen.

Figure 12:
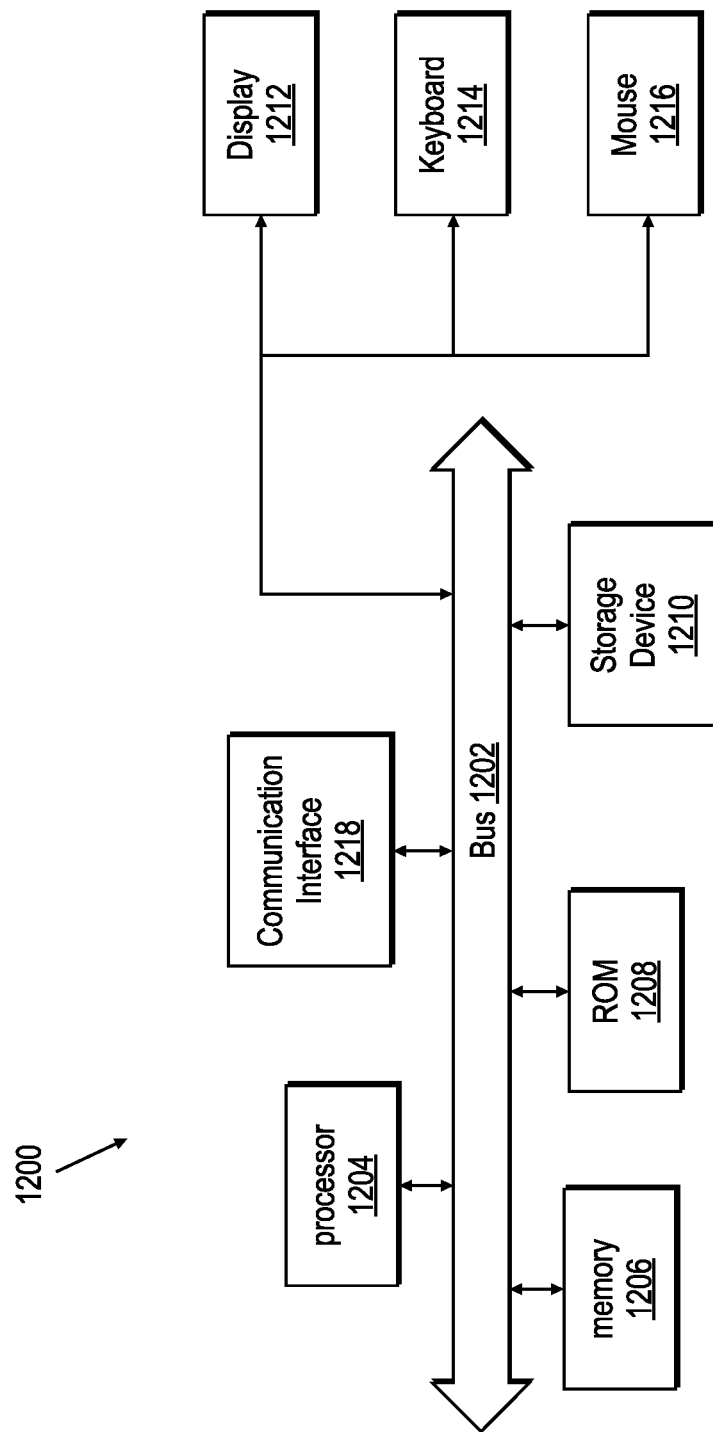
FIG. 12 depicts components of a computer system in which computer readable instructions instantiating the methods of the present invention may be stored and executed.

FIG. 12 depicts components of a computer system in which computer readable instructions instantiating the methods of the present invention may be stored and executed. As is apparent from the foregoing discussion, aspects of the present invention involve the use of various computer systems and computer readable storage media having computer-readable instructions stored thereon. FIG. 12 provides an example of a system 1200 that may be representative of any of the computing systems (e.g., point of sale device 102, terminals 114a/1114b, rewards server 128, servers 130/132, etc.) discussed herein. Examples of system 1200 may include a smartphone, a desktop, a laptop, a mainframe computer, an embedded system, etc. Note, not all of the various computer systems have all of the features of system 1200. For example, certain ones of the computer systems discussed above may not include a display inasmuch as the display function may be provided by a client computer communicatively coupled to the computer system or a display function may be unnecessary. Such details are not critical to the present invention.

System 1200 includes a bus 1202 or other communication mechanism for communicating information, and a processor 1204 coupled with the bus 1202 for processing information. Computer system 1200 also includes a main memory 1206, such as a random access memory (RAM) or other dynamic storage device, coupled to the bus 1202 for storing information and instructions to be executed by processor 1204. Main memory 1206 also may be used for storing temporary variables or other intermediate information during execution of instructions to be executed by processor 204. Computer system 1200 further includes a read only memory (ROM) 1208 or other static storage device coupled to the bus 1202 for storing static information and instructions for processor 1204. A storage device 1210, for example a hard disk, flash memory-based storage medium, or other storage medium from which processor 1204 can read, is provided and coupled to bus 1202 for storing information and instructions (e.g., operating systems, applications programs and the like).

Computer system 1200 may be coupled via bus 1202 to display 1212, such as a flat panel display, for displaying information to a computer user. An input device 1214, such as a keyboard including alphanumeric and other keys, may be coupled to bus 1202 for communicating information and command selections to processor 1204. Another type of user input device is cursor control device 1216, such as a mouse, a trackpad, or similar input device for communicating direction information and command selections to processor 1204 and for controlling cursor movement on display 1212. Other user interface devices, such as microphones, speakers, etc. are not shown in detail but may be involved with the receipt of user input and/or presentation of output.

The processes referred to herein may be implemented by processor 1204 executing appropriate sequences of computer-readable instructions contained in main memory 1206. Such instructions may be read into main memory 1206 from another computer-readable medium, such as storage device 1210, and execution of the sequences of instructions contained in main memory 1206 causes processor 1204 to perform the associated actions. In alternative embodiments, hard-wired circuitry or firmware-controlled processing units may be used in place of or in combination with processor 1204 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing," "computing," "calculating," "determining," "displaying," "receiving," "transmitting" or the like, refer to the action and processes of an appropriately programmed computer system, such as computer system 1200 or similar electronic computing device, that manipulates and transforms data represented as physical (electronic) quantities within its registers and memories into other data similarly represented as physical quantities within its memories or registers or other such information storage, transmission or display devices.

Computer system 1200 also includes communication interface 1218 coupled to bus 1202. Communication interface 1218 may provide a two-way data communication channel with a computer network, which provides connectivity to and among the various computer systems discussed above. For example, communication interface 1218 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1200 can send and receive messages and data through the communication interface 1218 and in that way communicate with hosts accessible via the Internet. It is noted that the components of system 1200 may be located in a single device or located in a plurality of physically and/or geographically distributed devices.

Thus, an add-on application for a point of sale device has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
    while a point of sale application is running on a point of sale device so as to process a transaction between a merchant and a customer, monitoring, by an add-on application also running on the point of sale device, a current state of the point of sale application;
    based on a triggering event associated with the current state of the point of sale application, taking over, by the add-on application, the processing of the transaction from the point of sale application;
    facilitating, by the add-on application, a transfer of funds between the merchant and the customer; and
    upon completion of the transfer of funds between the merchant and the customer, reporting, by the add-on application, the transfer of funds to the point of sale application by the add-on application operating a user interface of the point of sale application,
    wherein the operation of the user interface of the point of sale application comprises inputting, by the add-on application within the user interface of the point of sale application, an amount of funds that has been transferred between the merchant and the customer.

2. The method of claim 1, wherein the current state of the point of sale application comprises one or more of a product selection state, payment state or refund state.

3. The method of claim 1, wherein monitoring the current state of the point of sale application comprises monitoring the user interface of the point of sale application.

4. The method of claim 1, wherein the triggering event includes recognizing an intent of the customer or the merchant to start using financial instruments to transfer funds from the customer to the merchant, or refund funds from the merchant back to the customer.

5. The method of claim 1, wherein for the triggering event associated with a payment state, the amount of funds that has been transferred between the merchant and the customer comprises an amount of funds that has been paid by the customer to the merchant.

6. The method of claim 1, wherein for the triggering event associated with a refund state, the amount of funds that has been transferred between the merchant and the customer comprises an amount of funds that has been refunded from the merchant to the customer.

7. A non-transitory machine-readable medium for a point of sale device, the non-transitory machine-readable medium comprising instructions that, when executed by a processor of the point of sale device, cause an add-on application running on the point of sale device to:
    while a point of sale application is running on the point of sale device so as to process a transaction between a merchant and a customer, monitor a current state of the point of sale application;
    based on a triggering event associated with the current state of the point of sale application, take over the processing of the transaction from the point of sale application;
    facilitate a transfer of funds between the merchant and the customer; and
    upon completion of the transfer of funds between the merchant and the customer, report a result of the transaction to the point of sale application by the add-on application operating a user interface of the point of sale application,
    wherein operating the user interface of the point of sale application comprises inputting, by the add-on application within the user interface of the point of sale application, an amount of funds that has been transferred between the merchant and the customer.

8. The non-transitory machine-readable medium of claim 7, wherein the current state of the point of sale application comprises one or more of a product selection state, payment state or refund state.

9. The non-transitory machine-readable medium of claim 7, wherein monitoring the current state of the point of sale application comprises monitoring the user interface of the point of sale application.

10. The non-transitory machine-readable medium of claim 7, wherein the triggering event includes recognizing an intent of the customer or the merchant to start using financial instruments to transfer funds from the customer to the merchant, or refund funds from the merchant back to the customer.

11. The non-transitory machine-readable medium of claim 7, wherein for the triggering event associated with a payment state, the amount of funds that has been transferred between the merchant and the customer comprises an amount of funds that has been paid by the customer to the merchant.

12. The non-transitory machine-readable medium of claim 7, wherein for the triggering event associated with a refund state, the amount of funds that has been transferred between the merchant and the customer comprises an amount of funds that has been refunded from the merchant to the customer.

13. A point of sale device, comprising a processor and a memory, the memory storing instructions that, when executed by the processor, cause an add-on application running on the point of sale device to:
    while a point of sale application is running on the point of sale device so as to process a transaction between a merchant and a customer, monitor a current state of the point of sale application;
    based on a triggering event associated with the current state of the point of sale application, take over the processing of the transaction from the point of sale application;
    facilitate a transfer of funds between the merchant and the customer; and
    upon completion of the transfer of funds between the merchant and the customer, report a result of the transaction to the point of sale application by the add-on application operating a user interface of the point of sale application,
    wherein operating the user interface of the point of sale application comprises inputting, by the add-on application within the user interface of the point of sale application, an amount of funds that has been transferred between the merchant and the customer.

14. The point of sale device of claim 13, wherein the current state of the point of sale application comprises one or more of a product selection state, payment state or refund state.

15. The point of sale device of claim 13, wherein monitoring the current state of the point of sale application comprises monitoring the user interface of the point of sale application.

16. The point of sale device of claim 13, wherein the triggering event includes recognizing an intent of the customer or the merchant to start using financial instruments to transfer funds from the customer to the merchant, or refund funds from the merchant back to the customer.

17. The point of sale device of claim 13, wherein for the triggering event associated with a payment state, the amount of funds that has been transferred between the merchant and the customer comprises an amount of funds that has been paid by the customer to the merchant.

18. The point of sale device of claim 13, wherein for the triggering event associated with a refund state, the amount of funds that has been transferred between the merchant and the customer comprises an amount of funds that has been refunded from the merchant to the customer.

* * * * *